(12) United States Patent
Hoof et al.

(10) Patent No.: US 9,142,034 B2
(45) Date of Patent: Sep. 22, 2015

(54) CENTER OF MASS STATE VECTOR FOR ANALYZING USER MOTION IN 3D IMAGES

(71) Applicant: Microsoft Corporation, Redmond, WA (US)

(72) Inventors: Jonathan R. Hoof, Kenmore, WA (US); Daniel G. Kennett, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 231 days.

(21) Appl. No.: 13/804,541

(22) Filed: Mar. 14, 2013

(65) Prior Publication Data

US 2014/0270351 A1    Sep. 18, 2014

(51) Int. Cl.
| | |
|---|---|
| G06K 9/00 | (2006.01) |
| G06T 7/20 | (2006.01) |
| G06F 3/01 | (2006.01) |
| G06T 7/60 | (2006.01) |
| A63F 13/428 | (2014.01) |
| A63F 13/213 | (2014.01) |

(52) U.S. Cl.
CPC ............. *G06T 7/2086* (2013.01); *A63F 13/213* (2014.09); *A63F 13/428* (2014.09); *G06F 3/011* (2013.01); *G06F 3/017* (2013.01); *G06T 7/606* (2013.01)

(58) Field of Classification Search
None
See application file for complete search history.

(56) References Cited

U.S. PATENT DOCUMENTS

| | | | |
|---|---|---|---|
| 5,359,704 A | 10/1994 | Rossignac et al. | |
| 7,257,237 B1 | 8/2007 | Luck et al. | |
| 7,315,301 B1 | 1/2008 | Sell | |
| 8,284,258 B1 | 10/2012 | Cetin et al. | |
| 2003/0043270 A1 | 3/2003 | Rafey et al. | |
| 2009/0265671 A1 | 10/2009 | Sachs et al. | |
| 2009/0298650 A1 | 12/2009 | Kutliroff | |
| 2010/0197390 A1 | 8/2010 | Craig et al. | |
| 2010/0302395 A1 | 12/2010 | Mathe et al. | |
| 2011/0317871 A1 | 12/2011 | Tossell et al. | |
| 2012/0056982 A1 | 3/2012 | Katz et al. | |
| 2012/0139918 A1 | 6/2012 | Michail et al. | |
| 2012/0159290 A1 | 6/2012 | Pulsipher et al. | |

(Continued)

FOREIGN PATENT DOCUMENTS

| | | |
|---|---|---|
| EP | 520098 A1 | 12/1992 |
| WO | 0173689 A2 | 10/2001 |

OTHER PUBLICATIONS

Christopher C. Pagano and M.T. Turvey, "The Inertia as a Basis for the Perception of Limb Orientation", 1995, Journal of Experimental Psychology: Human Perception and Performance, vol. 21, No. 5, pp. 1070-1087.*

(Continued)

*Primary Examiner* — Siamak Harandi
(74) *Attorney, Agent, or Firm* — Bryan Webster; Kate Drakos; Micky Minhas

(57) ABSTRACT

Techniques described herein determine a center of mass state vector based on a body model. The body model may be formed by analyzing a depth image of a user who is performing some motion. The center of mass state vector may include, for example, center-of-mass position, center-of-mass velocity, center-of-mass acceleration, orientation, angular velocity, angular acceleration, inertia tensor, and angular momentum. A center of mass state vector may be determined for an individual body part or for the body as a whole. The center of mass state vector(s) may be used to analyze the user's motion.

20 Claims, 37 Drawing Sheets

(56) References Cited

U.S. PATENT DOCUMENTS

| | | | |
|---|---|---|---|
| 2012/0195471 | A1 | 8/2012 | Newcombe et al. |
| 2012/0214594 | A1 | 8/2012 | Kirovski et al. |
| 2012/0268592 | A1 | 10/2012 | Aragones et al. |
| 2012/0307010 | A1 | 12/2012 | Evertt et al. |
| 2012/0308140 | A1 | 12/2012 | Ambrus et al. |
| 2012/0309532 | A1 | 12/2012 | Ambrus et al. |
| 2012/0326976 | A1 | 12/2012 | Markovic et al. |

OTHER PUBLICATIONS

Brunner, Simon, "Using Microsoft Kinect Sensor to Perform Commands on Virtual Objects", Published on: Oct. 2, 2012, Available at: https://diuf.unifr.ch/main/diva/sites/diuf.unifr.ch.main.diva/files/Thesis%20paper.pdf.

Brubaker, Marcus A., "Physical Models of Human Motion for Estimation and Scene Analysis", in PhD. Thesis Submitted in Conformity with the Requirements for the Degree of Doctor of Philosophy, Graduate Department of Computer Science, University of Toronto, Jan. 5, 2012, 169 pages.

Gonzalez, et al., "Estimation of the Center of Mass with Kinect and Wii Balance Board", in Proceedings of IEEE/RSJ International Conference on Intelligent Robot and Systems, Oct. 7, 2012, 6 pages.

Sinthanayothin, et al., "Skeleton Tracking using Kinect Sensor & Displaying in 3D Virtual Scene", in International Journal of Advancements in Computing Technology, vol. 4, Issue 11, Jun. 2012, 11 pages.

Camplani, et al., "Efficient Spatio-Temporal Hole Filling Strategy for Kinect Depth Maps", in Proceedings of Three-Dimensional Image Processing & Applications II, Feb. 9, 2012, 10 pages.

Gaidon, et al., "A Time Series Kernel for Action Recognition", in Proceedings of the British Machine Vision Conference, Sep. 2011, 11 pages.

Lien, et al., "Skeleton-Based Data Compression for Multi-Camera Tele-Immersion System", in Advances in Visual Computing, Third International Symposium, Nov. 26, 2007, 10 pages.

Ye, et al., "Accurate 3D Pose Estimation from a Single Depth Image", in IEEE International Conference on Computer Vision, Nov. 6, 2011, 8 pages.

Obdrzalek, et al., "Accuracy and Robustness of Kinect Pose Estimation in the Context of Coaching of Elderly Population", in Annual International Conference of the IEEE Engineering in Medicine and Biology Society, Aug. 28, 2012, 6 pages.

Manasrah, Ahmad Adli, "Human Motion Tracking for Assisting Balance Training and Control of a Humanoid Robot", in PhD. Thesis Submitted in Partial Fulfilment of the Requirements for the Degree of Master of Science in Mechanical Engineering, Department of Mechanical Engineering, University of South Florida, Jan. 1, 2012, 82 pages.

Strauss, Ben, "Kinect Can 'Sort of' Handle Players Lying Down", Published on: Jul. 14, 2010, Available at: http://www.industrygamers.com/news/kinect-can-sort-of-handle-players-lying-down/.

Brubaker, Marcus, "Physics-Based Priors for Human Pose Tracking", in A Thesis Submitted in Conformity with the Requirements for the Degree of Master of Science, Graduate Department of Computer Science, University of Toronto, Mar. 11, 2013, 89 pages.

Poulios, Nikolaos, "Sensor Based Physical Interaction for Embodied Playful Learning Games", in Master Thesis Project, Jul. 2012, 81 pages.

Yu, et al., "Automatic Human Body Tracking and Modeling from Monocular Video Sequences", in IEEE International Conference on Acoustics, Speech and Signal Processing, Apr. 15, 2007, 4 pages.

Isenberg, et al., "Stylizing Silhouettes at Interactive Rates: From Silhouette Edges to Silhouette Strokes", in Journal of Computer Graphics Forum, vol. 21, Issue 3, Sep. 2002, 10 pages.

"1 Kinect Depth Inpainting and Filtering", Retrieved on: Dec. 3, 2013, Available at: http://www.radfordparker.com/papers/kinectinpainting.pdf.

Raskar, et al., "Image Precision Silhouette Edges", in Proceedings of the Symposium on Interactive 3D Graphics, Apr. 26, 1999, 7 pages.

Catto, et al., "Iterative Dynamics with Temporal Coherence", Feb. 22, 2005, Menlo Park, California, 24 pages.

"International Search Report and Written Opinion Issued in PCT Patent Application No. PCT/US2014/026196", Mailed Date: Nov. 24, 2014, 20 Pages.

Huang, et al., "Gait Recognition with Shifted Energy Image and Structural Feature Extraction", in IEEE Transactions on Image Processing Biometrics Compendium, vol. 21, Issue 4, Dec. 21, 2011, 14 Pages.

Shotton, et al., "Real-Time Human Pose Recognition in Parts from Single Depth Images", in Communications of the ACM, vol. 56, Issue 1, Jan. 1, 2011, 8 Pages.

Zhang, Zhengyou, "Microsoft Kinect Sensor and Its Effect", in IEEE Multimedia, vol. 19, Issue 2, Feb. 1, 2012, 7 Pages.

Vondrak, et al., "Physical Simulation for Probabilistic Motion Tracking", in IEEE Conference on Computer Vision and Pattern Recognition, Jun. 23, 2008, 8 Pages.

Marcus, et al., "Estimating Contact Dynamics", in IEEE 12th International Conference on Computer Vision, Sep. 29, 2009, 8 Pages.

* cited by examiner

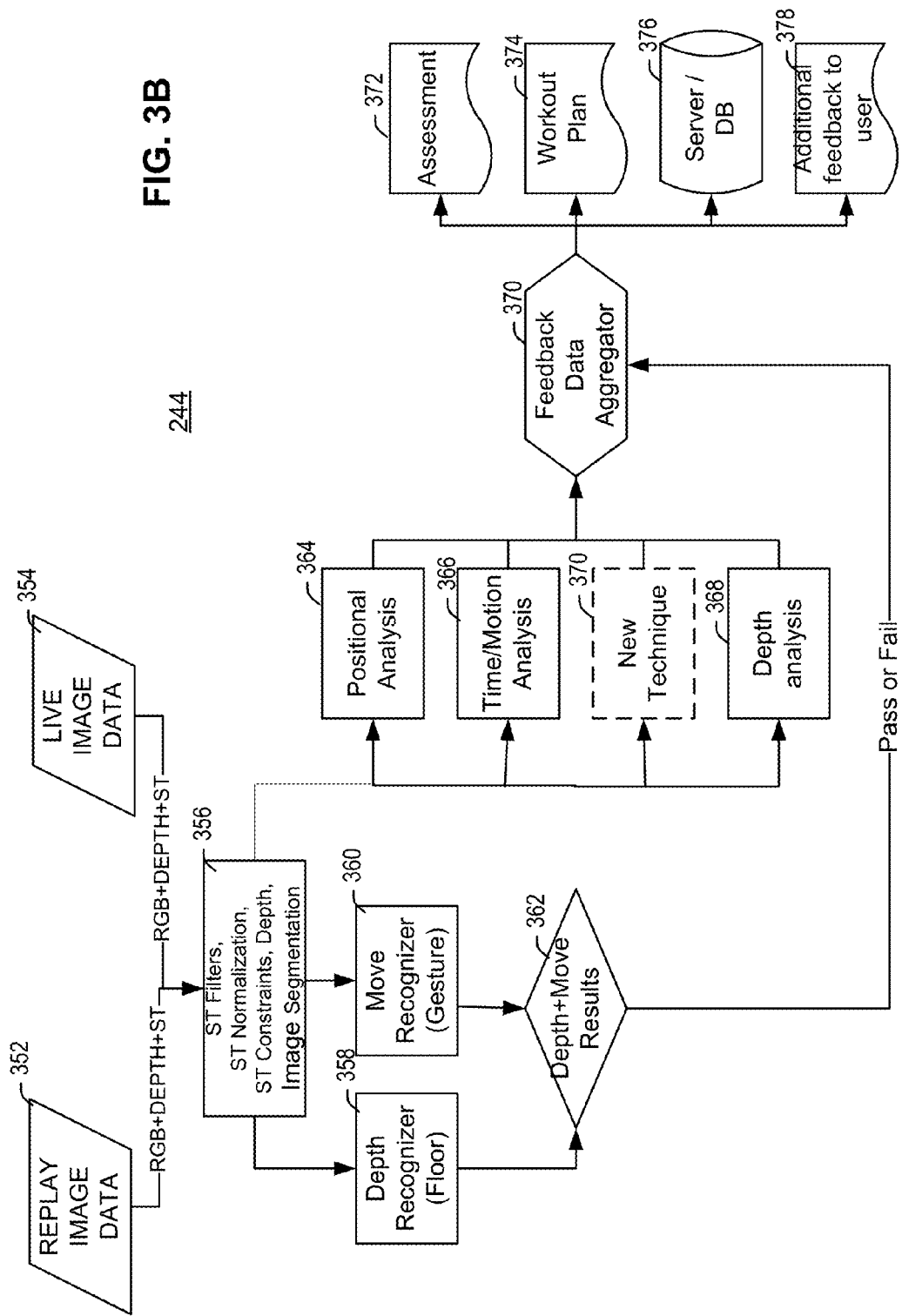

FIG. 4B

| 30 | 15 | 15 | 15 | 16 | 16 | 16 | 18 | 18 | 18 | 18 | 18 | 18 | 20 | 20 | 20 | 20 | 20 | 20 | 20 | 20 | 20 | 20 | 30 | 30 |
|---|---|---|---|---|---|---|---|---|---|---|---|---|---|---|---|---|---|---|---|---|---|---|---|---|
| 30 | 15 | 15 | 15 | 16 | 16 | 16 | 18 | 18 | 18 | 18 | 18 | 18 | 20 | 20 | 20 | 20 | 20 | 20 | 20 | 20 | 20 | 20 | 30 | 30 |
| 30 | 15 | 15 | 15 | 16 | 16 | 16 | 18 | 18 | 18 | 18 | 18 | 18 | 20 | 20 | 20 | 20 | 20 | 20 | 20 | 20 | 20 | 20 | 30 | 30 |
| 30 | 15 | 15 | 15 | 16 | 16 | 16 | 18 | 18 | 18 | 18 | 18 | 18 | 9 | 20 | 20 | 19 | 19 | 20 | 20 | 20 | 20 | 20 | 30 | 30 |
| 30 | 15 | 15 | 15 | 16 | 16 | 16 | 18 | 8 | 8 | 9 | 9 | 9 | 9 | 9 | 9 | 9 | 9 | 19 | 19 | 20 | 20 | 30 | 30 | 30 |
| 30 | 15 | 15 | 15 | 16 | 16 | 16 | 8 | 8 | 7 | 8 | 8 | 8 | 8 | 8 | 8 | 9 | 9 | 9 | 19 | 20 | 30 | 30 | 30 | 30 |
| 30 | 15 | 15 | 16 | 16 | 16 | 8 | 7 | 7 | 6 | 7 | 7 | 7 | 7 | 7 | 7 | 8 | 8 | 9 | 9 | 9 | 20 | 30 | 30 | 30 |
| 30 | 15 | 15 | 16 | 16 | 8 | 8 | 6 | 6 | 5 | 5 | 5 | 5 | 6 | 7 | 7 | 7 | 8 | 8 | 9 | 19 | 20 | 30 | 30 | 30 |
| 30 | 15 | 15 | 16 | 7 | 7 | 7 | 6 | 5 | 5 | 5 | 5 | 5 | 5 | 7 | 6 | 7 | 8 | 8 | 9 | 19 | 20 | 30 | 30 | 30 |
| 30 | 15 | 15 | 16 | 7 | 7 | 7 | 5 | 5 | 5 | 5 | 5 | 5 | 5 | 6 | 7 | 8 | 8 | 9 | 9 | 19 | 30 | 30 | 30 | 30 |
| 30 | 15 | 15 | 16 | 7 | 7 | 6 | 5 | 5 | 5 | 5 | 5 | 5 | 5 | 6 | 7 | 8 | 8 | 9 | 9 | 19 | 30 | 30 | 30 | 30 |
| 30 | 15 | 15 | 7 | 7 | 6 | 6 | 5 | 5 | 5 | 5 | 5 | 5 | 5 | 6 | 7 | 8 | 8 | 9 | 19 | 19 | 30 | 30 | 30 | 30 |
| 30 | 15 | 15 | 6 | 6 | 5 | 6 | 5 | 5 | 5 | 4 | 4 | 5 | 4 | 4 | 6 | 7 | 8 | 8 | 9 | 19 | 20 | 30 | 30 | 30 |
| 30 | 15 | 15 | 5 | 6 | 5 | 3 | 5 | 5 | 5 | 5 | 5 | 5 | 5 | 5 | 5 | 6 | 7 | 8 | 9 | 19 | 20 | 30 | 30 | 30 |
| 30 | 15 | 15 | 4 | 5 | 4 | 4 | 5 | 5 | 5 | 5 | 5 | 5 | 5 | 5 | 5 | 6 | 7 | 8 | 9 | 19 | 19 | 30 | 30 | 30 |
| 30 | 15 | 15 | 5 | 5 | 5 | 5 | 5 | 5 | 5 | 5 | 5 | 5 | 5 | 5 | 5 | 6 | 7 | 8 | 18 | 18 | 19 | 30 | 30 | 30 |
| 30 | 15 | 15 | 15 | 5 | 4 | 5 | 5 | 5 | 5 | 5 | 5 | 5 | 5 | 5 | 5 | 6 | 7 | 8 | 18 | 18 | 18 | 30 | 30 | 30 |
| 30 | 15 | 15 | 15 | 5 | 5 | 5 | 5 | 5 | 5 | 5 | 5 | 5 | 5 | 5 | 5 | 6 | 7 | 8 | 18 | 18 | 18 | 30 | 30 | 30 |
| 30 | 15 | 15 | 15 | 15 | 5 | 5 | 5 | 5 | 5 | 5 | 5 | 5 | 5 | 5 | 5 | 6 | 7 | 8 | 18 | 18 | 18 | 30 | 30 | 30 |
| 30 | 15 | 15 | 15 | 15 | 15 | 5 | 5 | 5 | 5 | 5 | 5 | 5 | 5 | 5 | 6 | 6 | 7 | 8 | 18 | 18 | 18 | 30 | 30 | 30 |
| 30 | 15 | 15 | 15 | 15 | 15 | 5 | 5 | 5 | 5 | 5 | 5 | 5 | 5 | 5 | 6 | 7 | 8 | 18 | 18 | 18 | 18 | 30 | 30 | 30 |
| 30 | 15 | 15 | 15 | 15 | 15 | 5 | 5 | 5 | 5 | 5 | 5 | 5 | 6 | 7 | 7 | 18 | 18 | 18 | 18 | 18 | 30 | 30 | 30 | 30 |
| 30 | 15 | 15 | 15 | 15 | 15 | 5 | 5 | 5 | 5 | 5 | 5 | 6 | 6 | 7 | 7 | 18 | 18 | 18 | 18 | 18 | 30 | 30 | 30 | 30 |
| 30 | 15 | 15 | 15 | 15 | 15 | 5 | 5 | 5 | 5 | 5 | 5 | 6 | 7 | 7 | 18 | 18 | 18 | 18 | 18 | 30 | 30 | 30 | 30 | 30 |

CENTER OF MASS STATE VECTOR FOR ANALYZING USER MOTION IN 3D IMAGES

BACKGROUND

Computer vision has been used to analyze images from the real world for a variety of purposes. One example is to provide a natural user interface ("NUI") for electronic devices. In one NUI technique 3D images of a user are captured and analyzed to recognize certain poses or gestures. Therefore, the user may make a gesture to provide input to control an application such as a computer game or multimedia applications. In one technique, the system models the user as a skeleton having joints that are connected by "bones" and looks for certain angles between the joints, bone positions, etc. to detect a gesture.

Such techniques work well as a NUI. However, some applications require more precise understanding and analysis of the user's motion.

SUMMARY

Disclosed herein are systems and methods for determining a center of mass state vector based on a body model. The body model may be formed by analyzing a depth image of a user who is performing some motion. The center of mass state vector may include, for example, center-of-mass position, center-of-mass velocity, center-of-mass acceleration, orientation of a body part or whole body, angular velocity, angular acceleration, inertia tensor, and angular momentum. A center of mass state vector may be determined for an individual body part or for the body as a whole. The center of mass state vector(s) may be used to analyze the user's motion.

One embodiment includes a method that includes the following. Image data that tracks a user is accessed. A body model that includes body parts is formed for the user based on the image data. A center of mass is computed for different ones of the body parts. A center of mass is determined for the user as a whole based on the center of mass of the different body parts.

One embodiment includes a system comprising a capture device that captures 3D image data that tracks a user and a processor in communication with the capture device. The processor is configured to access the 3D image data from the capture device and form a body model for the user that includes body parts and joints based on the image data. The processor is configured to compute a center of mass for different ones of the plurality of body parts. The processor is configured to determine a center of mass for the user as a whole based on the center of mass of the body parts.

One embodiment includes a computer readable storage device comprising processor readable code for programming a processor to perform access skeletal data that tracks a user exercising. The skeletal data includes joints. The processor readable code is further for programming the processor to add geometric shapes between pairs of the joints, compute a center of mass for different ones of the geometric shapes, and determine a center of mass state vector for each of the geometric shapes for a plurality of points in time. The center of mass state vector for each of the geometric shapes comprises position of a center of mass of the geometric shape, velocity of a center of mass of the geometric shape, orientation of the geometric shape, and angular velocity of the geometric shape. The processor readable code is further for programming the processor to determine change in the center of mass state vectors for each of the geometric shapes between two points in time, treat the plurality of joints as constraints, and compute constraint forces to move the geometric shapes to result in the change in the center of mass state vectors for the geometric shapes between the two points in time.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3B is a diagram of one embodiment of a runtime engine.

FIG. 4B depicts exemplary data in an exemplary depth image.

DETAILED DESCRIPTION

Figure 1A:
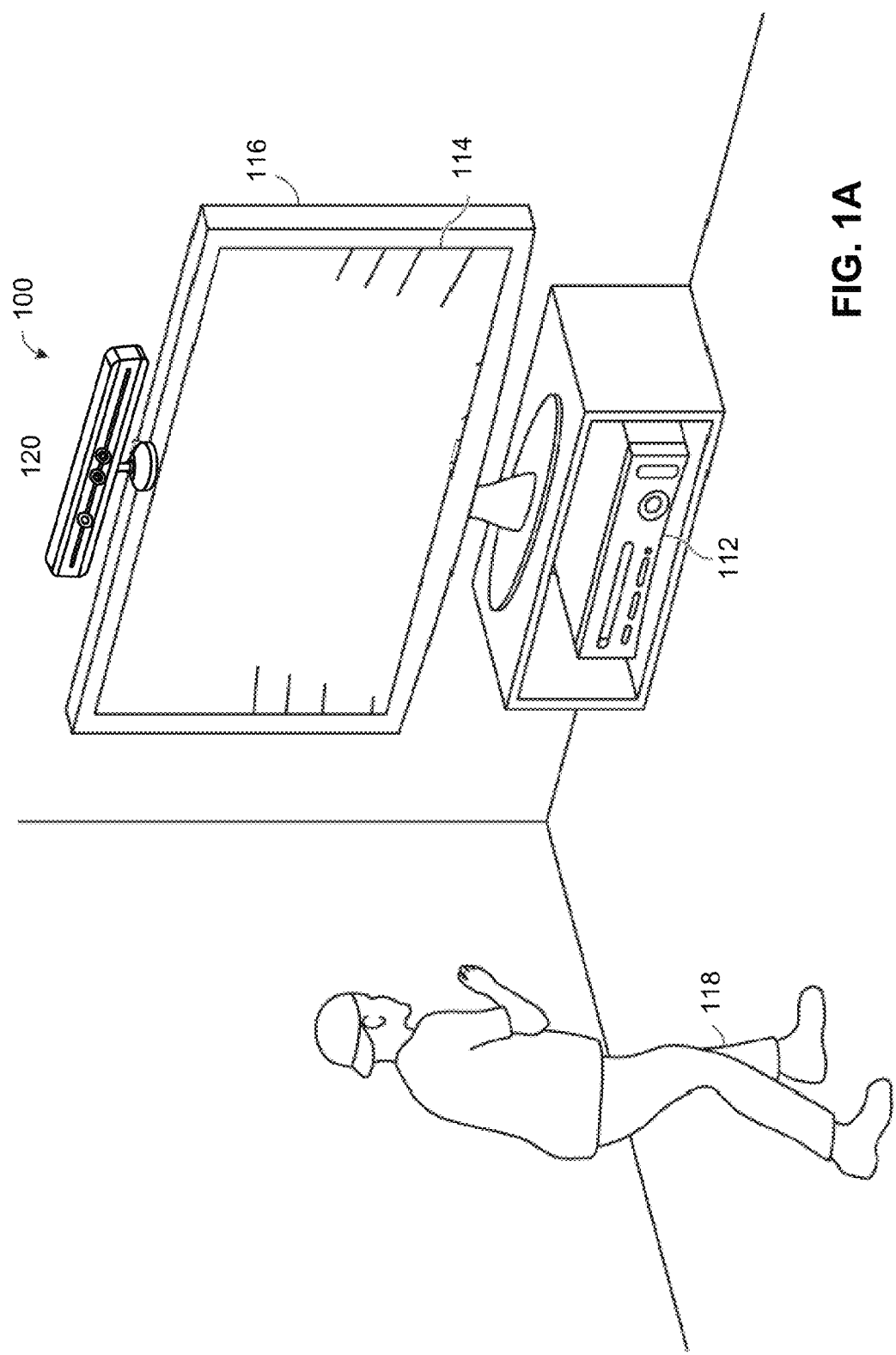
FIGS. 1A and 1B illustrate an example embodiment of a tracking system that tracks a user.

Embodiments described herein use depth images to analyze user motion. One embodiment includes a runtime engine for analyzing user motion in a 3D image. The runtime engine is able to use different techniques to analyze the user's motion, depending on what the motion is. The runtime engine might choose a technique that depends on skeletal tracking data and/or one that instead uses image segmentation data to determine whether the user is performing the correct motion. The runtime engine might determine how to perform positional analysis or time/motion analysis of the user's performance based on what motion is being performed.

In one embodiment, repetitive motion such as a user exercising is analyzed. One tracking technique that the system may use is skeletal tracking. However, the system is not limited to skeletal tracking.

A system and method are described that tracks user motion and provides feedback on the user's motion, in accordance with one embodiment. For example, a user may be asked to perform push-ups. The system may track the user's motion and analyze the push-ups to determine whether the user is performing the push-up correctly. The system could inform the user that their hips were too high, that their elbows did not fully straighten at the top of the push-up, that they did not come fully down on some of the push-ups, etc. The system could also determine a suitable exercise routine for the user upon evaluation of user's performance.

Tracking a user who is performing a motion (which may be repetitive) such as exercising is challenging. One challenge is developing the accuracy needed to be able to provide feedback to the user who is performing a motion such as, but not limited to, exercising. It is desirable for the tracking system to be able to recognize subtle differences in user motion, in accordance with some embodiments. As one example, it may be desirable to determine subtle differences in the angle of the user's hips as they are squatting down, subtle differences between the right and left side of the body as the user lifts a weight, subtle differences in weight distribution, etc. As some further examples it may be desirable to determine whether the user is truly performing a push-up, or is merely lifting their shoulders and upper torso off the floor. It can be very difficult to recognize such subtle differences for conventional tracking techniques.

Another challenge is that tracking techniques that work well in some cases do not work well in others. For example, tracking techniques that may work well when the user is standing may encounter problems when the user is on the floor. Tracking techniques that may work well when the user is on the floor may have a drawback when used for tracking the user who is standing. Moreover, for some movements (e.g., some exercises), the user may be standing for part of the exercise and at least partially on the floor for another part of the exercise.

One or more center of mass state vectors are determined based on a body model, in one embodiment. The body model may have joints and geometric shapes. For example, a cylinder can be used to represent the upper part of the user's arm. Another cylinder may be used to represent the lower part of the user's arm. Other geometric shapes could be used. In one embodiment, the geometric shapes are symmetrical about a central axis.

A center of mass state vector may include, for example, center-of-mass position, center-of-mass velocity, center-of-mass acceleration, angular velocity, orientation of a body part or whole body, angular acceleration, inertia tensor, and angular momentum. A center of mass state vector may be determined for an individual body part or for the body as a whole. The center of mass state vector(s) may be used to analyze the user's motion. For example, such information can be used to track a user performing certain exercises, such as squats, lunges, push-ups, jumps, or jumping jacks so that an avatar of the user can be controlled, points can be awarded to the user and/or feedback can be provided to the user. Where the application instructs a user to perform certain physical exercises, the application can determine whether a user has performed an exercise with correct form, and where they have not, can provide feedback to the user regarding how the user can improve their form.

In one embodiment, the center of mass state vector is used to analyze the user's movements. In one embodiment, the forces that a body part would need to apply in order to result in a change in the center of mass state vector is determined. For example, when a user is exercising, their feet need to apply some force in order for them to jump, twist, etc. Foot forces can be computed based on the assumption that the feet are constraints with the ground.

In one embodiment, the system computes muscle-force/torque by treating the body as a ragdoll with body parts specified by the shapes used by the inertia tensor computation, and constraints specified by the configuration of the body. For example, the upper arm is one body part, the lower arm is another, and the two are connected by a constraint located at the elbow. In addition, if the feet are found to be in contact with the ground, a constraint is added for each foot in such contact.

In one embodiment, signal analysis is used to analyze a user's performance of a repetitive motion, such as exercising. When parameters that are associated with a repetitive motion (e.g., center of mass) are plotted over time, the plot may resemble a signal. In the case of drills (such as physical fitness drills), many of these signals have a characteristic "pulse" look to them, where the value displaces from one position, moves in some direction, then returns to the original position at the end of a "repetition." One embodiment includes a repetition spotting and rough bracketing system that spot these sequences.

In one embodiment, the system forms a "parameter signal" that tracks some parameter associated with the user's motion. The system may take the derivative of the parameter signal to form a "derivative signal." The derivative signal may help to identify repetitions in the parameter signal. The system may apply various signal processing techniques (e.g., curve fitting, autocorrelation, etc.) to the parameter signal to analyze repetitions.

Figure 1B:
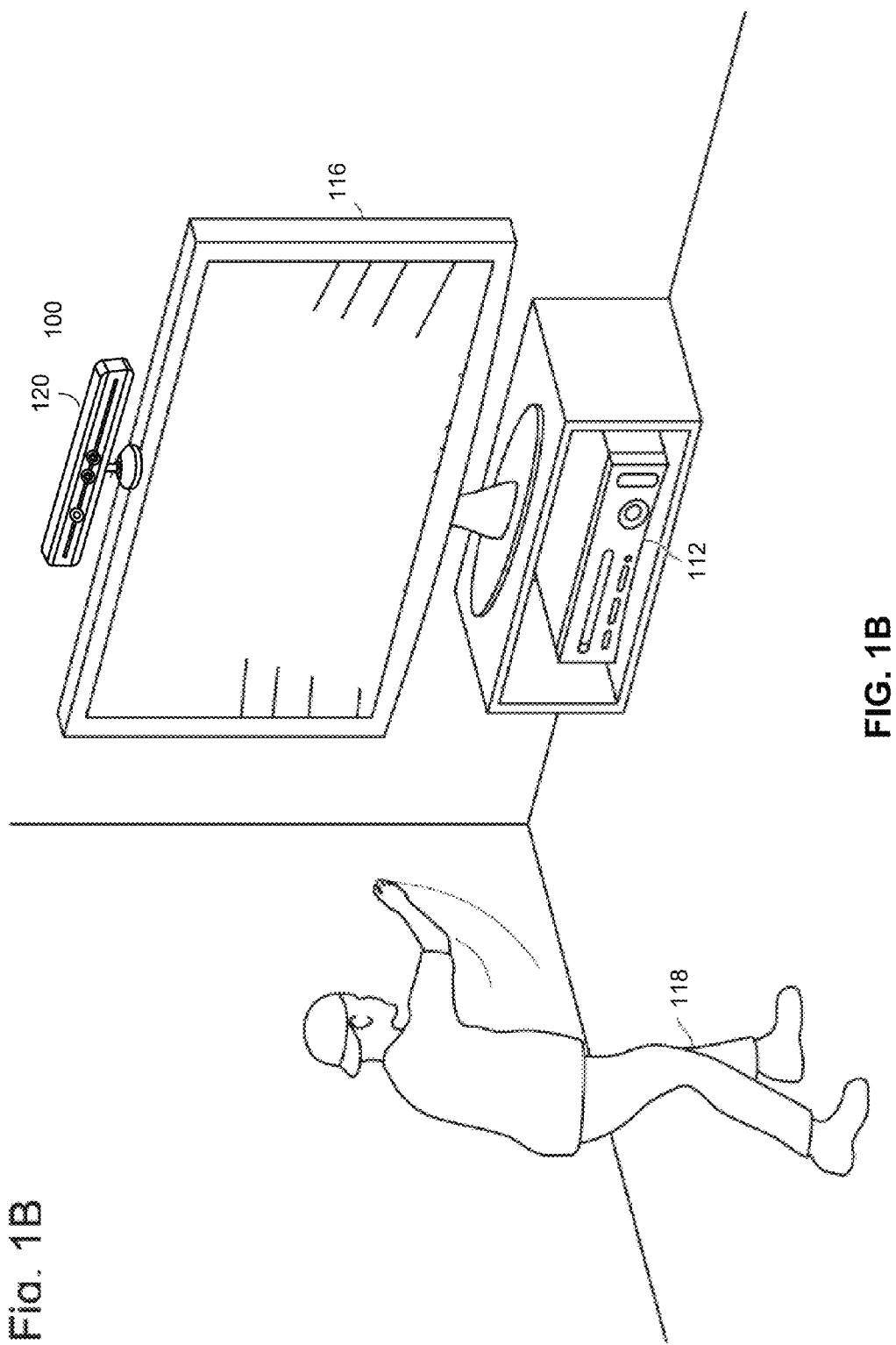

Prior to discussing further details of the center of mass state vector, and using signal analysis, an example system will be discussed. FIGS. 1A and 1B illustrate an example embodiment of a tracking system with a user 118 performing a fitness workout. In an example embodiment, the tracking system 100 may be used to recognize, analyze, and/or track a human target such as the user 118 or other objects within range of the tracking system 100. As shown in FIG. 1A, the tracking system 100 includes a computing system 112 and a capture device 120. As will be describe in additional detail below, the capture device 120 can be used to obtain depth images and color images (also known as RGB images) that can be used by the computing system 112 to identify one or more users or other objects, as well as to track motion and/or other user behaviors. The tracked motion and/or other user behavior can be used to analyze the user's physical movements and provide feedback to the user. For example, a user may be instructed to perform a push up, with the system tracking the user's form. The system can provide feedback to the user to help them correct their form. The system could identify areas for improvement, and create a workout plan for the user.

In one embodiment, tracking the user can be used to provide a natural user interface (NUI). The NUI could be used to allow the user to update an application. Therefore, a user can manipulate game characters or other aspects of the application by using movement of the user's body and/or objects around the user, rather than (or in addition to) using controllers, remotes, keyboards, mice, or the like. For example, a video game system can update the position of images displayed in a video game based on the new positions of the objects or update an avatar based on motion of the user. Thus, the avatar may track the user's actual movements. The system may render another person alongside the avatar, such as a fitness coach, sports start, etc. Thus, the user can envision themselves working out with or being coached by someone.

The computing system 112 may be a computer, a gaming system or console, or the like. According to an example embodiment, the computing system 112 may include hardware components and/or software components such that computing system 112 may be used to execute applications such as gaming applications, non-gaming applications, or the like. In one embodiment, computing system 112 may include a processor such as a standardized processor, a specialized processor, a microprocessor, or the like that may execute instructions stored on a processor readable storage medium for performing the processes described herein.

The capture device 120 may be, for example, a camera that may be used to visually monitor one or more users, such as the user 118, such that gestures and/or movements performed by the one or more users may be captured, analyzed, and tracked. From this, a center-of-mass state vector can be generated.

According to one embodiment, the tracking system 100 may be connected to an audiovisual device 116 such as a television, a monitor, a high-definition television (HDTV), or the like that may provide game or application visuals and/or audio to a user such as the user 118. For example, the computing system 112 may include a video adapter such as a graphics card and/or an audio adapter such as a sound card that may provide audiovisual signals associated with the game application, non-game application, or the like. The audiovisual device 116 may receive the audiovisual signals from the computing system 112 and may then output the game or application visuals and/or audio associated with the audiovisual signals to the user 118. According to one embodiment, the audiovisual device 116 may be connected to the computing system 112 via, for example, an S-Video cable, a coaxial cable, an HDMI cable, a DVI cable, a VGA cable, component video cable, or the like.

As shown in FIGS. 1A and 1B, the tracking system 100 may be used to recognize, analyze, and/or track a human target such as the user 118. For example, the tracking system 100 determines various parameters that describe the user's motion while, for example, performing an exercise routine. Example parameters include, but are not limited to, a center of mass state vector. This state vector may be determined based on a body model, in one embodiment.

As another example, the user 118 may be tracked using the capture device 120 such that the gestures and/or movements of user 118 may be captured to animate an avatar or on-screen character and/or may be interpreted as controls that may be used to affect the application being executed by computing system 112. Thus, according to one embodiment, the user 118 may move his or her body to control the application and/or animate the avatar or on-screen character.

In the example depicted in FIGS. 1A and 1B, the application executing on the computing system 112 may be an exercise routine that the user 118 performs. For example, the computing system 112 may use the audiovisual device 116 to provide a visual representation of fitness trainer 138 to the user 118. The computing system 112 may also use the audiovisual device 116 to provide a visual representation of a player avatar 140 that the user 118 may control with his or her movements. For example, as shown in FIG. 1B, the user 118 may move their arm in physical space to cause the player avatar 140 to move its arm in game space. Thus, according to an example embodiment, the computer system 112 and the capture device 120 recognize and analyze the arm movement of the user 118 in physical space such that the user's form may be analyzed. The system may provide feedback to the user of how well they performed the motion.

In example embodiments, the human target such as the user 118 may have an object. In such embodiments, the user of an electronic game may be holding the object such that the motions of the player and the object may be analyzed. For example, the motion of a player swinging a tennis racket may be tracked and analyzed to determine whether the user's form is good. Objects not held by the user can also be tracked, such as objects thrown, pushed or rolled by the user (or a different user) as well as self-propelled objects. In addition to tennis, other games can also be implemented.

According to other example embodiments, the tracking system 100 may further be used to interpret target movements as operating system and/or application controls that are outside the realm of games. For example, virtually any controllable aspect of an operating system and/or application may be controlled by movements of the target such as the user 118.

Figure 2:
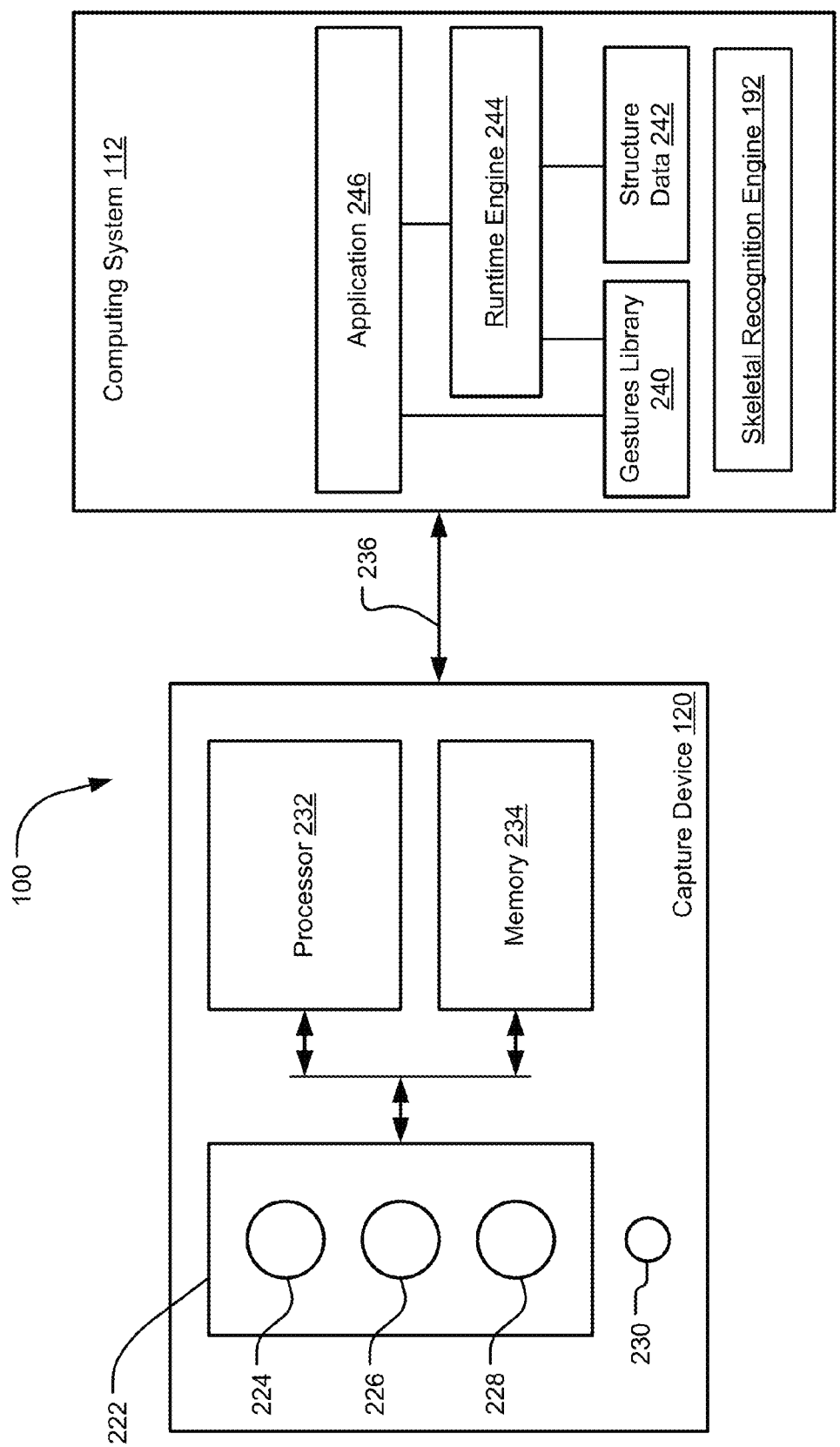
FIG. 2 illustrates an example embodiment of a capture device that may be used as part of the tracking system.

FIG. 2 illustrates an example embodiment of the capture device 120 that may be used in the tracking system 100. According to an example embodiment, the capture device 120 may be configured to capture video with depth information including a depth image that may include depth values via any suitable technique including, for example, time-of-flight, structured light, stereo image, or the like. According to one embodiment, the capture device 120 may organize the depth information into "Z layers," or layers that may be perpendicular to a Z axis extending from the depth camera along its line of sight.

As shown in FIG. 2, the capture device 120 may include an image camera component 222. According to an example embodiment, the image camera component 222 may be a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the camera.

As shown in FIG. 2, according to an example embodiment, the image camera component 222 may include an infra-red (IR) light component 224, a three-dimensional (3-D) camera 226, and an RGB camera 228 that may be used to capture the depth image of a scene. For example, in time-of-flight analysis, the IR light component 224 of the capture device 120 may emit an infrared light onto the scene and may then use sensors (not shown) to detect the backscattered light from the surface of one or more targets and objects in the scene using, for example, the 3-D camera 226 and/or the RGB camera 228. In some embodiments, pulsed infrared light may be used such that the time between an outgoing light pulse and a corresponding incoming light pulse may be measured and used to determine a physical distance from the capture device 120 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 120 to a particular location on the targets or objects by analyzing the intensity of the reflected beam of light over time via various techniques including, for example, shuttered light pulse imaging.

In another example embodiment, the capture device 120 may use a structured light to capture depth information. In such an analysis, patterned light (i.e., light displayed as a known pattern such as grid pattern, a stripe pattern, or different pattern) may be projected onto the scene via, for example, the IR light component 224. Upon striking the surface of one or more targets or objects in the scene, the pattern may become deformed in response. Such a deformation of the pattern may be captured by, for example, the 3-D camera 226 and/or the RGB camera 228 and may then be analyzed to determine a physical distance from the capture device to a particular location on the targets or objects. In some implementations, the IR Light component 224 is displaced from the cameras 226 and 228 so triangulation can be used to determined distance from cameras 226 and 228. In some implementations, the capture device 120 will include a dedicated IR sensor to sense the IR light.

According to another embodiment, the capture device 120 may include two or more physically separated cameras that may view a scene from different angles to obtain visual stereo data that may be resolved to generate depth information. Other types of depth image sensors can also be used to create a depth image.

The capture device 120 may further include a microphone 230. The microphone 230 may include a transducer or sensor that may receive and convert sound into an electrical signal. According to one embodiment, the microphone 230 may be used to reduce feedback between the capture device 120 and the computing system 112 in the target recognition, analysis, and tracking system 100. Additionally, the microphone 230 may be used to receive audio signals that may also be provided by the user to control applications such as game applications, non-game applications, or the like that may be executed by the computing system 112.

In an example embodiment, the capture device 120 may further include a processor 232 that may be in operative communication with the image camera component 222. The processor 232 may include a standardized processor, a specialized processor, a microprocessor, or the like that may execute instructions including, for example, instructions for receiving a depth image, generating the appropriate data format (e.g., frame) and transmitting the data to computing system 112.

The capture device 120 may further include a memory component 234 that may store the instructions that may be executed by the processor 232, images or frames of images captured by the 3-D camera and/or RGB camera, or any other suitable information, images, or the like. According to an example embodiment, the memory component 234 may include random access memory (RAM), read only memory (ROM), cache, Flash memory, a hard disk, or any other suitable storage component. As shown in FIG. 2, in one embodiment, the memory component 234 may be a separate component in communication with the image capture component 222 and the processor 232. According to another embodiment, the memory component 234 may be integrated into the processor 232 and/or the image capture component 222.

As shown in FIG. 2, the capture device 120 may be in communication with the computing system 212 via a communication link 236. The communication link 236 may be a wired connection including, for example, a USB connection, a Firewire connection, an Ethernet cable connection, or the like and/or a wireless connection such as a wireless 802.11b, g, a, or n connection. According to one embodiment, the computing system 112 may provide a clock to the capture device 120 that may be used to determine when to capture, for example, a scene via the communication link 236. Additionally, the capture device 120 provides the depth images and color images captured by, for example, the 3-D camera 226 and/or the RGB camera 228 to the computing system 112 via the communication link 236. In one embodiment, the depth images and color images are transmitted at 30 frames per second. The computing system 112 may then use the model, depth information, and captured images to, for example, control an application such as a game or word processor and/or animate an avatar or on-screen character.

Computing system 112 includes gestures library 240, structure data 242, runtime engine 244, skeletal recognition engine, and application 246. Runtime engine 244 may perform depth image processing and object reporting. The runtime engine 244 may use the depth images to track motion of objects, such as the user and other objects. To assist in the tracking of the objects, runtime engine 244 may use gestures library 240, structure data 242, and skeletal recognition engine 192. In one embodiment, the runtime engine 244 analyzes motion of a user being tracked by the system 100. This could be some repetitive motion, such as exercising.

Structure data 242 includes structural information about objects that may be tracked. For example, a skeletal model of a human may be stored to help understand movements of the user and recognize body parts. Structural information about inanimate objects may also be stored to help recognize those objects and help understand movement.

Gestures library 240 may include a collection of gesture filters, each comprising information concerning a gesture that may be performed by the skeletal model (as the user moves). The data captured by the cameras 226, 228 and the capture device 120 in the form of the skeletal model and movements associated with it may be compared to the gesture filters in the gesture library 240 to identify when a user (as represented by the skeletal model) has performed one or more gestures. Those gestures may be associated with poses associated with an exercise.

The gestures library 240 may be used with techniques other than skeletal tracking. An example of such other techniques includes image segmentation techniques. FIGS. 18-29 provide details of embodiments of image segmentation techniques. However, other image segmentation techniques could be used.

In one embodiment, gestures may be associated with various exercises that a user performs. For example, the gestures could be poses or movements performed during an exercise. For example, there may be three poses associated with a push-up: a prone (e.g., face down) position, an up position with arms extended, and a low prone position. The system may look for this sequence to determine whether a user performed a push-up.

In one embodiment, gestures may be associated with various controls of an application. Thus, the computing system 112 may use the gestures library 240 to interpret movements of the skeletal model and to control application 246 based on the movements. As such, gestures library may be used by runtime engine 244 and application 246.

Application 246 can be a fitness program, video game, productivity application, etc. In one embodiment, runtime engine 244 will report to application 246 an identification of each object detected and the location of the object for each frame. Application 246 will use that information to update the position or movement of an avatar or other images in the display.

Runtime Engine

Some conventional tracking techniques rely on a single or a few techniques to recognize gestures and/or poses. One example of gesture is a user throwing a punch. For example, a conventional system might look at the position of limbs and/or the angles between limbs. The system may look for the user's hand/fist being slightly out from the body, followed by the hand/fist being fully extended from the body to detect that the user through a punch. As long as the joint angles fit within a range of angles, this could indicate that the left arm was held up. A conventional pose matching system may string multiple poses together. For example, if system determined that the user's hand was close to the body followed by the user's hand extended away from the body, the system would assume that the user performed a punch.

However, such conventional techniques may not be adequate for tracking and evaluating user motions for applications including, but not limited to, monitoring and evaluating a user who is exercising. Such systems may track and evaluate a wide range of user motions. In some cases, the variety of motions that are tracked may lead to a need to apply different techniques. For example, for the system to track and evaluate an inline lunge, the system may need to track the form, as well as to track how the user moves through space. For the system to track and evaluate a push-up, the system may need to track the form, as well as to track the tempo. However, the way the user moves through space may not be as important for tracking and evaluating a push-up. The type of analysis that the system performs depends on what motion (e.g., exercise) the user is performing, in one embodiment.

One way to evaluate the user's performance of the motion is to track a parameter such as their center of mass. The system may track how the center of mass moves through space in order to evaluate how they performed a given motion.

Figure 3A:
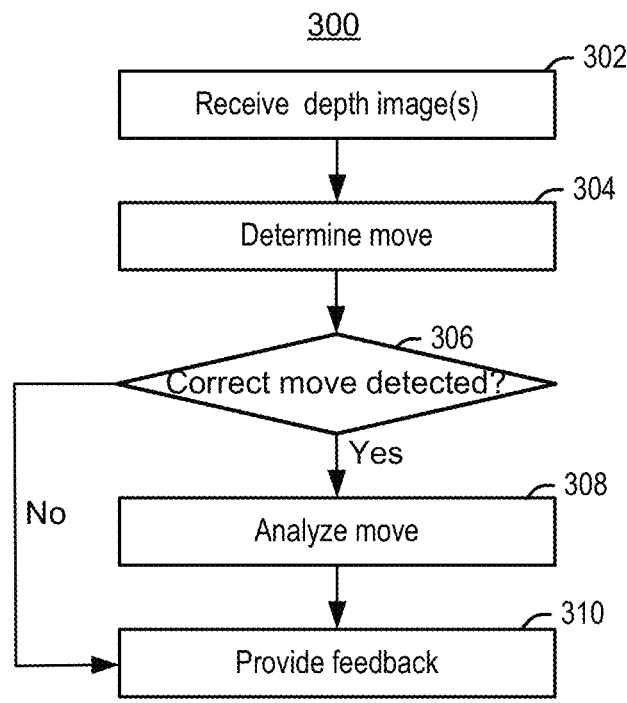
FIG. 3A is a flowchart of one embodiment of a process of analyzing user motion.

FIG. 3A is a flowchart of one embodiment of a process 300 of analyzing user motion. The process 300 may be practiced in a system such as FIGS. 1A, 1B, and/or 2. In one embodiment, steps of process 300 are performed by runtime engine 244. In one embodiment, process 300 analyzes a gesture that includes a string of poses. This gesture could be a physical exercise, such as a sit-up, push-up etc. However, the gesture is not limited to a physical exercise.

In one embodiment, the process 300 is used to provide feedback to a user who is exercising, or performing some other gesture. System 100 may execute an application that guides the user through at fitness routine. The application may instruct the user to perform an exercise, such as to perform a "push-up," sit-up," "squat," etc.

In step 302, depth image(s) are received. In one embodiment, capture device 120 provides the depth image to computing system 112. The depth image may be processed to generate skeletal tracking data, as well as image segmentation data.

In step 304, a move is determined. This move may be defined by a series of poses. For example, a push-up is one example of a move. The move may include a series of poses. The move may also be referred to as a gesture. In one embodiment, runtime engine 244 determines what move the user made by analyzing the depth image(s). The term "analyzing the depth image" is meant to include analyzing data derived from the depth image such as, but not limited to, skeletal tracking data and image segmentation data. In step 306, a determination is made whether the user made the correct move. As one example, the system 100 determines whether the user performed a push-up. If not, the system 100 may provide the user with feedback at step 310 that the correct move was not detected. In one embodiment, a depth recognizer (FIG. 3B, 358) and/or a move recognizer (FIG. 3B, 360) is used to analyze and whether the user made the correct move. The depth recognizer 358 and move recognizer 360 are discussed below.

Assuming the correct move was made, the move is analyzed in step 308. As one example, the system 100 determines how good the user's form was when performing a "push-up," or some other exercise. In one embodiment, the system 100 compares one repetition of an exercise to others to determine variations. Thus, the system 100 is able to determine whether the user's form is changing, which may indicate fatigue.

In one embodiment, the runtime engine 244 has positional analysis (FIG. 3B, 364) time/motion analysis (FIG. 3B, 366) and depth analysis (FIG. 3B, 368) to analyze the user's performance. The positional analysis 364, time/motion analysis 366, and depth analysis 368 are discussed below.

In step 310, the system 100 provides feedback based on the analysis of the move. For example, the system 100 may inform the user that when performing an exercise the user's position/movement was not symmetrical. As a particular example, the system 100 may inform the user that their weight was too much on the front portion of their feet.

FIG. 3B is a diagram of one embodiment of a runtime engine 244. The runtime engine 244 may be used to implement process 300. The runtime engine 244 may input both live image data 354, as well as replay image data 352. The live image data 354 and the replay image data 352 may each include RGB data, depth data, and skeletal tracking (ST) data. In one embodiment, the ST data is generated by the skeletal recognition engine 192.

The skeletal tracking (ST) data may be put through ST filters, ST normalization, and/or ST constraints 356. The ST filters may smooth out noisy (e.g., jittery) joint positions. Examples of the filters include, but are not limited to, temporal filters, exponential filters, and Kalman filters. The ST normalization may keep parameters such as limb length consistent over time. This may be referred to as bone length normalization. The ST constraints may make adjustments to the skeletal data to correct for anatomically impossible positions. For example, the system 100 may have a range of angles that are permitted for a particular joint, such that if the angle is outside of that range it is adjusted to fall within a permitted angle. The filters can help improve accuracy for later in the runtime engine. In one embodiment, the skeletal recognition engine 192 contains the ST filters, ST normalization, and/or ST constraints 356.

Box 356 also includes depth data and image segmentation data. In one embodiment, the depth data is characterized by a z-value for each pixel in a depth image. Each pixel may be associated with an x-position and a y-position. The image segmentation data may be derived from the depth data.

Following a segmentation process, each pixel in the depth image can have a segmentation value associated with it. The pixel location can be indicated by an x-position value (i.e., a horizontal value) and a y-position value (i.e., a vertical value). The pixel depth can be indicated by a z-position value (also referred to as a depth value), which is indicative of a distance between the capture device (e.g., 120) used to obtain the depth image and the portion of the user (or player) represented by the pixel. The segmentation value is used to indicate whether a pixel corresponds to a specific user, or does not correspond to a user. Segmentation is further discussed in connection with FIG. 4A. Depth image segmentation is also discussed in connection with FIG. 18. In one embodiment, box 356 is implemented in part with depth image segmentation 1852 of FIG. 18.

The depth recognizer 358 and the move recognizer 360 may each perform gesture and pose recognition. The depth recognizer 358 and the move recognizer 360 are two examples of "pose recognizers." The depth recognizer 358 and the move recognizer 360 may each be used to determine whether the user has performed the correct move by, for example, recognizing a series of poses. For example, they may be used to determine whether the user has performed a push-up, sit-up, etc. The depth recognizer 358 and the move recognizer 360 do not necessarily evaluate how well the user has performed the motion. However, the depth recognizer 358 and/or the move recognizer 360 could perform some analysis of how well the user has performed the motion. For example, the depth recognizer 358 and/or the move recognizer 360 could perform some analysis of which body parts are out of position.

Techniques that may work well to perform gesture and pose recognition when the user is standing may not work as well when the user is on the floor. In one embodiment, the system 100 determines whether to use the depth recognizer 358 and/or the move recognizer 360 depending on the location of the user relative to the floor. For example, the system 100 may use the move recognizer 360 when the person is standing and throwing a punch, but use the depth recognizer 358 when the user is performing a push-up.

The move recognizer 360 may perform gesture and pose recognition primarily when the user is not on the floor. The move recognizer 360 may rely more on the skeletal data than pure depth image data. In one embodiment, the move recognizer 360 examines angle, position and rotation of ST joints relative to each other and body. In one embodiment, the move recognizer 360 examines angle and rotation of the user's spine. This may include lateral flexion.

As noted, the move recognizer 360 and/or the depth recognizer 358 may be used to determine whether the user has performed the correct move (represented by test 362). In one embodiment, the system 100 determines whether the user has performed a set of poses. For example, for a push-up the system 100 look for poses that correspond to different positions of a push-up. An example of three poses for a push-up are those that correspond to the user starting low to the ground in a prone (e.g., face down) position, then extended their arms to the up position, and then returned to the low position. In this example, the depth recognizer might be used to determine whether the user did a push-up, as the user is on (or near) the floor.

The system 100 might use either the depth recognizer 358 or the move recognizer 360 for some poses. The system 100 might use both the depth recognizer 358 and the move recognizer 360 to determine whether the user performed other poses. This provides for great flexibility and accuracy in recognizing poses.

Positional analysis 364, time/motion analysis 366, and/or depth analysis 368 may be used to evaluate the user's form, assuming that the system 100 determined that the user performed the correct motion.

Positional analysis 364 may evaluate the user's form based on the position of body parts at one point in time. In one embodiment, positional analysis 364 compares the position of body parts and/or joint positions relative to each other and/or to the floor. As one example, positional analysis 364 may be used to determine if the user's hips in the correct location relative to the feet for the current exercise.

Time/motion analysis 366 may evaluate the user's form based on the position body parts over time. In one embodiment, time/motion analysis 366 looks at the positional analysis over multiple frames to ensure that user's form was correct. This may be used to determine how the user moved through space over time. As one example, time/motion analysis 366 may be used to determine if the user's knees buckled during a squat.

Time/motion analysis 366 may look for a tempo, such as how quickly the user is moving. For example, some motions may have a characteristic 2-1-2 tempo, which refers to the relative length of time to perform different segments of a motion. For example, a push-up may tend to be characterized by 2 time units going up, 1 time unit stationary at the top, and 2 more time units going back down.

Time/motion analysis 366 may also examine a curve of how the user moved over time. In one embodiment, the system determines a parameter such as the user's center of mass. This position of this parameter may be tracked over time. The system 100 then assesses the user's form by analyzing the shape of the curve. Many other parameters could be tracked.

Depth analysis 368 may rely on depth image data when skeletal tracking data is not available or may not be adequate. As one example, the depth analysis 368 may be used when the user is on the floor for at least a portion of the exercise. When the user is on the floor, it may be difficult to generate ST data.

The assessment 372 provides feedback to the user regarding their performance of the motion. For example, the feedback may be that the user's back and legs did not form a straight line when preforming a push-up, or the user's right knee did not move in the proper line when performing an in-line lunge, which may indicate a pronation problem. The user may be given further feedback of how to correct the problem, such as to keep their core muscles tighter. The further feedback could be a warning that the user may have a weakness in their right knee or leg, etc.

Workout plan 374, server/DB 376, and additional feedback 378 are also depicted. The workout plan 374 may provide a user with a detailed workout that is recommended to follow, in view of the assessment of the user's performance, as well as other factors such as the user's goals, age, etc.

The server DB 376 is used for storage of player feedback, performance and results. This data can be then used to analyze and report on progress (or lack of progress) over time and feed back into the workout plan 374 or even provide more nuance to the feedback given to the user. For example, if the runtime engine 244 knows that the user is having trouble with lunges over multiple sessions but is now showing a big improvement, then the feedback could be something along the lines of "great work, I've really seen improvement over time". This same data/telemetry could be used by the application developer to determine which exercises are too hard, or if the gestures are too strict and people are not being detected correctly.

The additional feedback 378 may be used to generate feedback over time, for achievements or challenges, for leaderboard comparison with other players, etc.

New modules that implement new techniques for performing analysis of the user's motion may be added to the runtime engine without having to change the way that other motions are analyzed. For example, let's say that after the runtime engine 244 has been configured to evaluate 100 different exercises that a few more exercises are desired for analysis. It may be that new tools may be desirable for analyzing the new exercises. A new tool can easily be added to the modular design of the runtime engine without affecting how the other exercises are analyzed. This greatly simplifies the design, testing, and development of the runtime engine.

Figure 3C:
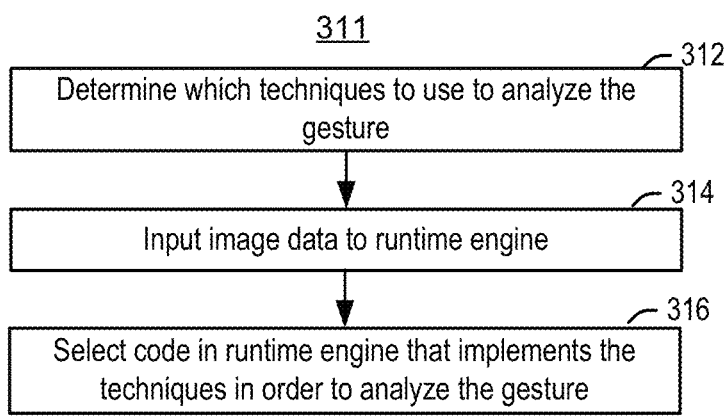
FIG. 3C is a flowchart of one embodiment of a process of selecting code in the runtime engine based on what motion is being analyzed.

FIG. 3C is a flowchart of one embodiment of a process 311 of selecting code in the runtime engine 244 based on what gesture (e.g., what physical exercise) is being analyzed. In step 312, a determination is made as to what techniques should be used to analyze the gesture. In one embodiment, the runtime engine 244 has access to stored information that defines what code should be executed (e.g., what instructions should be executed on a processor) given the exercise that the user is asked to perform. Note that step 312 may make this determination based on a particular pose within a gesture. Thus, different poses of a given gesture may be analyzed using different techniques.

In one embodiment, the runtime engine 244 accesses a description of the gesture from the gesture database 240 to determine what techniques should be used. The description of the gesture may include a series of poses for the gesture. Each of the poses can state what recognizers 358, 360 or computations should be used to recognize or analyze that pose. The computations can be different computations within the positional analysis 364, time/motion analysis 366, and depth analysis 368. The computations can also be different computations within the depth recognizer 358 and move recognizer 360. Thus, the technique that is used to recognize and/or analyze the gesture can be tailored to the particular gesture.

In one embodiment, step 312 includes determining what technique to use to determine whether the user is performing the correct move. This may include determining whether to use a first pose recognizer (e.g., depth recognizer 358) in the runtime engine 244 that detect moves based on skeletal tracking data or a second pose recognizer (e.g., move recognizer 360) in the runtime engine 244 that detect moves based on image segmentation data. This determination may be made based on the location of the person relative to the floor. For example, a technique that uses skeletal tracking data may be used if the particular physical exercise is performed with the person primarily standing. However, a technique that uses image segmentation data may be used if the particular physical exercise is performed with the person primarily on the floor.

In one embodiment, step 312 includes determining which computations to use to perform a time/motion analysis in the runtime engine 244 based on the particular exercise that is being analyzed by the runtime engine. For example, the code within the positional analysis module 364 may be selected such that a desired technique for analyzing the user's motion is employed based on what physical exercise is being performed.

In one embodiment, step 312 includes determining which computations to use to perform a time/motion analysis in the runtime engine 244 based on the particular exercise that is being analyzed by the runtime engine. For example, the code within the time/motion analysis module 366 may be selected such that a desired technique for analyzing the user's motion is employed based on what physical exercise is being performed.

In one embodiment, step 312 includes determining which computations to use to perform a depth analysis in the runtime engine 244 based on the particular exercise that is being analyzed by the runtime engine. For example, the code within the depth analysis module 368 may be selected such that a desired technique for analyzing the user's motion is employed based on what physical exercise is being performed.

In one embodiment, step 312 includes determining whether to use computations that use skeletal tracking data or computations that use image segmentation data to perform an analysis of the gesture. For example, the system might select techniques that perform positional and/or time/motion analysis using depth analysis 368 versus, as opposed to using techniques that use skeletal tracking data.

In step 314, depth image data is input to the runtime engine 244. The depth image data may include a depth value for each pixel in the depth image. The depth image data may be processed to generate skeletal tracking data, as well as image segmentation data.

In step 316, the runtime engine 244 executes code that implements the selected techniques. The runtime engine 244 has code for implementing different techniques to analyze gestures, in one embodiment. Different code may be selected to implement different techniques for analyzing the user's motion. As one example, the runtime engine 244 might use the depth recognizer 358 if the exercise is one such as a push-up or sit-up in which the user is on (or close to) the floor. However, the runtime engine 244 might use the move recognizer 360 if the exercise is one such as an inline lunge that is off from the floor. Thus, step 316 may include executing different portions of code within the runtime engine 244 to analyze different exercises.

Note that various techniques can be mixed. For example, when analyzing the user's performance, a computation technique that uses skeletal tracking data can be used with a computation technique that uses image segmentation data. FIGS. 3D-3H provide further details of embodiments of the depth recognizer 358, the move recognizer 360, the positional analysis 364, the time/motion analysis 366 and the depth analysis 368. In step 316, the system 100 may select which of these modules to use and/or what computations to use within these modules, based on the gesture (e.g., physical exercise) that is being analyzed.

Figure 3D:
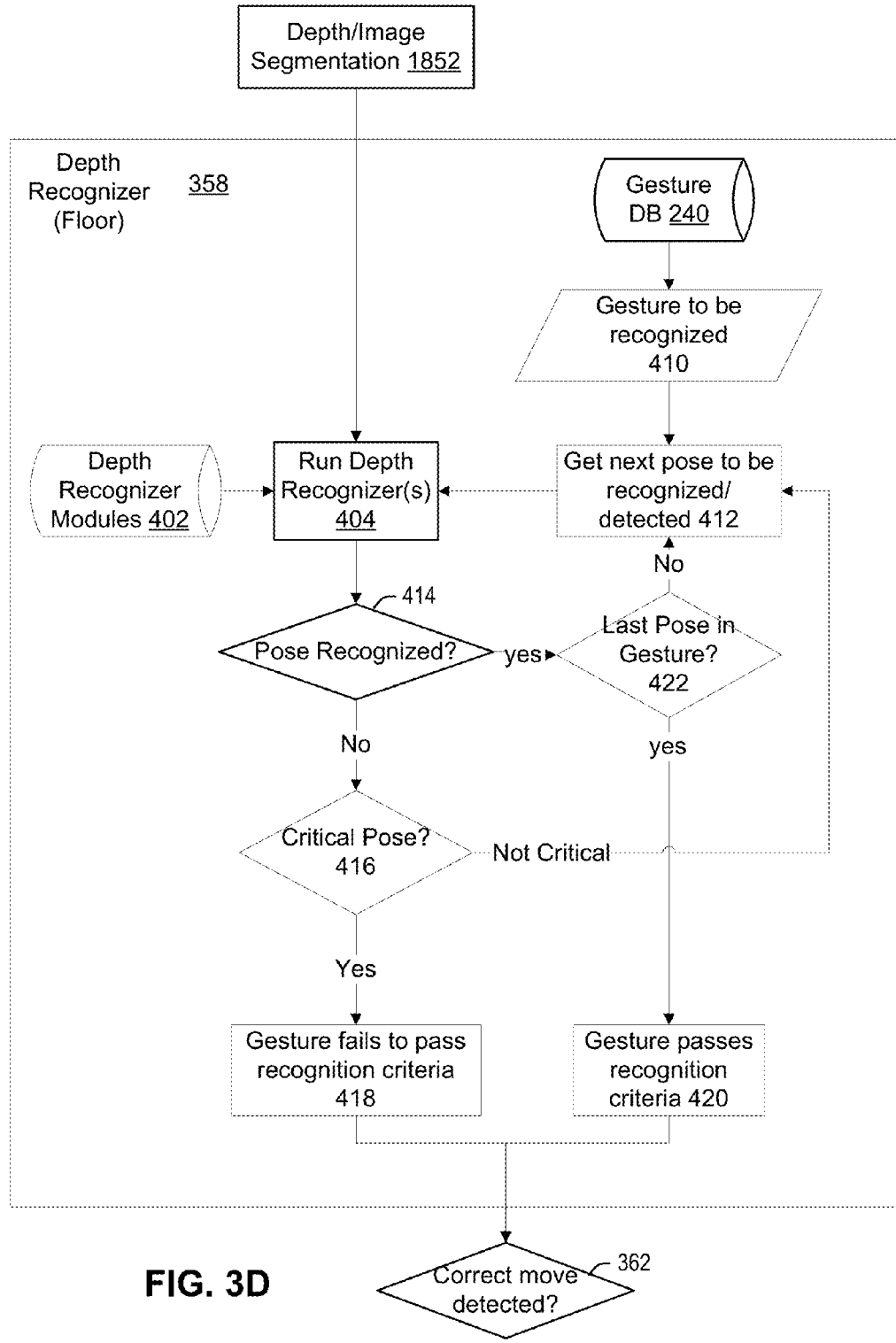
FIG. 3D is a diagram showing further details of one embodiment of the depth recognizer of a runtime engine.

FIG. 3D is a diagram showing further details of one embodiment of the depth recognizer 358 of a runtime engine 244. The depth recognizer 358 has as input the depth/image segmentation. The depth/image segmentation was discussed in connection with box 356 of FIG. 3B. In one embodiment, depth image segmentation information is obtained from one or more of the modules in the runtime engine of FIG. 18. As one example, the depth image segmentation 1852 may provide input to the depth recognizer 358. Other modules in FIG. 18 could also provide input to the depth recognizer 358.

The depth recognizer 358 also has access to the gesture database 240. This is a database of all the gestures active or available. In one embodiment, a gesture is made up of a number of states that include a start pose, an end pose, and a number of intermediate poses. Each state has an associated pose. For each state, in addition to a pose, the state node contains the list of recognizers (e.g., 358, 360), analysis modules (e.g., 364, 366, 368), and/or computations (e.g., code within 358, 360, 364, 366, 368) that are used to recognize and/or analyze the pose. The state node may also contain the feedback filters types (and associated data). Feedback filters are discussed below with respect to FIGS. 3F-3H. A pose does not necessarily have to be static.

The depth recognizer 358 has depth recognizer modules 402, which are run (step 404) using the depth/image segmentation as input. These are the algorithms, libraries and computations used to recognize the pose, to determine whether the user position or movement matches the data stored in the gesture pose node.

A variety of different techniques can be used by the depth recognizer modules 402. Those techniques include, but are not limited to, depth based center of mass (e.g., FIG. 12, 254), depth-based inertia tensor (e.g., FIG. 12, 256), depth buffer based quadrant center of mass computation (e.g., FIG. 13B), depth buffer based body angle bend via top-of-silhouette curve fitting (e.g., FIG. 18, 1854, 1856, 1858), side/front blob determination, floor removal technique for removing near-floor points from depth buffer to eliminate silhouette bleed-out into the ground. In one embodiment, the runtime engine 244 determines which of these techniques to use based on what gesture is being analyzed. This is one example of selecting a computation to perform based on the gesture is being analyzed. Thus, step 312 of FIG. 3C may include selecting one of these computations based on the gesture being analyzed.

The depth recognizer 358 executes the depth recognizer modules 402 in step 404 to determine whether the various moves are recognized. The following discussion will be for an embodiment in which the moves are a particular physical exercise (e.g., sit up, push-up, lunge, etc.). However, the depth recognizer 358 may be used to recognize moves other than physical exercises.

If a pose is recognized (step 414), then control passes to step 422 to determine if this is the last pose for this physical exercise. If it is, then the gesture passes recognition criteria (step 420). If this is not the last pose (step 422=no), then control passes to step 412 to get the next pose to be recognized/detected. This may be obtained from the gesture database 240 in step 410. Control then passes to step 404 to once again execute the recognizer modules 402.

If a pose is not recognized (step 414=no), then a determination is made whether the pose is critical (step 416). If the pose is not critical, then control passes to step 412 to obtain the next pose to be recognized for this physical exercise. If the pose is critical (step 416=yes), then control passes to step 418 to record that the gesture fails to pass recognition criteria.

An output of the depth recognizer 358 is whether or not the correct move is detected, represented by decision box 362.

Figure 3E:
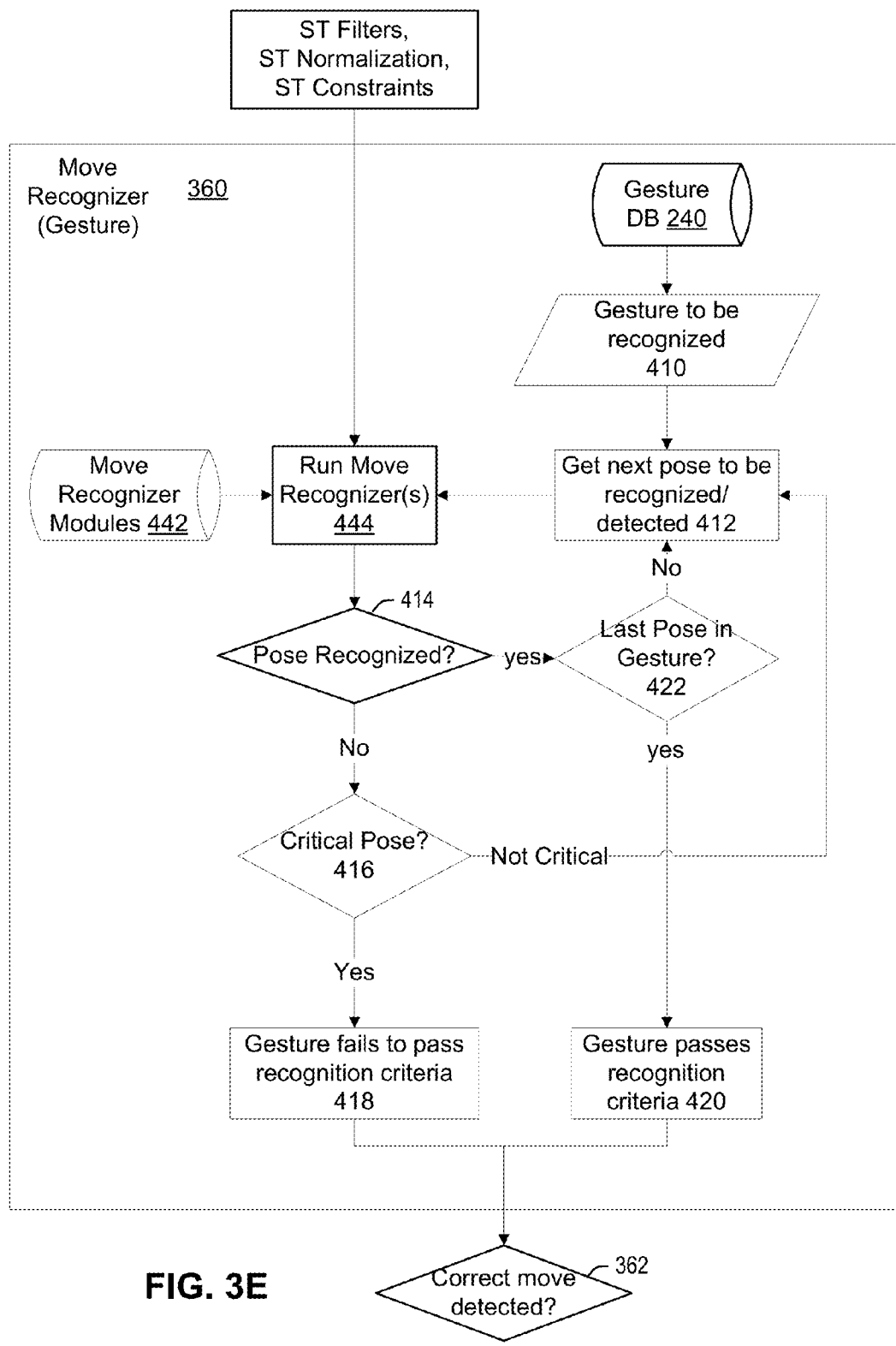
FIG. 3E is a diagram showing further details of one embodiment of the move recognizer of a runtime engine.
Figure 5A:
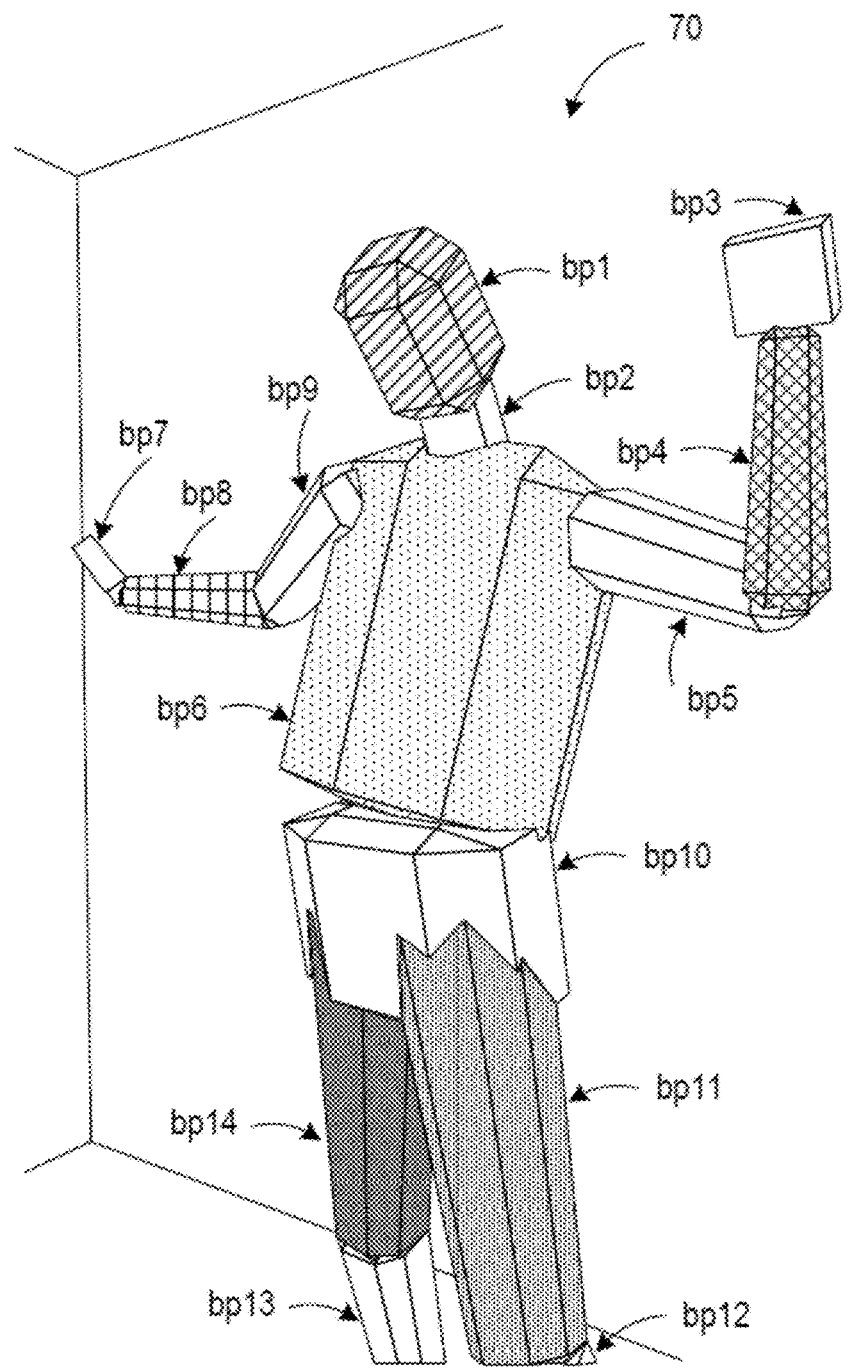
FIG. 5A shows a non-limiting visual representation of an example body model generated by skeletal recognition engine.
Figures 5B, 5C:
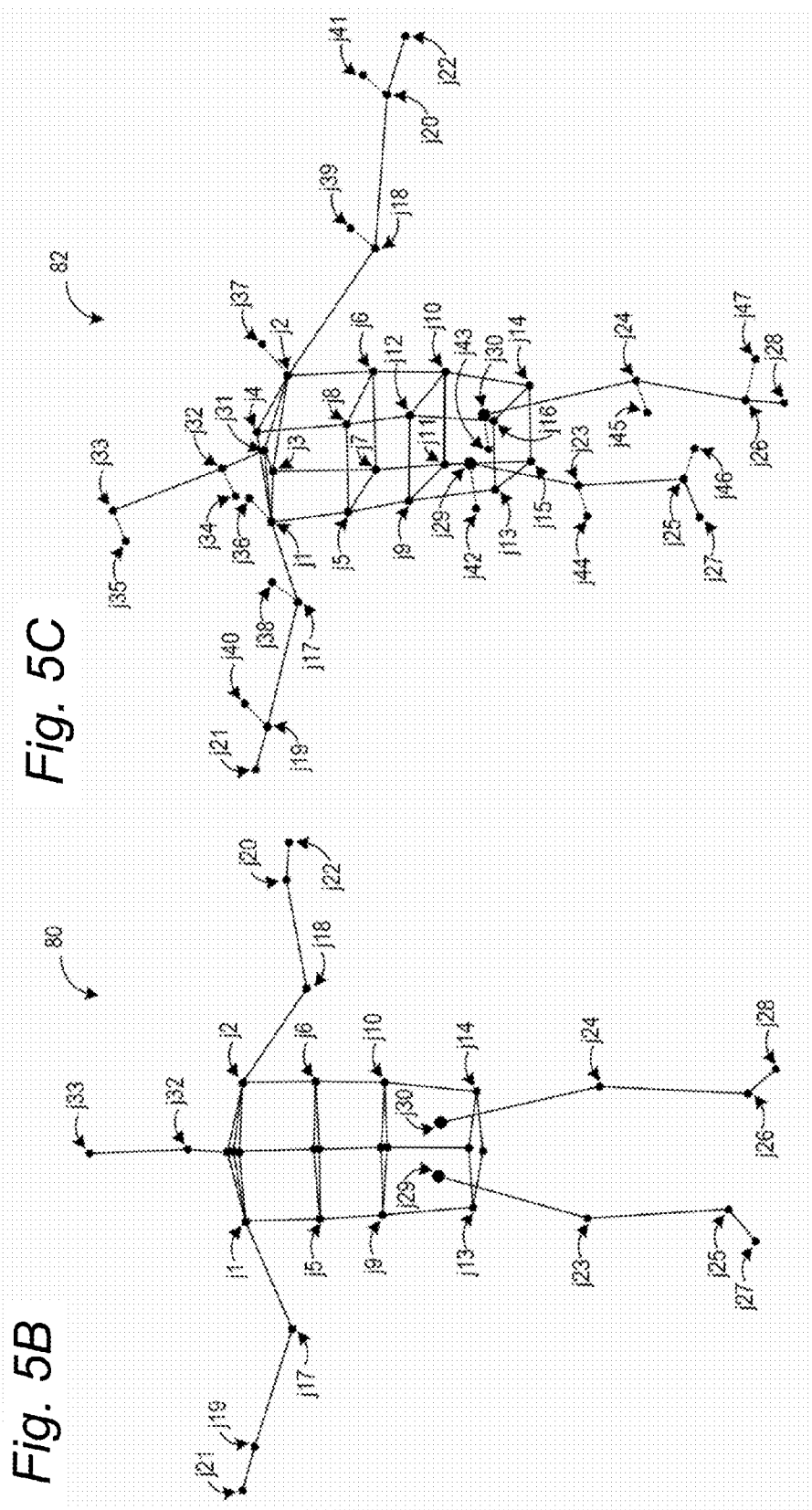
FIG. 5B shows a skeletal model as viewed from the front.
FIG. 5C shows a skeletal model as viewed from a skewed view.

FIG. 3E is a diagram showing further details of one embodiment of the move recognizer 360 of a runtime engine 244. The move recognizer 360 has as input ST filters, ST normalization, and ST constraints. This may also be referred to as skeletal tracking information. FIG. 5A-5C, discussed below, provide further details of one embodiment of generating skeletal tracking information. The move recognizer 360 also has access to the gesture database 240.

The move recognizer 360 includes move recognizer modules 442. These are the algorithms, libraries and computations used to recognize the pose, to determine whether the user position or movement matches the data stored in the gesture pose node. A variety of different techniques can be used by the move recognizer modules 442. Those techniques include, but are not limited to, ST joint position and rotation comparison with threshold ranges, body model-based center-of-mass and inertia tensor computation (e.g., FIG. 6A, 650), body model-based foot force computation, using center-of-mass state vector (e.g., FIG. 8A), muscle force/torque computation using body-wide impulse-based constraint solve (e.g., FIG. 8B), exercise repetition spotting and rough bracketing (e.g., FIG. 9A), curve fitting to repetitions to determine repetition timings (e.g., FIG. 10A), DSP Autocorrelation and signal subtraction to identify repetition-to-repetition tempo and rep-to-rep similarity (e.g., FIG. 11A). In one embodiment, the runtime engine 244 determines which of these techniques to use based on what gesture is being analyzed. This is one example of selecting a computation to perform based on the gesture is being analyzed. Thus, step 312 of FIG. 3C may include selecting one of these computations based on the gesture being analyzed.

The move recognizer 360 executes the move recognizer modules 442 in step 444 to determine whether the various moves are recognized. The following discussion will be for an embodiment in which the moves are a particular physical exercise (e.g., sit up, push-up, lunge, etc.). However, the move recognizer 360 may be used to recognize moves other than physical exercises.

If a pose is recognized (step 414), then control passes to step 422 to determine if this is the last pose for this physical exercise. If it is, then the gesture passes recognition criteria (step 420). If this is not the last pose (step 422=no), then control passes to step 412 to get the next pose to be recognized/detected. This may be obtained from the gesture database 240 in step 410. Control then passes to step 404 to once again execute the recognizer.

If a pose is not recognized (step 414=no), then a determination is made whether the pose is critical (step 416). If the pose is not critical, then control passes to step 412 to obtain the next pose to be recognized for this physical exercise. If the pose is critical (step 416=yes), then control passes to step 418 to record that the gesture fails to pass recognition criteria.

An output of the move recognizer 360 is whether or not the correct move is detected, represented by decision box 362.

Figure 3F:
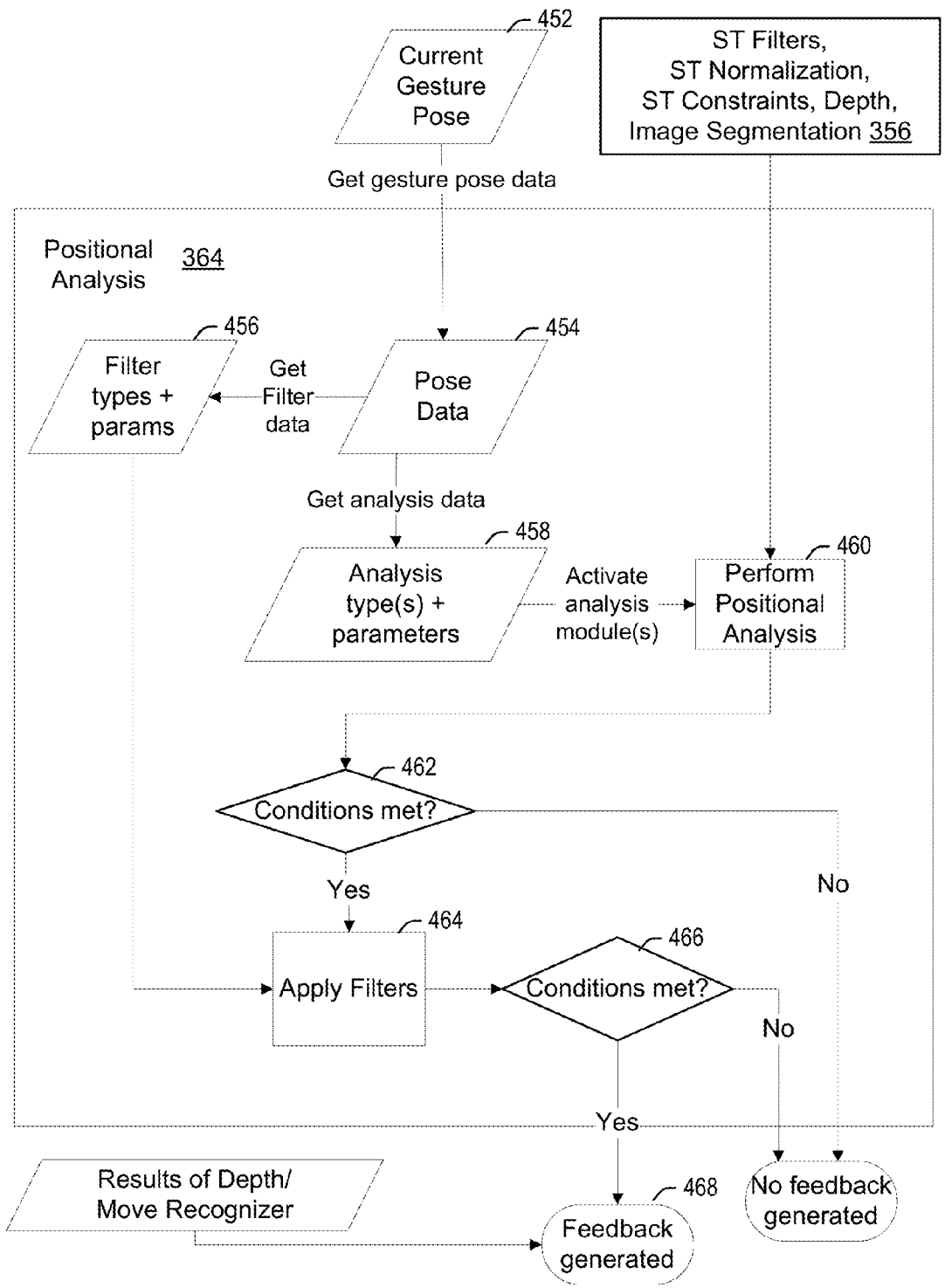
FIG. 3F is a diagram showing further details of one embodiment of the position analysis of a runtime engine.

FIG. 3F is a diagram showing further details of one embodiment of the position analysis 364 of a runtime engine 244. The position analysis 364 has as input ST filters, ST normalization, ST constraints, and depth/image segmentation 356, which was discussed in connection with box 356 of FIG. 3B.

Also input is the current gesture pose 452. The current gesture pose 452 refers to one of the gestures or poses, which may be obtained from the gesture database 240. The gesture may provide list of feedback cases to be detected, along with identifying which computations to use for analysis and the parameters to be fed to these computations to trigger them. As noted above, the gesture may be made up of a number of states that include a start pose, an end pose, and a number of intermediate poses. Each state may have an associated pose. For each state, in addition to a pose, the state node may contain the list of feedback filters types (and associated data) and feedback analysis types.

After obtaining the pose data (step 454), filter data is accessed (step 456). As noted, this filter data may be specified in the gesture data. In step 458, the type of analyses to be performed, as well as relevant parameters is determined Again, the gesture data may specify the feedback analysis type.

In step 460, positional analysis is performed. Examples of positional analysis include, but are not limited to, were the limbs and body in certain position within a certain threshold, were the hands on the hips, were the hands within a certain distance of the hips, were joints are a certain range of angles, etc.

Figure 6A:
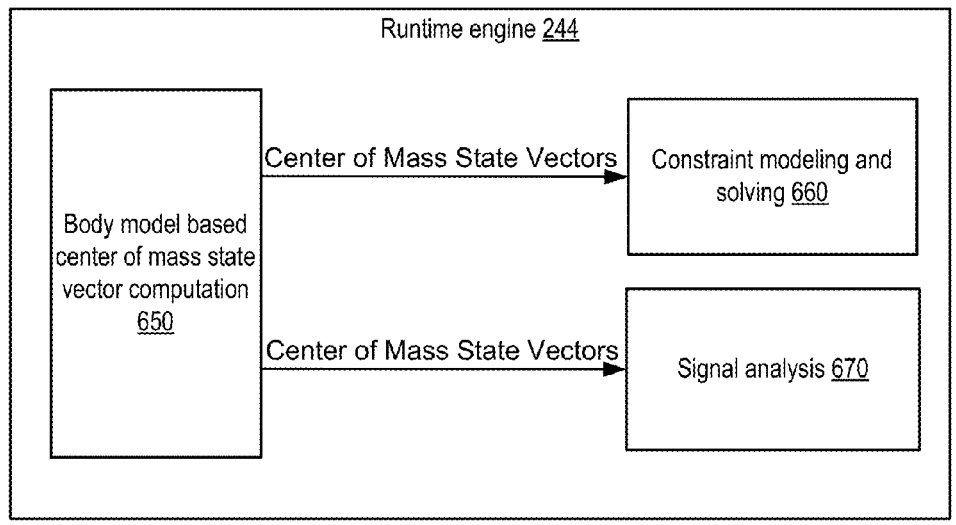
FIG. 6A is a diagram of one embodiment of the runtime engine.
Figure 8A:
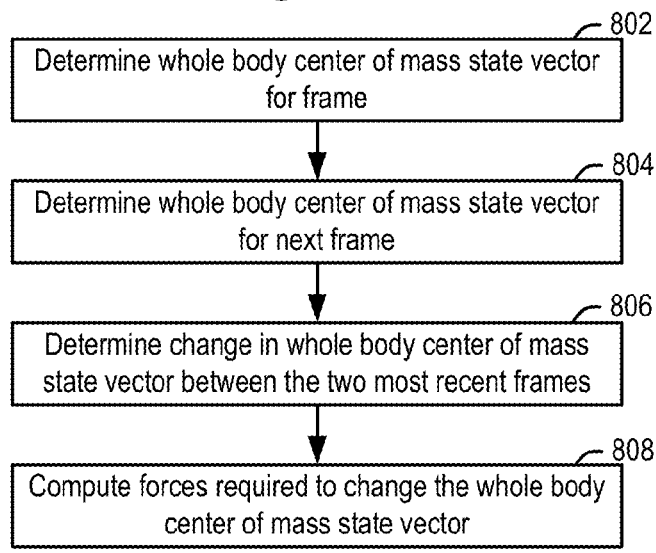
FIG. 8A is a flowchart of one embodiment of determining a force that would be needed to causes a change in the center of mass state vector.

Techniques that may be used in step 460 include, but are not limited to, but are not limited to, ST joint position and rotation comparison with threshold ranges, body model-based center-of-mass and inertia tensor computation (e.g., FIG. 6A, 650), body model-based foot force computation, using center-of-mass state vector (e.g., FIG. 6A, 660; FIG. 8A), exercise repetition spotting and rough bracketing (e.g., FIG. 9A), and curve fitting to repetitions to determine repetition timings (e.g., FIG. 10A). In one embodiment, the runtime engine 244 determines which of these techniques to use based on what gesture is being analyzed. This is one example of selecting a computation to perform based on the gesture is being analyzed. Thus, step 312 of FIG. 3C may include selecting one of these computations based on the gesture being analyzed.

Step 460 determines whether conditions are met (step 462). If conditions for a feedback case are met, there is an option for further filtering (step 464) to weed out feedback that may be generated by a false positive, requires a higher degree of accuracy, or is simply deemed something that should only trigger in very specific cases. Some examples of filters are: only give feedback to user if the system 100 saw the feedback case trigger <x> times out of <y> gestures, if the system 100 saw the same feedback case trigger <x> times in a row, etc.

If step 466 determines that feedback is to be generated, after applying the feedback, then feedback is generated (step 468). Feedback to the user is a key part of detecting gestures. The feedback may be provided for any type of experience (e.g., physical fitness, sports, action games, etc.). In addition to determining if the user had successfully performed a gesture, the system also provides feedback to the user. This might be a simple as positive reinforcement ("Great Job!", "Perfect swing!"), or more complex form correction feedback ("hands on your hips," "you are leaning too far forward," "try swing your arm higher to hit the ball," or "you need to squat lower"). Negative feedback can also be generated ("you did not complete the pushup," "your tempo is too slow," "too much power in your putt," etc.).

The results of the depth recognizer 358 and/or move recognizer 360 may be used to help generate the feedback. Note that these results are not limited to whether or not the user performed the correct move. Rather, the depth recognizer 358 and/or move recognizer 360 may provide results that helps inform the feedback including, but not limited to, the examples of the previous paragraph.

Figure 3G:
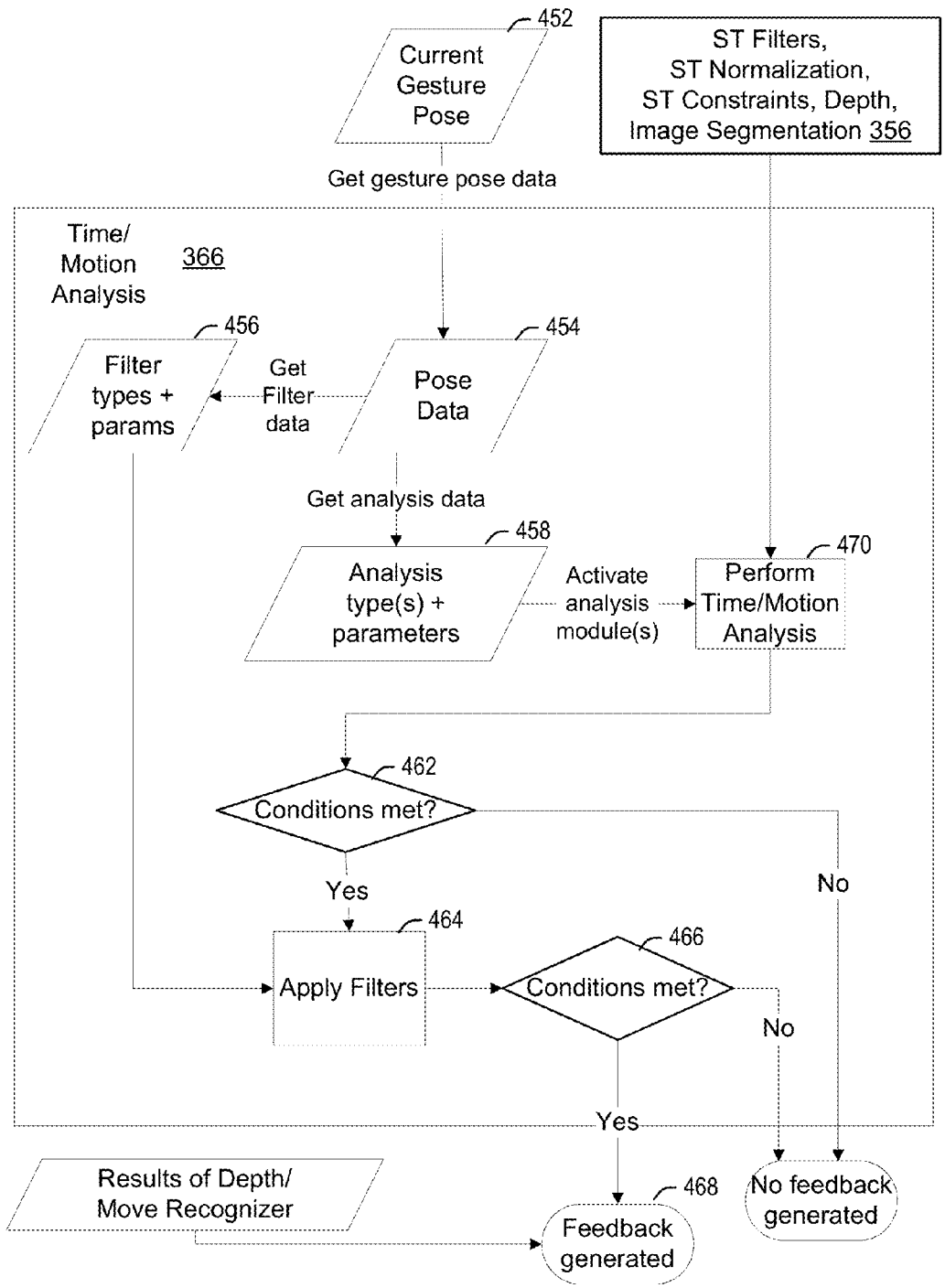
FIG. 3G is a diagram showing further details of one embodiment of the time/motion analysis of a runtime engine.

FIG. 3G is a diagram showing further details of one embodiment of the time/motion analysis 366 of a runtime engine 244. The time/motion analysis 366 has as input ST filters, ST normalization, ST constraints, depth/image segmentation 356. Since some elements of the time/motion analysis 366 are similar to those of the positional analysis 364, they will not be discussed in detail.

Also input to the time/motion analysis 366 is the current gesture pose 452. After obtaining the pose data (step 454), filter data is accessed (step 456).

In step 470, time/motion analysis is performed. Analysis may be tempo based (e.g., did the user hit or hold a pose at a certain cadence or long enough?), movement based (e.g., understanding that the way the hips and knees move during a particular gesture might indicate a pronation when is not desired). Other types of time/motion analysis may be performed.

Figure 11A:
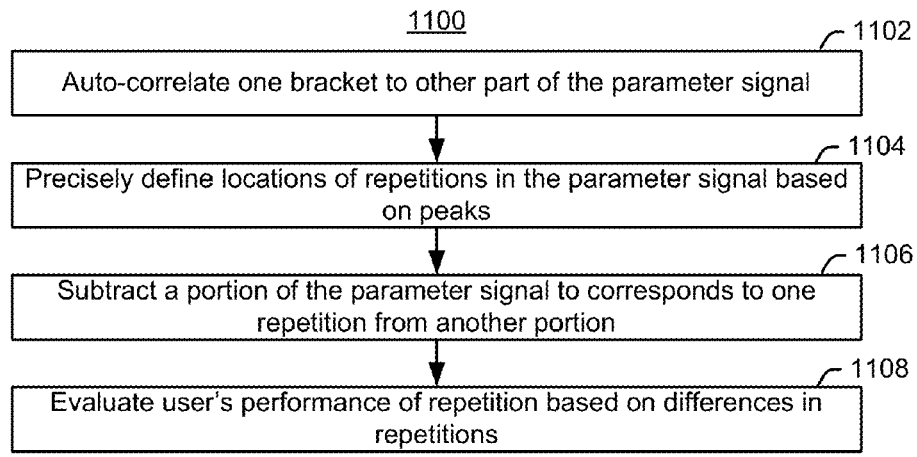
FIG. 11A is a flowchart of one embodiment of a process for using signal processing to analyze a parameter signal.

Techniques that may be used in step 470 include, but are not limited to, body model-based foot force computation, using center-of-mass state vector (e.g., FIG. 8A), muscle force/torque computation using body-wide impulse-based constraint solve (e.g., FIG. 8B), DSP Autocorrelation and signal subtraction to identify repetition-to-repetition tempo and repetition-to-repetition similarity (e.g., FIG. 11A). In one embodiment, the runtime engine 244 determines which of these techniques to use based on what gesture is being analyzed. This is one example of selecting a computation to perform based on the gesture is being analyzed.

Step 470 determines whether conditions are met (step 462). If conditions for a feedback case are met, there is an option for further filtering (step 464) to weed out feedback that may be generated by a false positive, requires a higher degree of accuracy, or is simply deemed something that should only trigger in very specific cases.

If step 466 determines that feedback is to be generated, after applying the feedback, then feedback is generated (step 468). The results of the depth recognizer 358 and/or move recognizer 360 may be used to help generate the feedback.

Figure 3H:
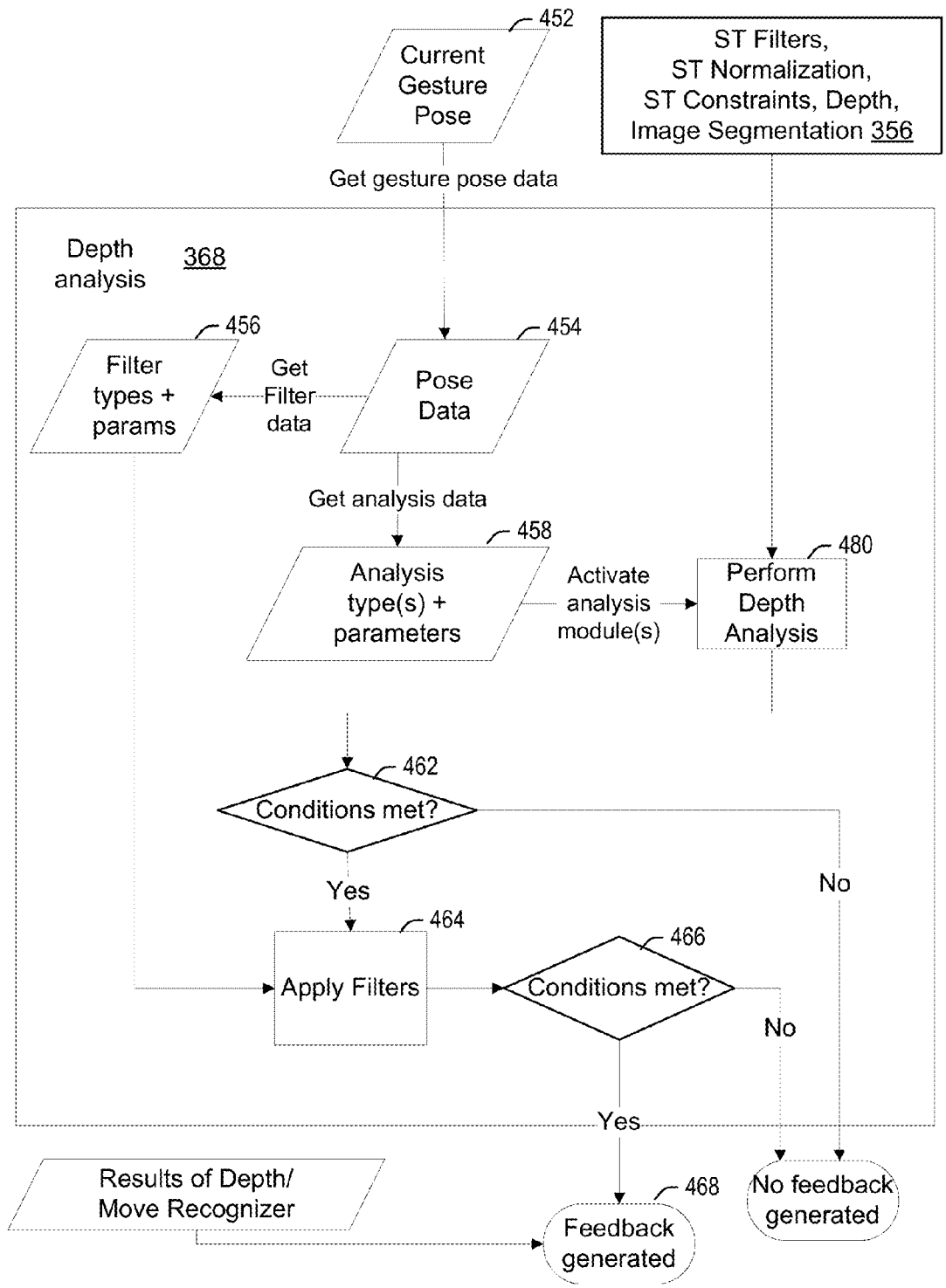
FIG. 3H is a diagram showing further details of one embodiment of the depth analysis of a runtime engine.

FIG. 3H is a diagram showing further details of one embodiment of the depth analysis 368 of a runtime engine 244. The depth analysis 368 has as input ST filters, ST normalization, ST constraints, depth/image segmentation 356. Since some elements of the depth analysis 368 are similar to those of the positional analysis 364, they will not be discussed in detail.

Also input to the depth analysis 368 is the current gesture pose 452. After obtaining the pose data (step 454), filter data is accessed (step 456).

In step 480, depth analysis is performed. Analysis may be tempo based, positional based, movement based, etc. Examples of such analysis were discussed in connection with the positional analysis 364 and the time/motion analysis 366.

Techniques that may be used in step 480 include, but are not limited to, depth based center of mass (e.g., FIG. 12, 254), depth-based inertia tensor (e.g., FIG. 12, 256), depth buffer based quadrant center of mass computation (e.g., FIG. 13B), depth buffer based body angle bend via top-of-silhouette curve fitting (e.g., FIG. 18, 1854, 1856, 1858), and side/front blob determination. In one embodiment, the runtime engine 244 determines which of these techniques to use based on what gesture is being analyzed. This is one example of selecting a computation to perform based on the gesture is being analyzed. Thus, step 312 of FIG. 3C may include selecting one of these computations based on the gesture being analyzed.

Step 480 determines whether conditions are met (step 462). If conditions for a feedback case are met, there is an option for further filtering (step 464) to weed out feedback that may be generated by a false positive, requires a higher degree of accuracy, or is simply deemed something that should only trigger in very specific cases.

If step 466 determines that feedback is to be generated, after applying the feedback, then feedback is generated (step 468). The results of the depth recognizer 358 and/or move recognizer 360 may be used to help generate the feedback.

Figure 4A:
FIG. 4A illustrates an exemplary depth image.

FIG. 4A illustrates an example embodiment of a depth image that may be received at computing system 112 from capture device 120. According to an example embodiment, the depth image may be an image and/or frame of a scene captured by, for example, the 3-D camera 226 and/or the RGB camera 228 of the capture device 120 described above with respect to FIG. 18. As shown in FIG. 4A, the depth image may include a human target corresponding to, for example, a user such as the user 118 described above with respect to FIGS. 1A and 1B and one or more non-human targets such as a wall, a table, a monitor, or the like in the captured scene. As described above, the depth image may include a plurality of observed pixels where each observed pixel has an observed depth value associated therewith. For example, the depth image may include a two-dimensional (2-D) pixel area of the captured scene where each pixel at particular x-value and y-value in the 2-D pixel area may have a depth value such as a length or distance in, for example, centimeters, millimeters, or the like of a target or object in the captured scene from the capture device. In other words, a depth image can specify, for each of the pixels in the depth image, a pixel location and a pixel depth. Following a segmentation process, e.g., performed by the by the runtime engine 244, each pixel in the depth image can also have a segmentation value associated with it. The pixel location can be indicated by an x-position value (i.e., a horizontal value) and a y-position value (i.e., a vertical value). The pixel depth can be indicated by a z-position value (also referred to as a depth value), which is indicative of a distance between the capture device (e.g., 120) used to obtain the depth image and the portion of the user represented by the pixel. The segmentation value is used to indicate whether a pixel corresponds to a specific user, or does not correspond to a user.

In one embodiment, the depth image may be colorized or grayscale such that different colors or shades of the pixels of the depth image correspond to and/or visually depict different distances of the targets from the capture device 120. Upon receiving the image, one or more high-variance and/or noisy depth values may be removed and/or smoothed from the depth image; portions of missing and/or removed depth information may be filled in and/or reconstructed; and/or any other suitable processing may be performed on the received depth image.

FIG. 4B provides another view/representation of a depth image (not corresponding to the same example as FIG. 4A). The view of FIG. 4B shows the depth data for each pixel as an integer that represents the distance of the target to capture device 120 for that pixel. The example depth image of FIG. 4B shows 24×24 pixels; however, it is likely that a depth image of greater resolution would be used.

FIG. 5A shows a non-limiting visual representation of an example body model 70 generated by skeletal recognition engine 192. Body model 70 is a machine representation of a modeled target (e.g., user 118 from FIGS. 1A and 1B). The body model 70 may include one or more data structures that include a set of variables that collectively define the modeled target in the language of a game or other application/operating system.

A model of a target can be variously configured without departing from the scope of this disclosure. In some examples, a body model may include one or more data structures that represent a target as a three-dimensional model including rigid and/or deformable shapes, or body parts. Each body part may be characterized as a mathematical primitive, examples of which include, but are not limited to, spheres, anisotropically-scaled spheres, cylinders, anisotropic cylinders, smooth cylinders, boxes, beveled boxes, prisms, and the like. In one embodiment, the body parts are symmetric about an axis of the body part.

For example, body model 70 of FIG. 5A includes body parts bp through bp14, each of which represents a different portion of the modeled target. Each body part is a three-dimensional shape. For example, bp3 is a rectangular prism that represents the left hand of a modeled target, and bp is an octagonal prism that represents the left upper-arm of the modeled target. Body model 70 is exemplary in that a body model 70 may contain any number of body parts, each of which may be any machine-understandable representation of the corresponding part of the modeled target. In one embodiment, the body parts are cylinders.

A body model 70 including two or more body parts may also include one or more joints. Each joint may allow one or more body parts to move relative to one or more other body parts. For example, a model representing a human target may include a plurality of rigid and/or deformable body parts, wherein some body parts may represent a corresponding anatomical body part of the human target. Further, each body part of the model may include one or more structural members (i.e., "bones" or skeletal parts), with joints located at the intersection of adjacent bones. It is to be understood that some bones may correspond to anatomical bones in a human target and/or some bones may not have corresponding anatomical bones in the human target.

The bones and joints may collectively make up a skeletal model, which may be a constituent element of the body model. In some embodiments, a skeletal model may be used instead of another type of model, such as model 70 of FIG. 5A. The skeletal model may include one or more skeletal members for each body part and a joint between adjacent skeletal members. Example skeletal model 80 and example skeletal model 82 are shown in FIGS. 5B and 5C, respectively. FIG. 5B shows a skeletal model 80 as viewed from the front, with joints j1 through j33. FIG. 5C shows a skeletal model 82 as viewed from a skewed view, also with joints j1 through j33. A skeletal model may include more or fewer joints without departing from the spirit of this disclosure. Further embodiments of the present system explained hereinafter operate using a skeletal model having 31 joints.

In one embodiment, the system 100 adds geometric shapes, which represent body parts, to a skeletal model, to form a body model. Note that not all of the joints need to be represented in the body model. For example, for an arm, there could be a cylinder added between joints j2 and j18 for the upper arm, and another cylinder added between joints j18 and j20 for the lower arm. In one embodiment, a central axis of the cylinder links the two joints. However, there might not be any shape added between joints j20 and j22. In other words, the hand might not be represented in the body model.

In one embodiment, geometric shapes are added to a skeletal model for the following body parts: Head, Upper Torso, Lower Torso, Upper Left Arm, Lower Left Arm, Upper Right Arm, Lower Right Arm, Upper Left Leg, Lower Left Leg, Upper Right Leg, Lower Right Leg. In one embodiment, these are each cylinders, although another shape may be used. In one embodiment, the shapes are symmetric about an axis of the shape.

A shape for body part could be associated with more than two joints. For example, the shape for the Upper Torso body part could be associated with j1, j2, j5, j6, etc.

The above described body part models and skeletal models are non-limiting examples of types of models that may be used as machine representations of a modeled target. Other models are also within the scope of this disclosure. For example, some models may include polygonal meshes, patches, non-uniform rational B-splines, subdivision surfaces, or other high-order surfaces. A model may also include surface textures and/or other information to more accurately represent clothing, hair, and/or other aspects of a modeled target. A model may optionally include information pertaining to a current pose, one or more past poses, and/or model physics. It is to be understood that a variety of different models that can be posed are compatible with the herein described target recognition, analysis, and tracking system.

Software pipelines for generating skeletal models of one or more users within a field of view (FOV) of capture device 120 are known. One such system is disclosed for example in United States Patent Publication 2012/0056800, entitled "System For Fast, Probabilistic Skeletal Tracking," filed Sep. 7, 2010, which application is incorporated by reference herein in its entirety.

Body Model Based Center-of-Mass State Vector

FIG. 6A is a diagram of one embodiment of the runtime engine 244. The runtime engine 244 includes a body model based center of mass state vector computation 650, constraint modeling and solving 660, and signal analysis 670. The body model based center of mass state vector computation 650 computes a body part center-of-mass state vector and a whole body center-of-mass state vector, in one embodiment. One or more elements of these state vectors may be provided to the constraint modeling and solving 660 and to the signal analysis 670. Each of these elements will be described in more detail below.

Depending upon what user behavior is being tracked, it would sometimes be useful to be able to determine and track a center-of-mass for a user. The center-of-mass may be tracked for individual body parts, as well as for the whole body. In one embodiment, the whole body center-of-mass for the user is determined based on the center-of-masses for the individual body parts. In one embodiment, the body part is modeled as a geometric shape. In one embodiment, the geometric shape is symmetric about an axis of the geometric shape. For example, the geometric shape could be a cylinder, ellipsoid, sphere, etc.

It may also be useful to track an inertia tensor. The inertia tensor may be tracked for individual body parts, as well as for the whole body. In one embodiment, the whole body inertia tensor for the user is determined based on the inertia tensors for the individual body parts.

In one embodiment, a body part center-of-mass state vector is determined. The body part center-of-mass state vector may include, but is not limited to, center-of-mass position for a body part, center-of-mass velocity for the body part, center-of-mass acceleration for the body part, orientation of the body part, angular velocity of the body part, angular acceleration of the body part, inertia tensor for the body part, and angular momentum of the body part. The center-of-mass state vector may include any subset of the foregoing, or additional elements. Note that for the purpose of discussion, the center-of-mass state vector may contain an element whose value does not change over time. For example, the inertia tensor for the body part may remain constant over time (although the orientation of the body part may change).

In one embodiment, a whole body center-of-mass state vector is determined. The whole body center-of-mass state vector may include, but is not limited to, center-of-mass position for the whole body, center-of-mass velocity for the whole body, center-of-mass acceleration for the whole body, orientation of the whole body, angular velocity of the whole body, angular acceleration of the whole body, inertia tensor for the whole body, and angular momentum of the whole body. The whole body center-of-mass state vector may include any subset of the foregoing, or additional elements. In one embodiment, the whole body center-of-mass state vector is determined based, at least in part, on one or more elements of center-of-mass state vectors for individual body parts.

Such individual body part and whole body center-of-mass state vector information can be used to track and evaluate a user performing certain exercises, such as squats, lunges, push-ups, jumps, or jumping jacks so that an avatar of the user can be controlled, points can be awarded to the user and/or feedback can be provided to the user. As one particular example, when a user is performing a squat, their whole body center of mass should move up and down without lateral motion.

It can also be useful to know how body parts are moving relative to each other. For example, when a user curls their arm when lifting a weight, the system 100 determines how the lower arm is moving relative to the upper arm, in one embodiment. This analysis may consider motion of body parts without consideration of the causes of motion. This is sometimes referred to as kinematics. At least some of the foregoing individual body part center-of-mass state vector information can be used.

It can also be useful to know what forces and/or torques within the user's body are required to result in the motion of the user that the system 100 observed. In one embodiment, inverse dynamics is used to determine what forces and/or torques are applied to result in the observed motion. This may be forces and/or torques at joints in a body model. As one example, the system 100 may determine what foot forces are required when a user performs some motion (e.g., when throwing a punch, performing a lunge or squat, etc.). To some extent, the forces and/or torques at a joint in a body model can be correlated to forces applied by the user's muscles. At least some of the foregoing individual body part and whole body center-of-mass state vector information can be used.

Figure 6B:
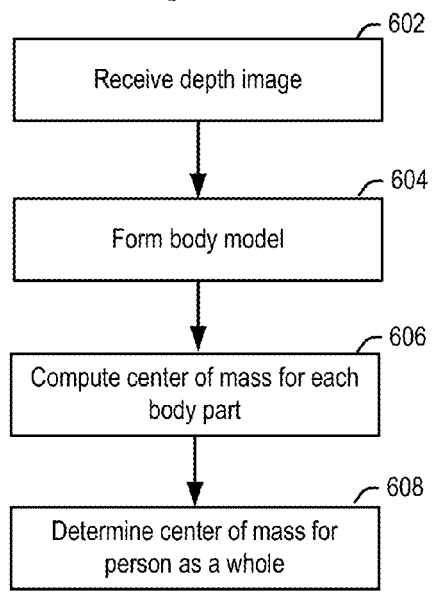
FIG. 6B is a flowchart of one embodiment of a process of determining a center of mass for a person based on a body model.

In one embodiment, a center of mass is determined for a person by analyzing a body model. This could be a body model such as, or derived from, the examples of FIGS. 5A, 5B and/or 5C. Thus, this could be based on skeletal tracking. FIG. 6B is a flowchart of one embodiment of a process 600 of determining a center of mass for a person based on a body model. In one embodiment, process 600 computes the center of mass via a weighted average method. Process 600 may be performed by the body model based center of mass state vector computation 650.

In step 602, a depth image is received. FIGS. 4A and 4B are one example of a depth image, but step 602 is not limited to this example.

In step 604, a body model is formed from the depth image. In one embodiment, this includes forming a skeletal model having joints. In one embodiment, skeletal recognition engine 192 is used when forming the body model. Additionally, some geometric shape may be added between two joints. In one embodiment, the geometric shape is symmetric about an axis of the geometric shape. For example, the geometric shape could be a cylinder, ellipsoid, sphere, etc. As one example, a cylinder is added between joints j2 and j18 (see FIG. 5A) to represent the user's upper arm. Each body part may be assigned a position in 3D space.

It is not required that each body part be given the same shape. Each body part may also be assigned size parameters. Thus, for a cylinder, the body part may be assigned a height and a radius. Other shapes can be used such as, but not limited to, ellipsoids, cones, and blocks.

Each body part may also be given a mass ($m_i$). The following is an example list of body parts and their respective masses, for one example.

TABLE I

| Body part | Mass |
| --- | --- |
| Head | 6.63 kg |
| Upper Torso | 23.88 kg |
| Lower Torso | 15.92 kg |
| Upper Left Arm | 2.29 kg |
| Lower Left Arm | 2.47 kg |
| Upper Right Arm | 2.29 kg |
| Lower Right Arm | 2.47 kg |
| Upper Left Leg | 8.42 kg |
| Lower Left Leg | 5.1 kg |
| Upper Right Leg | 8.42 kg |
| Lower Right Leg | 5.1 kg |

There may be more or fewer body parts. The relative distribution of mass to the different body parts is not required to be the same for each user. For example, a male user could have a different distribution of mass than a female user. Various techniques can be used to determine a total mass (M) of the user. In one embodiment, the system requests that the user input their mass and perhaps other information such as age, gender, etc. In one embodiment, the system estimates the total mass based on, for example, analysis of the total volume of the user, and assumptions about density. The total volume may be determined from the depth image. The assumptions about density may be based on a variety of factors such as relative distribution of the volume (e.g., does the user have a large waist).

In step 606, a center of mass ($P_i$) is computed for each body part. The center of mass can be computed based on the shape used to model the body part. Formulas for determining center of mass for various shapes are known in the art. Step 606 may determine a 3D position for the center of mass. In one embodiment, this is an (x, y, z) coordinate. However, another coordinate system (e.g., cylindrical, spherical) might be used.

In step 608, a center of mass for the person as a whole is computed based on the center of masses of the individual body parts. Equation 1 may be used to determine the center of mass for the person as a whole.

$$P = \frac{1}{M}\sum_{i=1}^{n} m_i P_i \qquad \text{Equation 1}$$

In Equation 1, P is the final center-of-mass position, M is the sum of the masses ($M=\sum_{i=1}^{n} m_i$), n is the number of body parts, $m_i$ is the mass of the particular body part, and $P_i$ is the position of the center-of-mass of the body part (in three-dimensions). The above equation can be used, e.g., by body model based center of mass state vector computation 650 that determines a center-of-mass position.

In accordance with one embodiment, in addition to determining a center-of-mass based on a body model, an inertia tensor can also be determined based on a body model. Computation of the local inertia tensor may depend on both the shape of the body part, and the orientation of that shape. Orientation may be determined via the direction of the body part (e.g. the upper arm is directed from the shoulder to the elbow), and facilitated by using body parts that are symmetrical (e.g. a cylinder).

Figure 7A:
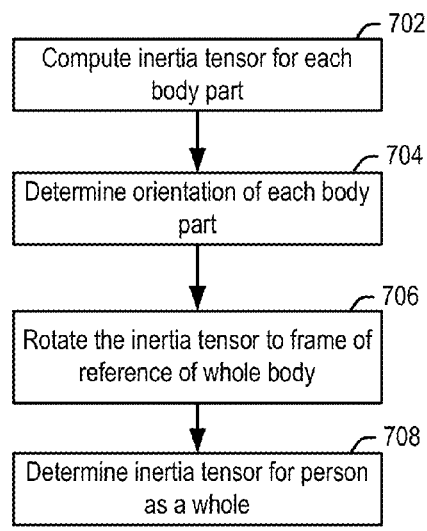
FIG. 7A is a flowchart of one embodiment of a process of determining inertia tensors based on a body model.

FIG. 7A is a flowchart of one embodiment of a process 700 of determining inertia tensors based on a body model. The process 700 may be used to determine an inertia tensor for each body part, as well as for the person as a whole. Process 700 may be performed by body model based center of mass state vector computation 650 of the runtime engine 244 of FIG. 6A.

In step 702, an inertia tensor, $I_b$, is determined for each body part. This is referred to herein as the "base inertia tensor." In one embodiment, a body part has a shape of a cylinder. An inertia tensor for a solid cylinder, having a radius r and height h may be determined as:

$$\begin{bmatrix} \frac{1}{12}m(3r^2+h^2) & 0 & 0 \\ 0 & \frac{1}{12}m(3r^2+h^2) & 0 \\ 0 & 0 & \frac{1}{2}mr^2 \end{bmatrix}$$

In this example, the inertia tensor is computed with a frame of reference that has the z-axis along the length of the cylinder. This is just one example; many other shapes could be used.

In step 704, an orientation of each body part is determined. In one embodiment, this determined based on the skeletal tracking data. For example, the orientation of a body part for the upper arm may be defined based on 3D coordinates of joints j2 and j18 (see FIG. 5B). In the example in which the body part is modeled as a cylinder, this may be a central axis of the cylinder. The central axis (or orientation) of the various body parts will most likely not be parallel to one another.

In one embodiment, the parallel axis theorem is used to compute the whole body inertia tensor from the individual body part inertia tensors. The parallel axis theorem can be used to reformulate a body part's inertia tensor in the frame of reference of the whole body. In other words, the parallel axis theorem may be used to represent the body part's inertia tensor in terms of the whole body's frame of reference. As is well known, the parallel axis theorem involves using two parallel axes. A first axis is for the whole body, which is in a target frame of reference. The first axis goes through the whole body's center of mass. A second axis is one that goes through the center of mass of the body part and which is parallel to the first axis. The choice of axes is arbitrary, so long as the two axes are parallel. That is, many different choices could be made for the first and second axes. Inertia tensors are very simple to represent when a well-chosen body part is used. As indicated above, the body part inertia tensor may be a diagonal matrix, when measured in a selected frame of reference. However, the body part frame of reference is rarely the same as the whole body frame of reference. Thus, a rotation may be performed to rotate the body part inertia tensor such that it is in the whole body's frame of reference. In step 706, the inertia tensor for each body part is rotated to the target (whole body) frame of reference. Note that choosing the local frame of reference for the body part that results in a diagonal matrix simplifies the calculations, but is not required. The rotation technique may be achieved as in Equation 2:

$I_i = OI_bO^T$ (Equation 2)

In Equation 2, O is the rotation matrix from local space to the target inertia frame of reference, $I_b$ is the base inertia tensor, and $O^T$ is the transpose of the rotation matrix O. The rotation matrix "rotates" the inertia tensor from one frame of reference to another. An example of this kind of rotation matrix can be found in animation, where a rotation matrix is part of a rotation-scale-translate system for positioning vertices based on what the underlying skeleton is doing. A similar kind of 3×3 rotation matrix may be used to rotate inertia tensors from one frame of reference to another, using equation 2.

In step 708, an inertia tensor is determined for the person as a whole. Step 708 may be viewed as summing up all the body part's inertia tensors after step 706 is done for all body parts. This is a per-element summation that yields the final 3×3 inertia tensor for the whole body, in one embodiment. This may be calculated using Equation 3.

$I = \Sigma_{i=1}^{n}(I_i + m_i((R_i \cdot R_i)E - R_i R_i^T))$ (Equation 3)

In Equation 3, I is the overall inertia tensor, $I_i$ is the local inertia tensor for the body part (in the same frame of reference as I), $m_i$ is the mass of the body part, n is the number of body parts, $R_i$ is the vector from the body part center of mass to the whole body center of mass (P), and E is the identity matrix. The "·" operator is the dot operator ($R_i^T R_i$), and the "T" superscript is the transpose of the vector.

In one embodiment, the inertia tensor is used to analyze how the user performed a motion. For example, a user could perform two jumps in which their center of mass reaches the same height. However, in one case the user may be elongated and in the other case the user may be crunched together somewhat into more of a ball-like shape. The system 100 can easily spot even subtle differences between these two cases based on the whole body inertia tensor. Many other uses of the inertia tensor are possible.

In addition to the center of mass and inertia tensor for a body part, other center of mass state vector elements for the body part are calculated in one embodiment. The center of mass state vector for a body part may include one or more of the following: center-of-mass position for a body part, center-of-mass velocity for a body part, center-of-mass acceleration for a body part, angular velocity of a body part, angular acceleration of a body part, inertia tensor for a body part, and angular momentum of a body part.

Figure 7B:
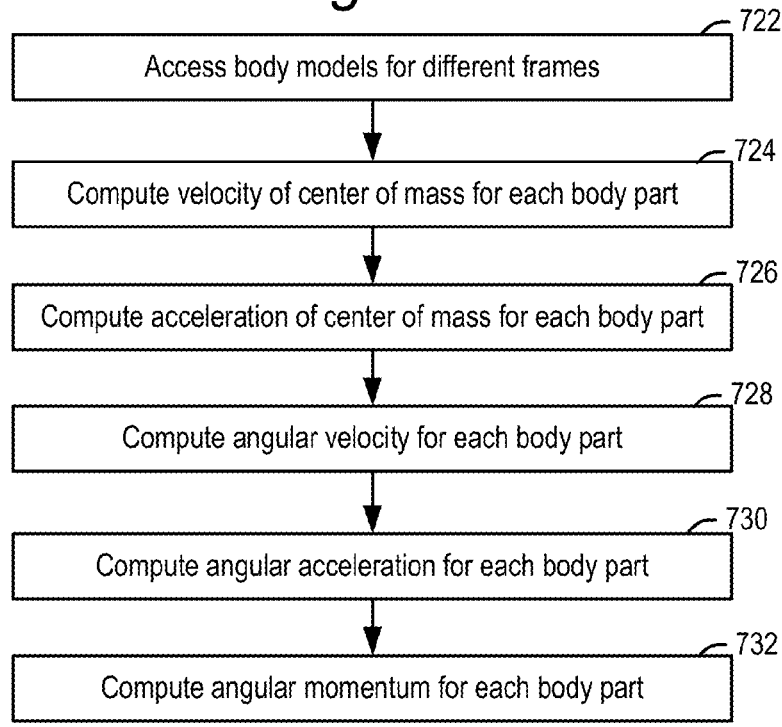
FIG. 7B is a flowchart of one embodiment of a process for determining elements in a body part center of mass state vector.

FIG. 7B is a flowchart of one embodiment of a process for determining elements in a body part center of mass state vector. The process may be performed by body model based center of mass state vector computation 650. In step 722, body models for different points in time are accessed. This may be for two successive frames.

In step 724, the velocity of the center of mass for each body part is determined. In one embodiment, the velocity of the center-of-mass is determined by comparing the position of the center-of-mass for two points in time. This could be for two consecutive frames of image data. However, the velocity of the center-of-mass could be based on more than two data points of the position of the center-of-mass. In one embodiment, step 724 uses the data from step 606 from two different points in time.

In step 726, the acceleration of the center of mass for each body part is determined. In one embodiment, the acceleration of the center-of-mass is determined by comparing the velocity of the center-of-mass for two points in time. This could be for two consecutive frames of image data. However, the acceleration of the center-of-mass could be based on more than two data points of the velocity of the center-of-mass. In one embodiment, the velocity data from step 724 (for two different points in time) is used in step 726.

In step 728, the angular velocity ($\omega_i$) of each body part is determined. In one embodiment, each body part is modeled as a shape having an axis. The shape could be symmetric about that axis. For example, the body part could be a cylinder having an axis that is a line formed by the center of its two bases. Based on differences between the positions of the body part for two points in time the angular velocity can be computed with well-known formulas. The angular velocity could be determined relative to a point of reference other than an axis. Also, the shape is not required to be symmetric about an axis that serves as the reference for determining angular velocity. Step 728 may use the data from the body models for two different points in time.

In step 730, the angular acceleration ($\alpha_i$) of each body part is determined. In one embodiment, the angular acceleration ($\alpha_i$) of a body part is determined based on the differences between the angular velocity ($\omega_i$) for that body part for two points in two. Step 730 may use the data from step 728 for two different points in time. However, other techniques may be used. In embodiment, the angular acceleration ($\alpha_i$) of each body part is determined in accordance with Equation 4.

$$\alpha_i = d\omega_i/dt \qquad \text{Equation 4}$$

In step 732, the angular momentum ($L_i$) of each body part is determined. In one embodiment, the angular momentum for a body part is determined based on the inertia tensor ($I_i$) for the body part that was determined in step 702 and the angular velocity $\omega_i$ that was determined in step 726. The angular momentum ($L_i$) for an individual body part may be determined in accordance with Equation 5.

$$L_i = I_i \omega_i \qquad \text{Equation 5}$$

In addition to the center of mass and inertia tensor for the whole body, other center of mass state vector elements for the whole body are calculated in one embodiment. The center of mass state vector for the whole body may include one or more of the following: center-of-mass position for the whole body, center-of-mass velocity for the whole body, center-of-mass acceleration for the whole body, orientation of whole body, angular velocity of the whole body, angular acceleration of the whole body, inertia tensor for the whole body, and angular momentum of the whole body. The center of mass state vector for the whole body may include any subset of the foregoing, or additional elements.

Figure 7C:
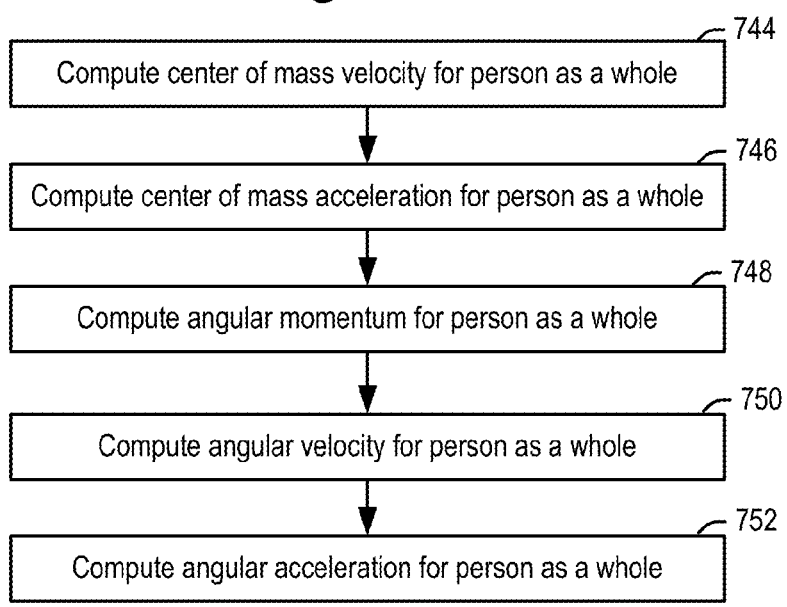
FIG. 7C is a flowchart of one embodiment of a process for determining elements in a whole body part center of mass state vector.

FIG. 7C is a flowchart of one embodiment of a process for determining elements in a whole body part center of mass state vector. The process may be performed by body model based center of mass state vector computation 650 of the runtime engine 244 of FIG. 6A. In step 744, the velocity of the center of mass for the whole body is determined. In one embodiment, the velocity of the center-of-mass is determined by comparing the position of the center-of-mass for two points in time. In one embodiment, the center of mass position for the whole body that was determined (for two points in time) in step 608 may be used in step 744. As is well known, velocity may be calculated by the difference in distance versus the difference in time.

In step 746, the acceleration of the center of mass for the whole body is determined. In one embodiment, the acceleration of the center-of-mass is determined by comparing the velocity of the center-of-mass for two points in time. In one embodiment, the velocity data from step 744 (for two different points in time) is used in step 746.

In step 748, the angular momentum (L) of the whole body is determined. In one embodiment, the angular momentum for the whole body is determined based on the angular momentum ($L_i$) of each body part that was determined in step 732 of FIG. 7B, and each body part's angular momentum non-rotational contribution ($L_{nri}$) to the overall angular momentum. Computation of the angular momentum of each body part ($L_i$) was discussed in step 732 of FIG. 7B.

In one embodiment, the body part's non-rotation contribution ($L_{nri}$) to the overall angular momentum is computed by treating the body part as a particle having the mass of the body part, and moving at its center of mass' velocity. A standard formula (see Equation 6A) for computing the angular momentum of a set of particles around a point (in this case, the point is the whole body's center of mass) may be used.

$$L_{nr} = \Sigma_{i=1}^{n}(r_i \times m_i v_i) \qquad \text{Equation 6A}$$

In Equation 6A, $L_{nr}$ is the sum of all of the body part's non-rotational contributions to the whole body angular momentum, $r_i$ is the position of a body part's center of mass relative to the position of the whole body center of mass, $m_i$ is the mass of the body part, and $v_i$ is the body part's linear velocity relative to the linear velocity of the whole body center of mass, and "x" is the cross product operator. The velocity of the whole body's center of mass may be obtained from step 744. The velocity of the center of mass of a body part may be obtained from step 724 of FIG. 7B.

The individual angular momentums ($L_i$) of each body part are summed and added to the sum ($L_{nr}$) of all of the body part's non-rotational contributions to the whole body angular momentum that was determined in Equation 6A to yield the overall angular momentum.

$$L_{overall} = L_{nr} + \Sigma_{i=1}^{n} L_i \qquad \text{Equation 6B}$$

In step 750, the angular velocity ($\omega$) of the whole body is determined. In one embodiment, the angular velocity ($\omega$) of the whole body is computed from the angular momentum of the whole body that was determined in step 748 and the inverse of the inertia tensor for the whole body. The inertia tensor for the whole body was determined in step 708 of FIG. 7A.

In step 752, the angular acceleration ($\alpha$) of the person as a whole is determined. In one embodiment, the angular acceleration ($\alpha$) of the whole body is determined in accordance with Equation 7 where $\omega$ may be determined in accordance step 750. In one embodiment, data from step 750 for to different points in time is used.

$$\alpha = d\omega/dt \qquad \text{Equation 7}$$

The center of mass and inertia tensor, as well as other elements in the center of mass state vector, may be used to analyze the user's movements. In one embodiment, the forces that a body part would need to apply in order to result in a change in the center of mass state vector is determined. For example, when a user is exercising, their feet need to apply some force in order for them to jump, twist, etc. These forces factor in weight shift, and the feet forces required to torque/twist the body around (e.g. how hard did you throw that punch, and how much foot force was needed to keep the feet from sliding?).

Foot forces can be computed based on the assumption that the feet constraints with the ground. In other words, the system 100 determines what foot forces are required to change the center of mass state vector in the observed way. In one embodiment, an assumption is made that the body is a rigid body.

FIG. 8A is a flowchart of one embodiment of determining a force that would be needed to causes a change in the center of mass state vector. The center of mass state vector is a whole body center of mass state vector, in one embodiment. The force is a foot force, in one embodiment.

In step 802, a whole body center of mass state vector for one point in time is determined. This may be for a single frame of image data. In one embodiment, the process uses position, orientation, velocity, and angular velocity to compute forces (such as foot forces). The position may be the whole body center of mass position as determined in step 608 of FIG. 6B. The orientation of the whole body may have been determined in FIG. 7A, when determining the inertia tensor of the whole body. The velocity may be the whole body center of mass velocity as determined in step 744 of FIG. 7C. The angular velocity may be the whole body angular velocity as determined in step 748 of FIG. 7C. The whole body center-of-mass state vector may include any subset of the foregoing, or additional elements.

In step 804, a whole body center of mass state vector for a later point in time is determined. This may be for the next frame of image data. In step 806, differences between the two whole body center of mass state vectors are determined.

In step 808, the foot forces that are required to change the whole body center of mass state vector are determined Step 808 may be performed by constraint modeling and solving 660 in the runtime engine depicted in FIG. 6A.

In one embodiment, the body is treated as a rigid body with the feet being constraint points on the ground. The feet may be constraint points between the rigid body and the ground. The location of the feet may be determined from the body model. For example, the feet position could be the 3D coordinates of angle joints, or some other point.

In one embodiment, an assumption is made that the feet do not slip. However, other elements than the feet could be used for the constraints. Numerous techniques are possible for solving a rigid body problem with one or more constraints. Techniques for solving rigid body problem with one or more constraints are known in the art. As one example, a Gauss-Seidel method could be used.

The process of FIG. 8A provides for an accurate foot (or other element) force generation, along with the ability to track transitory effects. For example, if the user squats, the foot forces become lighter as the user starts to "fall", then heavier to "brake" the fall so the user's center of mass stops. Incorporating the angular velocity into the computation and the change in the angular velocity from frame to frame (e.g., between two points in time) handles the rotational part of the system. In one embodiment, this is the whole body angular velocity. This technique may be more accurate than a foot force generation techniques that only shows "static" forces, as in the forces required to hold up the user if the user were not in motion.

In one embodiment, the system 100 computes muscle-force/torque by treating the body as a ragdoll with body parts specified by the shapes used by the inertia tensor computation, and constraints specified by the configuration of the body. For example, the upper arm is one body part, the lower arm is another, and the two are connected by a constraint located at the elbow. In addition, if the feet are found to be in contact with the ground, a constraint is added for each foot in such contact.

Figure 8B:
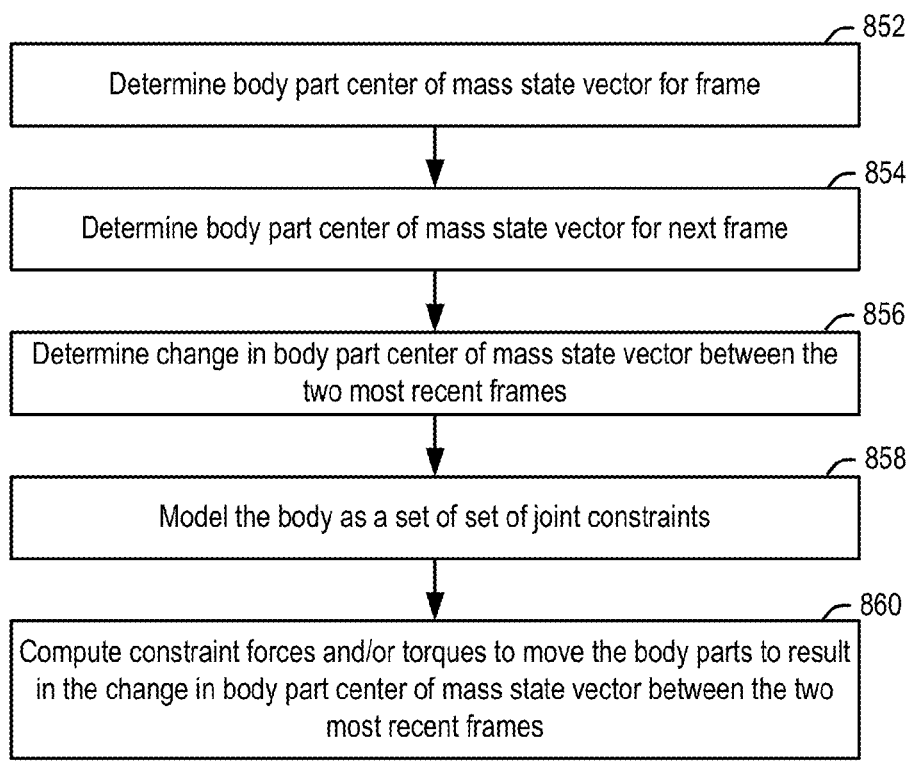
FIG. 8B is a flowchart of one embodiment of muscle force/torque computation using body-wide impulse-based constraint solve.

FIG. 8B is a flowchart of one embodiment of muscle force/torque computation using body-wide impulse-based constraint solve. In step 852, a body part center of mass state vector is determined for a point in time. This may be for a single frame of image data. In one embodiment, the body part center of mass state vector includes position, orientation, velocity, and angular velocity. This vector may be determined for each body part.

The body part center of mass position may be determined in step 606 of FIG. 6B. The orientation may be the determined from the orientation of an axis of the body part. For example, if the body part is being modeled as a cylinder, the orientation could be based on the central axis of the cylinder. The velocity may be the body part center of mass velocity as determined in step 724 of FIG. 7B. The angular velocity may be the body part angular velocity as determined in step 728 of FIG. 7B. The body part center-of-mass state vector may include any subset of the foregoing, or additional elements.

In step 854, step 852 is repeated for another point in time. In step 856, differences between the two body part center of mass state vectors are determined.

In step 858, the body is modeled as a set of joint constraints. In step 860, the system 100 computes constraint forces and/or torques to move the body parts to result in the change in body part center of mass state vector between the two most recent frames. In effect, step 860 determines what pseudo-muscles are required to achieve the whole-body motion. Steps 858 and 860 may be performed by constraint modeling and solving 660.

Step 860 may include a body-wide solve is computed, so that motions done on one side of the body can affect the other side. This may be referred to as "Inverse Dynamics in the general literature." What Inverse Dynamics yields is the ability to track transitory forces/torques throughout the body, while motion is occurring. For example, if you throw your arm out into a punch, your body has to counter-torque to keep it in place, due to Newton's law about equal and opposite forces. If you bend your arm, that requires a torque. But your shoulder has to counter-torque against that elbow torque, and your torso has to adjust for the shoulder, all the way to the feet. Then the forces go the other direction, meaning the final elbow torque has to factor in what the shoulder's doing, etc. This ends up being a system-wide solve.

In one embodiment, a Gauss-Seidel method is used to solve the constraints. For example, one constraint can be solved at a time. The result can then be applied to the overall system. Then, the next constraint is solved and the result is applied to the overall system. After solving for all constraints, the process can be repeated until the result converges.

In one embodiment, an impulse based technique is used to solve the constraints. Again, each constraint may be solved in isolation by itself. The impulse that is needed to hold the two body parts together or to keep them from pulling part can be computed based on inertia tensors, center of masses.

The result of step 860 is a set of forces/torques at the constraints, which may represent "muscles" and "joint forces."

Signal Analysis for Repetition Detection and Analysis

When parameters that are associated with a repetitive motion (e.g., center of mass, left elbow velocity, etc.) are plotted over time, the plot may resemble a signal. In the case of drills (such as physical fitness drills), many of these signals have a characteristic "pulse" look to them, where the value displaces from one position, moves in some direction, then returns to the original position at the end of a "repetition." One embodiment includes a repetition spotting and rough bracketing system that spot these sequences.

In one embodiment, the system 100 performs heavy smoothing of the signal, and then switches to the derivative domain (e.g., positions become velocities, etc.). The "heavy smoothing" is done to eliminate the higher-frequency data in the signal (e.g., noise), and to smooth out the derivative, which could otherwise wildly swing due to such high frequency data. There are many standard techniques to apply this smoothing, such as low-pass filters, moving averages, etc.

The signal in the derivative domain may be a sinusoid. The system 100 then analyzes the pseudo-sinusoidal signal. By ensuring the "up" part of the sinusoid is a significant fraction of the "down" part of the sinusoid, and by ensuring a repetition is long enough and has enough displacement, the system 100 can robustly spot "repetitions" and bracket the start/end time of each repetition, in accordance with one embodiment.

Figure 9A:
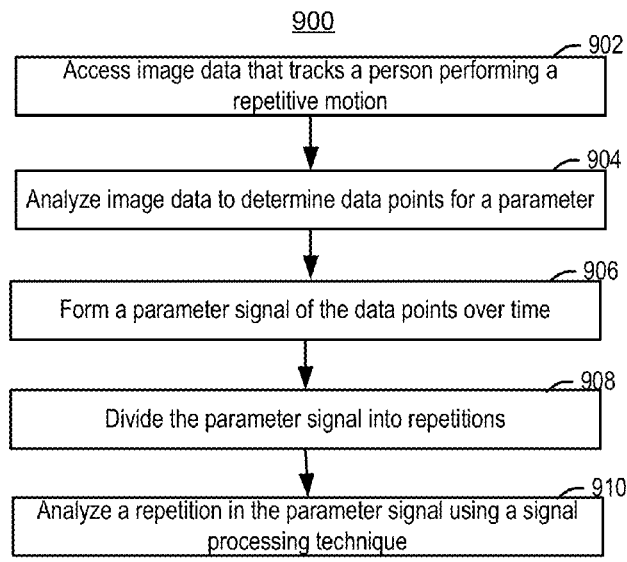
FIG. 9A is a flowchart of one embodiment of a process of analyzing a repetition performed by a user that is being tracked by a capture system.

FIG. 9A is a flowchart of one embodiment of a process 900 of analyzing a repetition performed by a user that is being tracked by a capture system. Process 900 may be performed by signal analysis 670 of the runtime engine 244 of FIG. 6A.

In step 902, frames of depth image data are captured. The depth image data may track a user performing some repetitive motion, such as performing a physical exercise. For the sake of discussion, an example of a user performing a number of squats will be discussed.

In step 904, the image data is analyzed to determine data points for a parameter. Numerous different types of parameters can be tracked. Any of the center of mass state vector components could be tracked. In one embodiment, the position of the center of mass is tracked over time. This might be the center of mass for the whole person or the center of mass of one of the body parts. In one embodiment, the center of mass state vector is based on an analysis of body parts. In one embodiment, the center of mass state vector is based on an analysis of depth images (to be discussed below). Thus, the depth based center of mass 254 and/or the depth-based inertia tensor 256 of FIG. 12 could provide parameters that can be tracked over time.

However, the parameters are not limited to center of mass state vector components described herein. As another example, a position on a body model of the user may be tracked. For example, one of the joints may be tracked. As another example, a position on a silhouette of the user may be tracked. The selection of what parameter gets tracked may depend on the gesture (e.g., physical exercise) being analyzed. The parameter to be tracked for a particular gesture may be specified in the gesture database 240.

Figure 9B:
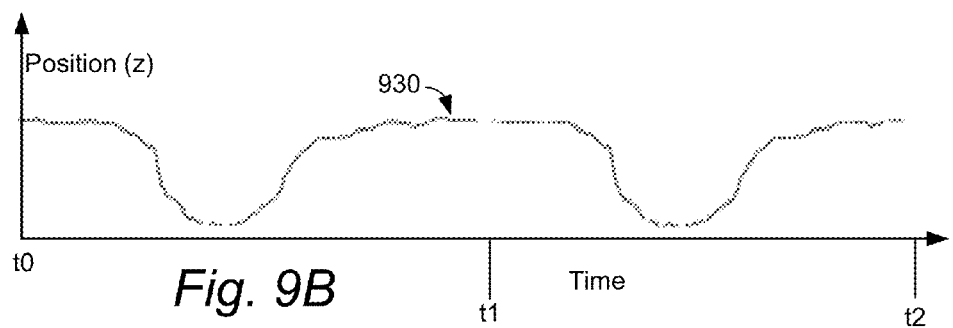
FIG. 9B shows a representation of one example parameter signal.

In step 906, a parameter signal that tracks the data points over time is formed. The parameter signal may track a repetitive motion performed by the user. FIG. 9B shows a representation of one example parameter signal 930. The signal in FIG. 9B graphs out position versus time for the parameter of interest. The parameter in this case may be the position of the whole body center of mass. In this example, the position may be the z-coordinate. In other word, this may track the user's center of mass relative to the floor. This might be for a center of mass state vector based on an analysis of body parts, a center of mass state vector based on an analysis of depth images (e.g., pixel based), or some other center of mass state vector.

The parameter signal 930 covers two repetitions of, for example, a squat move that consists of dropping the body while bending the legs, then rising back up. In one embodiment, an assumption is made that a repetition-based drill consists of starting in a pose, doing something, and then returning to the start pose. This sequence may be called a repetition.

In the example of FIG. 9B, the parameter signal 930 tracks one dimension of the parameter over time. However, the parameter signal 930 might track two or three dimensions of the parameter over time. For example, the parameter for the position of the center of mass may have three dimensions. In this case, one, two or three of the dimensions could be tracked over time. In one embodiment, the parameter signal 930 tracks position versus time for the parameter.

The parameter signal 930 could track something other than position versus time. For example, the parameter signal 930 might track velocity versus time, acceleration versus time, angular velocity versus time, angular acceleration versus time, and angular momentum versus time.

In step 908, the parameter signal 930 is divided into repetitions of the repetitive motion. In one embodiment, the parameter signal 930 is divided into brackets that each contains a repetition. The brackets may delineate one repetition of the repetitive motion from other repetitions of the repetitive motion.

Figure 9C:
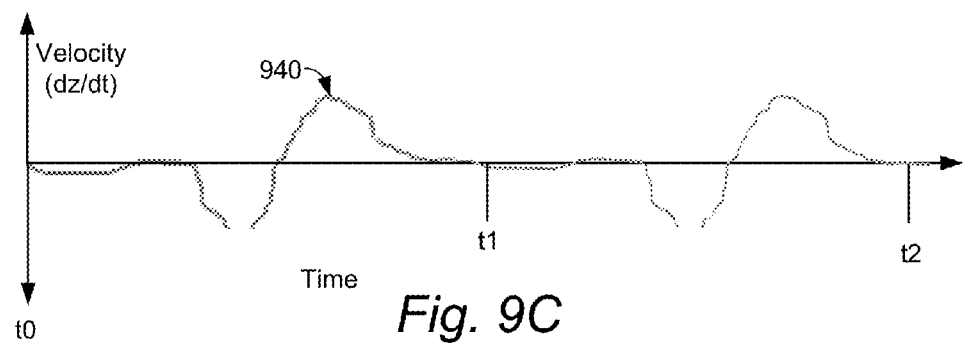
FIG. 9C shows one example derivative signal.

In one embodiment, step 908 includes taking derivative of the parameter signal 930 from step 906. FIG. 9C shows one example derivative signal 940. In this example, the derivative signal 940 has a neutral/down/up/down/neutral pattern. Another possible pattern is neutral/up/down/up/neutral. Still other patterns are possible. In these two examples, the derivative signal 940 goes to one side of the zero line, then to the other, before setting back in the neutral position. In this example, portions of the derivative signal 940 that correspond to a repetition may resemble a sine function; however, the derivative signal 940 (or portions thereof) is not required to resemble a sine function.

As noted above, in one embodiment, the parameter signal 930 tracks position versus time for the parameter. In this case, the derivative signal 940 may track velocity versus time for the parameter. In one embodiment, the system 100 tracks the position versus time for a center of mass, as well as the velocity versus time for the center of mass. Thus, the parameter signal 930 could be formed from the position data and the derivative signal 940 could be formed from the velocity data.

In one embodiment, the velocity data is formed from the position data. For example, the velocity data for one point in time may be determined from the position data for two (or more) points in time. In one embodiment, the velocity data is determined by taking the difference between the position data for two points in time and dividing by the time difference. However, more than two points in time could be used. Thus, "taking the derivative" of the parameter signal 930 could be performed based on the difference between two data points in the parameter signal 930.

The time points t0, t1, and t2 are labeled in FIG. 9C to show how the derivative signal 940 may be bracketed. In one embodiment, each bracket contains one repetition. A first bracket from t0-t1 corresponds to a first bracket that contains a first repetition. A second bracket from t1-t2 corresponds to a second bracket that contains a second repetition. The times can then be correlated to the parameter signal 930 to bracket the parameter signal 930 in a similar manner.

Referring back to the parameter signal 930, for various reasons, (e.g. overall user movement, data inaccuracies), the end point of the pulse (e.g., near t1) might not be near the start (e.g., near t0). For example, the z-position after performing the first squat might be lower than the z-position prior to performing the first squat. This can make it difficult to accurately determine when each repetition is done, as well as to analyze the user's form.

The derivative approach of one embodiment gets around this issue because the derivative signal 940 will return to zero (or close thereto) when the parameter stabilizes. For example, when the user stops moving up or down the z-position (of center of mass, skeletal joint, point on silhouette, etc.) stabilized briefly. In this example, the derivative signal 940 goes negative, then positive, before returning to zero (or close thereto). When the derivative signal 940 does this, the system 100 is able to precisely bracket a repetition.

The system 100 also may have some sanity checks. For example, the system 100 may ensure the repetition has a minimum/maximum time. The system 100 may also ensure that the deviation from zero for the derivative signal 940 is sufficient for both sides (e.g. that the positive side is a significant fraction of the negative side).

In step 910, the system 100 analyzes a repetition in the parameter signal 930 using a signal processing technique. In one embodiment, step 910 includes further refining the location of a start or an end of a repetition. In one embodiment, further refining the location of the start or end of a repetition includes fitting a curve to a portion of the parameter signal 930 that corresponds to a repetition. In one embodiment, further refining the location of the start or end of a repetition includes auto-correlating a portion of the parameter signal 930 that corresponds to a repetition with the parameter signal 930.

In one embodiment, step 910 includes evaluating a user's performance of a repetition that is captured in the parameter signal 930. In one embodiment, evaluating a user's performance is based on differences between the fitted curve and the parameter signal 930. In one embodiment, evaluating a user's performance includes subtracting a portion of the parameter signal 930 that defines one repetition from another portion of the parameter signal 930 that defines another repetition.

Curve Fitting to Repetitions to Determine Repetition Timing

Once the system 100 has a repetition bracketed, the system 100 may fit a curve to the parameter signal 930 between the start/end of the bracketed repetition. With the results of the curve-fit, the system 100 can extract further useful information about the repetition, such as the repetition time (how long did the squat take, for example). Example curves include, but are not limited to, cosine, cosine pulses, cosine pulses with flat portions in the middle of the pulse, and spline fits (linear and cubic).

Using curve-fitting optimization techniques provides for very accurate repetition-timing information, for repetitions that fit closely the type of curve the system 100 fits to. The system 100 may also determine how well the player did the repetition via how close the curve fit to the parameter signal 930.

Figure 10A:
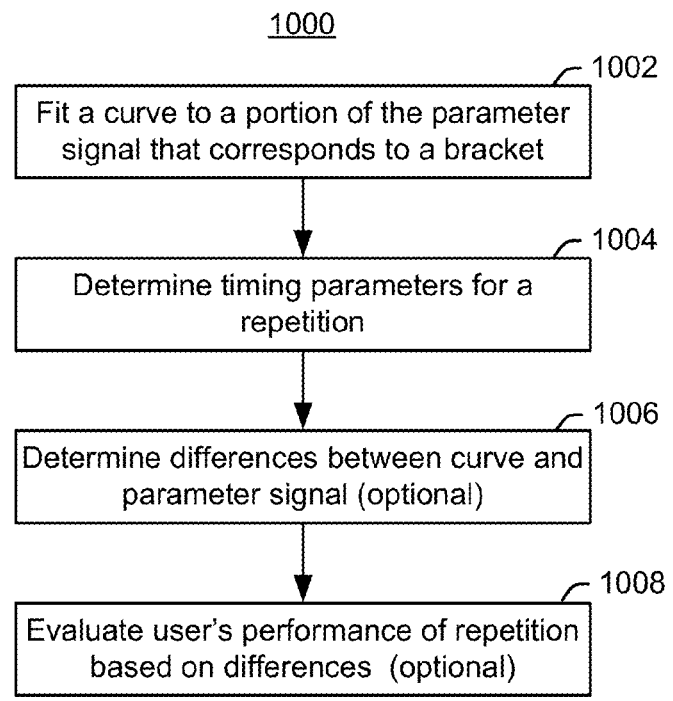
FIG. 10A is a flowchart of one embodiment of a process of fitting a curve to a bracketed repetition to determine timing parameters.
Figure 10B:
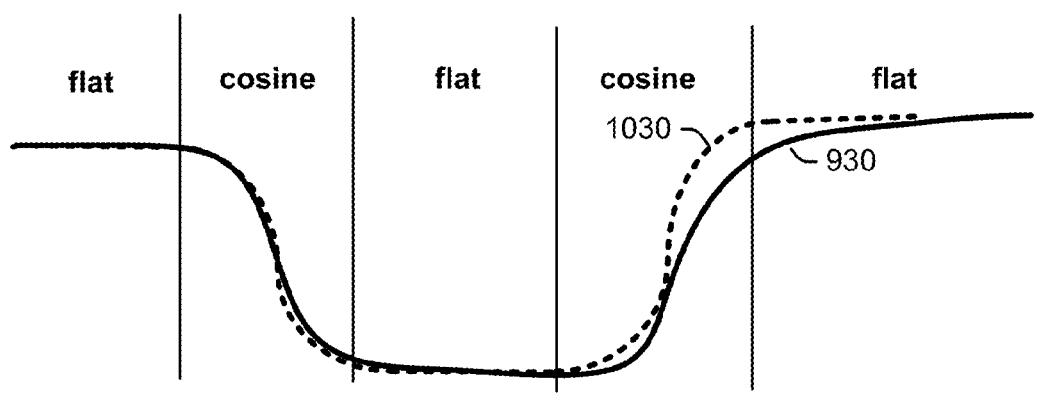
FIG. 10B shows an example curve fit to a portion of the parameter signal that corresponds to a bracket.

FIG. 10A is a flowchart of one embodiment of a process 1000 of fitting a curve to a bracketed repetition to determine timing parameters. Process 1000 may be performed by signal analysis of the runtime engine 244 of FIG. 6A. In step 1002, a curve is fit to a portion of the parameter signal 930 that corresponds to a bracket. FIG. 10B shows an example curve 1030 fit to a portion of the parameter signal 930 that corresponds to a bracket. In this example, the curve 1030 has five portions. There is a first flat portion until the repetition starts, a first cosine portion that begins when the repetition starts, a second flat portion at the bottom of the repetition, a second cosine portion that begins when the repetition is returning, and a third flat portion after the repetition end. A different type of curve 1030 can be used. The type of curve 1030 may depend on the type of user motion (e.g., the type of exercise).

Step 1004 is to determine timing parameters for a repetition. The curve-fitting facilitates extracting useful data from the fit curves, as analyzing a mathematical function is often much easier than analyzing the parameter signal 930. For example, if the system 100 fits half a cosine wave to a parameter signal 930, the system 100 can use the cosine start/end times to determine when the repetition started/ended. Thus, in one embodiment, the system 100 looks at specific points on the curve 1030 to determine timing parameters for a repetition. In one embodiment, the system 100 looks for junctions between a flat portion of the curve 1030 and an increasing/decreasing portion of the curve 1030 to determine timing parameters (such as repetition start/end times) for a repetition. However, the start/end time could be defined at a point other than such a junction.

An example of how this is useful can be shown via a push-up drill. In a push-up drill, there are three parts. The person lowers down, holds the lower position, then rises back up. By tracking a position of the user (e.g., the shoulders' height), the system 100 can use the fitted curve to determine the timings of the repetition. The curve in this case may be a flat-bottom cosine curve. This is simply half a cosine wave, with the bottom (in this case) of the cosine having an arbitrarily long flat region. When the curve-fit routine is done, the system 100 can analytically measure the time it takes to move downwards (the first half of the cosine-wave half), determine how long the player is at the bottom (the flat part), and how long the player took to get back up (the second half of the cosine-wave half).

In one embodiment, differences between the fit curve and the parameter signal 930 are determined in order to determine how well the user performed the repetition. In optional step 1006, differences between the fit curve 1030 and the parameter signal 930 are determined. In optional step 1008, the system 100 evaluates the user's performance of the repetition based on those differences.

DSP Auto-correlation and Signal Subtraction

In one embodiment, signal processing (e.g., Digital Signal Processing (DSP)) techniques are used to analyze a parameter signal 930 over a series of repetitions. In one embodiment, a Fast-Fourier-Transform (FFT) autocorrelation technique is used to determine when two repetitions occurred, by taking a portion of the parameter signal 930 the contains one repetition and correlating it along the parameter signal 930. The peaks of the resultant autocorrelation may be place in the parameter signal 930 where the repetition is best matched (usually the next repetition in the sequence). The result may be a very accurate repetition-to-repetition timing value that indicates when repetition A best fits repetition B in terms of timing.

In one embodiment, the system 100 subtracts a portion of the parameter signal 930 that defines one repetition from another portion of the parameter signal 930 that defines another repetition using this delta-time to see how different the repetitions are. This provides an additional tool for analyzing how the person performed from repetition to repetition.

FIG. 11A is a flowchart of one embodiment of a process 1100 for using signal processing to analyze a parameter signal 930. Process 1100 may be performed by signal analysis of the runtime engine 244 of FIG. 6A. In step 1102, auto-correlation is performed of one portion of the parameter signal 930 to the parameter signal 930. In one embodiment, a bracketed portion of the parameter signal 930 is auto-correlated with some portion of the parameter signal 930. The length of the portion of the parameter signal 930 may be a few brackets, many brackets, some other unit, etc. For example, the system 110 could pick a time-frame, such as 10 seconds, and auto-correlate one bracket (having one repetition) against that whole range. In one embodiment, the system 100 uses a Fast Fourier Transform (FFT) based autocorrelation technique to find where the parameter signal 930 is similar to itself.

Figure 11B:
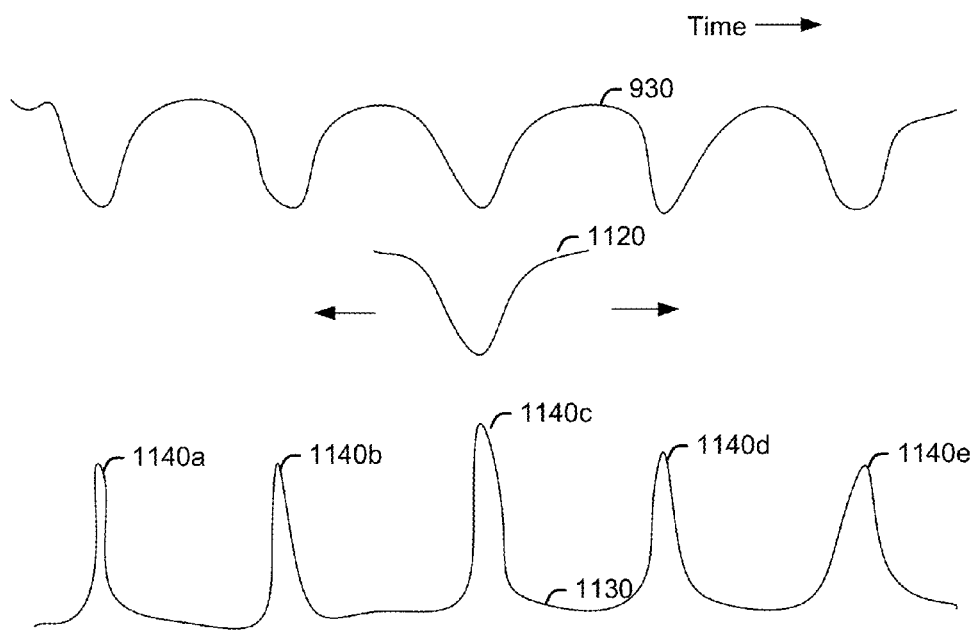
FIG. 11B shows an example of one embodiment of auto-correlation.

In step 1104, the system 100 defines locations of repetitions in the parameter signal 930 based on results of the one embodiment of auto-correlation. For example, peaks may be used to locate a repetition. FIG. 11B shows an example of auto-correlation. An example parameter signal 930 is shown, along with a bracketed portion 1120 of the parameter signal 930. The bracketed portion 1120 may be taken directly from the parameter signal 930. The extent of the bracketed portion 1120 may be defined by the process of FIG. 9A. The bracketed portion 1120 may be auto-correlated to any portion (e.g., past, present, and/or future) of the parameter signal 930.

The example auto-correlation signal 1130 has a number of peaks 1140*a*-1140*e*. These peaks 1140 may be used to precisely determine a time gap between repetitions. These peaks 1140 may also be used to define a precise location of a repetition. The highest peak 1140 will typically correspond to the portion where the bracketed portion is compared to itself.

In optional step 1106, one portion of the parameter signal 930 that corresponds to one repetition is subtracted from another portion of the parameter signal 930 that corresponds to another repetition. The accuracy of this step may be aided by the precise location of the repetition that was determined in step 1104.

The two portions in step 1106 do not necessary include the entire bracket, although that is one possibility. In one embodiment, a precise location of the start and/or end of the repetitions is determined (e.g., by using step 1004 of FIG. 10A) to determine what portions should be used.

In optional step 1108, the system 100 determines how well the user performed a repetition based on differences between the two repetitions. For example, if the user is getting tired the shape of the repetition may change from one repetition to the next. If the parameter signal 930 is identical for the two repetitions, then the result will be a flat line. Deviations from the flat line can be analyzed.

In one embodiment, rather than auto-correlating a bracketed portion of the parameter signal 930 with other parts of the parameter signal 930, the bracketed portion is correlated with a saved parameter signal 930. The saved parameter signal 930 may be for ideal form for a particular motion.

Depth Image-based Center-of-Mass and Inertia Tensor

Figure 12:
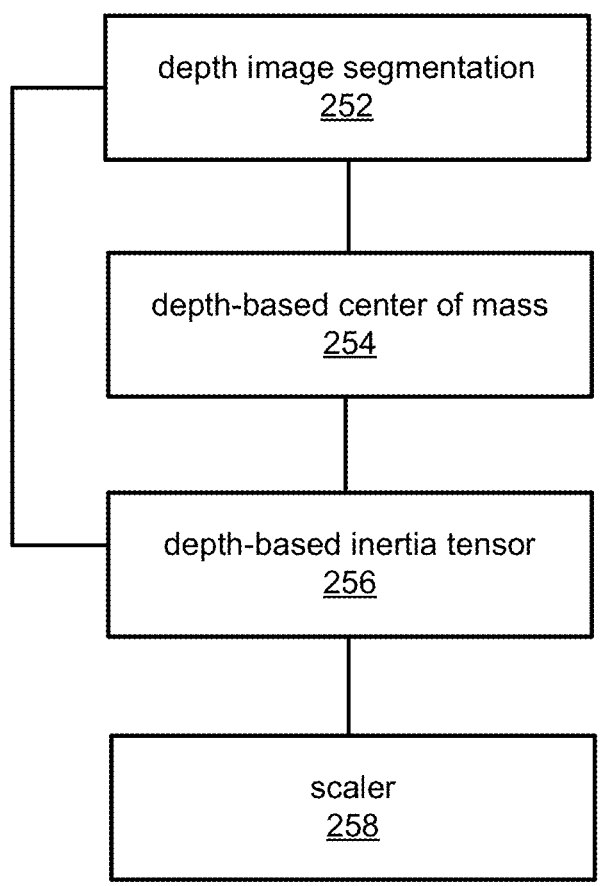
FIG. 12 illustrates an example embodiment of the runtime engine introduced in FIG. 2.

FIG. 12 illustrates an example embodiment of the runtime engine 244 introduced in FIG. 2. Referring to FIG. 12, the runtime engine 244 is shown as including a depth image segmentation module 252, a depth-based center-of-mass module 254, a depth-based inertia tensor module 256 and a scaler 258. In an embodiment, the depth image segmentation module 252 is configured to detect one or more users (e.g., human targets) within a depth image, and associates a segmentation value with each pixel. Such segmentation values are used to indicate which pixels correspond to a user. For example, a segmentation value of 1 can be assigned to all pixels that correspond to a first user, a segmentation value of 2 can be assigned to all pixels that correspond to a second user, and an arbitrary predetermined value (e.g., 255) can be assigned to the pixels that do not correspond to a user. It is also possible that segmentation values can be assigned to objects, other than users, that are identified within a depth image, such as, but not limited to, a tennis racket, a jump rope, a ball, a floor, or the like. In an embodiment, as a result of a segmentation process performed by the depth image segmentation module 252, each pixel in a depth image will have four values associated with the pixel, including: an x-position value (i.e., a horizontal value); a y-position value (i.e., a vertical value); a z-position value (i.e., a depth value); and a segmentation value, which was just explained above. In other words, after segmentation, a depth image can specify that a plurality of pixels correspond to a user, wherein such pixels can also be referred to as a depth-based silhouette of a user. Additionally, the depth image can specify, for each of the pixels corresponding to the user, a pixel location and a pixel depth. The pixel location can be indicated by an x-position value (i.e., a horizontal value) and a y-position value (i.e., a vertical value). The pixel depth can be indicated by a z-position value (also referred to as a depth value), which is indicative of a distance between the capture device (e.g., 120) used to obtain the depth image and the portion of the user represented by the pixel.

Still referring to FIG. 12, in an embodiment, the depth-based center-of-mass module 254 is used to determine a depth-based center-of-mass position for the plurality of pixels corresponding to a user that accounts for distances between the portions of the user represented by the pixels and the capture device used to obtain the depth image. Additional details relating to determining a depth-based center-of-mass position are described below with reference to FIGS. 7A-8B.

In an embodiment, the depth-based inertia tensor module 256 is used to determine a depth-based inertia tensor for the plurality of pixels corresponding to a user, based on the determined depth-based center-of-mass position for the plurality of pixels corresponding to the user. Additional details relating to determining a depth-based inertia tensor are described below with reference to FIGS. 7A-8B. As described in additional detail, with reference to FIGS. 13A-14B, the scaler 258 can be used to scale a determined depth-based inertia tensor using an assumption that a plurality of pixels corresponding to a user has a predetermined mass (e.g., 75 kg).

As explained above, the capture device 120 provides RGB images (also known as color images) and depth images to the computing system 112. The depth image may be a plurality of observed pixels where each observed pixel has an observed depth value. For example, the depth image may include a two-dimensional (2-D) pixel area of the captured scene where each pixel in the 2-D pixel area may have a depth value such as a length or distance in, for example, centimeters, millimeters, or the like of an object in the captured scene from the capture device.

As mentioned above, skeletal tracking (ST) techniques are often used to detect motion of a user or other user behaviors. Certain embodiments described herein rely on depth images to detect user behaviors. Such user behaviors detected based on depth base images can be used in place of, or to supplement, ST techniques for detecting user behaviors. Accordingly, before discussing such embodiments in additional detail, it would first be useful to provide additional details of depth images. In one embodiment, move recognizer 360 uses ST techniques. In one embodiment, depth recognizer 358 uses depth images to detect user behaviors.

Depending upon what user behavior is being tracked, it would sometimes be useful to be able to determine and track a center-of-mass position for a user. For example, such information can be used to track a user performing certain exercises, such as squats, lunges, push-ups, jumps, or jumping jacks so that an avatar of the user can be controlled, points can be awarded to the user and/or feedback can be provided to the user. Certain embodiments, which are discussed below, relate to techniques for determining a center-of-mass position based on a depth image, and thus, such a position shall be referred to hereafter as a depth-based center-of-mass position.

In one embodiment, Equation 1 is used when determining a center of mass based on body parts. In accordance with an embodiment, when calculating a center-of-mass based on a depth image, instead of plugging body parts into Equation 1, pixels are used. Each pixel corresponds to a location in three-dimensional space, which can be computed using standard natural user interface (NUI) coordinate transforms. The "mass" or "weight" of each pixel is depth-dependent. In an embodiment, to determine the mass of a pixel, the depth value of the pixel is squared, as shown below:

$$m = d*d \qquad \text{(Equation 8)}$$

where "m" is the pixel's mass, and "d" is the pixel's depth value. The net effect is to increase the "weight" of pixels further away, and decrease the "weight" of pixels closer in. The reason for this is that since a camera (e.g., 226) views the world via a view frustum, the same number of pixels farther away cover more real-world "area" than pixels close-in, and the area they cover is proportional to the distance squared. Stated another way, pixels of a depth image have a different effective surface area depending on distance. In certain embodiments described herein, a depth-based center-of-mass position is calculated in a manner that compensates for this distance. Without this compensation for distance, if a user's hand was held near a camera (e.g., 226), from the perspective of the camera the user's hand may have a visible area that is as large or larger than the rest of the user's body. This could result in an inaccurate center-of-mass position. With distance compensation, each of the pixels corresponding to the user's hand would be weighed less than pixels that corresponds to parts of the user's body that are farther away from the camera, thereby enabling a much more accurate depth-based center-of-mass position to be determined.

In accordance with an embodiment, when determining a depth-based center-of-mass position, the conventional center-of-mass equation shown above in Equation 1 is still used, except that n is the number of pixels (instead of the number of body parts) corresponding to the user, and the mass $m_i$ is computed for each pixel using Equation 8 above (instead of determining a mass for each body part). R is the position of the pixel (in three-dimensions) computed using standard NUI coordinate transform techniques. M is the sum of the $m_i$'s, i.e., $M = \sum_{i=1}^{n} m_i$.

An advantage of determining a depth-based center-of-mass position, based entirely on a depth image, is that a depth-based center-of-mass position can be determined even when ST techniques fail. Another advantage is that a depth-based center-of-mass position can be determined once a depth image is available in a processing pipeline, thereby reducing latency, as ST techniques do not need to be executed.

Figure 13A:
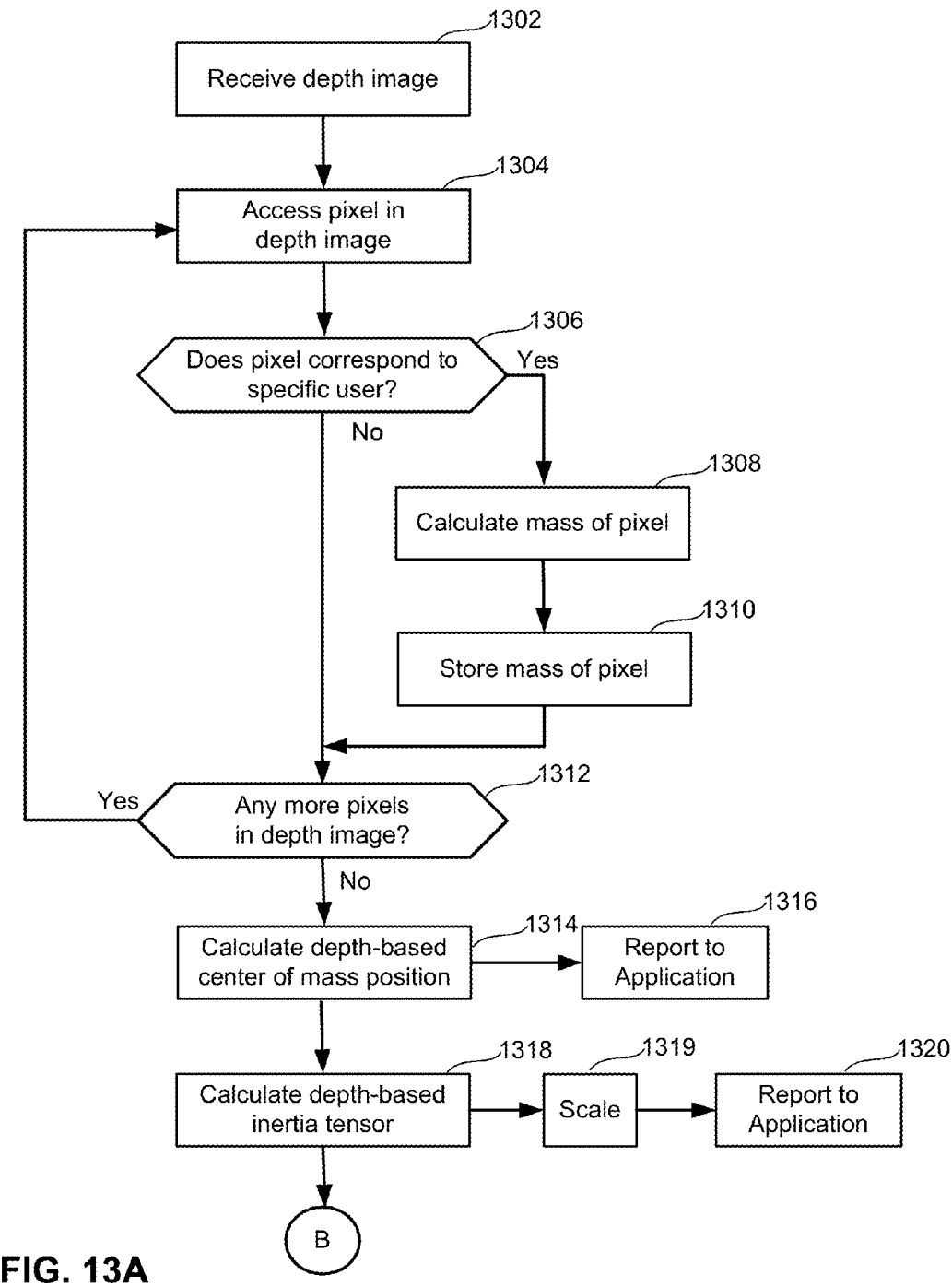
FIGS. 13A and 13B illustrate a high level flow diagram that is used to summarize methods for determining a depth-based center-of-mass position, a depth-based inertia tensor, depth-based quadrant center-of-mass positions, and depth-based quadrant inertia tensors, in accordance with specific embodiments.

The high level flow diagram of FIG. 13A will now be used to summarize a method for determining a depth-based center-of-mass position, according to an embodiment. More specifically, FIG. 13A is a flow diagram describing one embodiment of a process for determining a depth-based center-of-mass position for a plurality of pixels corresponding to a user that accounts for distances between the portions of the user represented by the pixels and the capture device used to obtain the depth image. At step 1302, a depth image is received, wherein the depth image specifies that a plurality of pixels correspond to a user. The depth image can be obtained using a capture device (e.g., 120) located a distance from the user (e.g., 118). More generally, a depth image and a color image can be captured by any of the sensors in capture device 120 described herein, or other suitable sensors known in the art. In one embodiment, the depth image is captured separately from the color image. In some implementations, the depth image and color image are captured at the same time, while in other implementations they are captured sequentially or at different times. In other embodiments, the depth image is captured with the color image or combined with the color image as one image file so that each pixel has an R value, a G value, a B value and a Z value (distance). Such a depth image and a color image can be transmitted to the computing system 112. In one embodiment, the depth image and color image are transmitted at 30 frames per second. In some examples, the depth image is transmitted separately from the color image. In other embodiments, the depth image and color image can be transmitted together. Since the embodiments described herein primarily (or solely) rely on use of depth images, the remaining discussion primarily focuses on use of depth images, and thus, does not discuss the color images.

The depth image received at step 1302 can also specify, for each of the pixels corresponding to the user, a pixel location and a pixel depth. As mentioned above, a pixel location can be indicated by an x-position value (i.e., a horizontal value) and a y-position value (i.e., a vertical value). The pixel depth can be indicated by a z-position value (also referred to as a depth value), which is indicative of a distance between the capture device (e.g., 120) used to obtain the depth image and the portion of the user represented by the pixel. For the purpose of this description it is assumed that the depth image received at step 1302 has already been subject to a segmentation process that determined which pixels correspond to a user, and which pixels do not correspond to a user. Alternatively, if the depth image received at step 1302 has not yet been through a segmentation process, the segmentation process can occur between steps 1302 and 1304.

At step 1304, a pixel of the depth image is accessed. At step 1306, there is a determination of whether the accessed pixel corresponds to a user for which the depth-based center-of-mass is to be determined. If the answer to the determination at step 1306 is no, then flow goes to step 1312. If the answer to the determination of step 1306 is yes, then flow goes to step 1308. At step 1308, the mass of the pixel is calculated. As discussed above with reference to Equation 9, the mass of a pixel can be calculated by squaring the depth value for the pixel. Alternative techniques for determining the mass of pixel are also possible and within the scope of an embodiment, such as use of a look-up-table, or use of an alternative equation that accounts of the distance between the capture device (e.g., 120) used to obtain the depth image and the portion of the user represented by the pixel. At step 1310, the calculated or otherwise determined mass of the pixel is stored (e.g., in memory).

At step 1312 there is a determination of whether there are any more pixels (i.e., at least one more pixel) of the depth image that needs to be considered. If the answer to the determination at step 1312 is no, then flow goes to step 1314. If the answer to the determination at step 1312 is yes, then flow returns to step 1304 and another pixel of the depth-image is accessed.

After all of the pixels of a depth image are considered, at step 1314 a depth-based center-of-mass position is determined for the plurality of pixels that correspond to the user. More specifically, at step 1314 there is a determination, based on the pixel mass determined for each of the pixels corresponding to the user, of a depth-based center-of-mass position for the plurality of pixels corresponding to the user that accounts for distances between the portions of the user represented by the pixels and the capture device used to obtain the depth image. An equation for calculating the depth-based center-of-mass position was described above, and thus, need to be described again. At step 1314, pixel masses stored at instances of step 1310 can be accessed and applied to the aforementioned equation.

In accordance with certain embodiments, in addition to determining a depth-based center-of-mass, a depth-based inertia tensor can also be determined based on a depth image. When determining a depth-based inertia tensor, each pixel is treated as a particle, and the depth-base inertia tensor is built up relative to the determined depth-based center-of-mass position. More specifically, in an embodiment, the depth-based inertia tensor is calculated using the following equation:

$$I = \sum_{i=1}^{n} m_i ((r_i \cdot r_i) E - r_i \otimes r_i) \quad \text{(Equation 9)}$$

where I is the overall 3×3 depth-based inertia tensor, n is the number of pixels corresponding to the user, $m_i$ is the mass of a particular pixel corresponding to the user (e.g., computed using Equation 9 above), $r_i$ is the three-dimensional vector from the pixel to the depth-based center-of-mass position, E is the 3×3 identity matrix, "·" is the dot product operator, and "$\otimes$" is the outer-product operator.

In accordance with certain embodiments, the depth-based inertia tensor is then scaled, under the assumption that the mass of the player's silhouette is a standard mass (e.g. 75 kg). In a specific embodiment, a scaler is calculated by summing up the $m_i$'s, and dividing the standard mass by that sum, as shown in the below equation:

$$\text{scale} = \frac{M_S}{\sum_{i=1}^{n} m_i} \quad \text{(Equation 10)}$$

where $M_s$ is the standard mass (e.g. 75 kg). The depth-based inertia tensor is then scaled by that scalar, as shown in the below equation:

$$I_{scaled} = \text{scale} * I \quad \text{(Equation 11)}$$

A reason for scaling the depth-based inertia tensor is so that updates to an application, to which the scaled depth-based inertia tensor is being reported, are not influenced by the size of the user. In other words, the scaling enables an application (e.g., 246) to interpret movements or other behaviors by a relatively husky user similarly to how the application interprets movements or other behaviors by a relatively skinny user. Another reason for scaling the depth-based inertia tensor is so that updates to an application, to which the scaled depth-based inertia tensor is being reported, are not influenced by how close a user is positioned relative to the capture device. In other words, the scaling enables an application (e.g., 246) to interpret movements or other behaviors by a user positioned relatively close to the capture device similarly to how the application interprets movements or other behaviors of a user positioned relative far away from the capture device. A scaled depth-based inertia tensor can also be referred to as a scaled version of the depth-based inertia tensor.

Where more than one user is represented in a depth image, a separate instance of the method of FIG. 13A (and FIG. 13B discussed below) can be performed for each user. For example, assume that a first group of pixels in a depth image correspond to a first user, and a second group of pixels in the same depth image correspond to a second user. This would result in is a first depth-based center-of-mass position for the plurality of pixels corresponding to the first user that accounts for distances between the portions of the first user represented by the first group of pixels and the capture device used to obtain the depth image. This would also result in is a second depth-based center-of-mass position for the plurality of pixels corresponding to the second user that accounts for distances between the portions of the second user represented by the second group of pixels and the capture device used to obtain the depth image. Additionally, this can result in a first depth-based inertia tensor for the plurality of pixels corresponding to the first user, and a second depth-based inertia tensor for the plurality of pixels corresponding to the second user.

The method described with reference to FIG. 13A can be repeated for additional depth images, thereby resulting in a depth-based center-of-mass position, as well as a depth-based inertia tensor, being determined for each of a plurality of depth images. Where more than one user is represented in a depth image, each time the method is repeated, a separate depth-based center-of-mass position and depth-based inertia tensor can be determined for each user represented in the depth image. The determined depth-based center-of-mass positions and depth-based inertia tensors, and/or changes therein, can be used to track user behaviors, and changes in user behaviors. For example, determined depth-based center-of-mass positions and/or depth-based inertia tensors can be reported to an application (e.g., 246), as indicated at steps 1316 and 1320, and the application can be updated based on the depth-based center-of-mass positions and/or depth-based inertia tensors reported to an application. As indicated at step 1319, the depth-based inertia tensor can be scaled before it is reported to an application, as was described above in the discussion of Equation 11.

In an embodiment, the principal axes of a depth-based inertia tensor can be determined and used to identify the "long axis" of a user when the user is extended (e.g., standing, in a push-up position, or in a plank position). More specifically, the depth-based inertia tensor can be decomposed into eigenvectors and eigenvalues. The "long axis" of the user can then be identified by identifying the shortest eigenvalue's eigenvector. For example, when a user is standing, the eigenvector associated with the smallest eigenvalue will be straight up. For another example, when a user is in a push-up or plank position, the eigenvector associated with the smallest eigenvalue will be along the user's body line.

For certain applications, depth-based center-of-mass positions and/or depth-based inertia tensors may provide the applications with sufficient information to update the applications. For other applications, depth-based center-of-mass positions and/or depth-based inertia tensors may provide the applications with insufficient information to update the applications. For example, where an application is attempting to determine whether a user is properly performing a jumping jack type of exercise, it may be insufficient for the application to solely keep track of depth-based center-of-mass positions and/or depth-based inertia tensors.

Figure 13B:
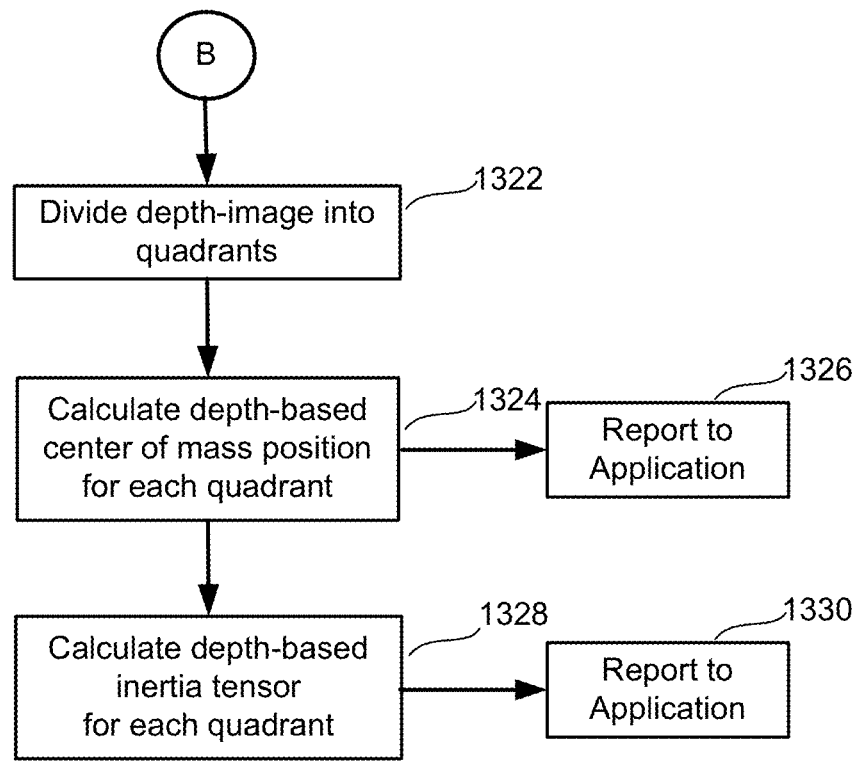
Figure 15:
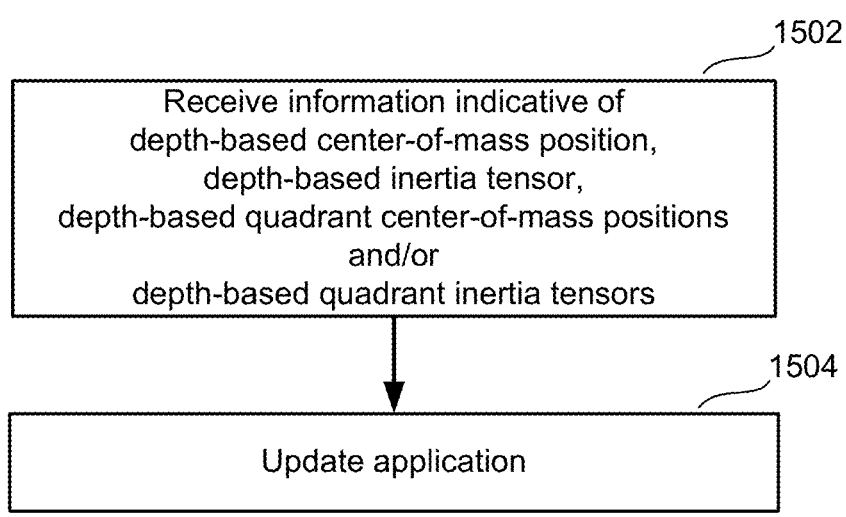
FIG. 15 illustrates a high level flow diagram that is used to summarize how an application can be updated based on information determined in accordance with embodiments described with reference to FIGS. 13A-13B.

Referring now to FIG. 13B, as indicated at steps 1322 and 1324, in accordance with certain embodiments, in order to glean additional useful information from a depth image, a plurality of pixels corresponding to a user is divided into quadrants, and a separate depth-based quadrant center-of-mass position is determined for each of the quadrants. Additionally, a separate depth-based quadrant inertia tensor can be determined for each of the quadrants, as indicated at step 1328. The determined depth-based quadrant center-of-mass positions and depth-based quadrant inertia tensors, and/or changes therein, can be used to track user behaviors, and changes in user behaviors. More specifically, the determined depth-based quadrant center-of-mass positions and/or depth-based quadrant inertia tensors can be reported to an application (e.g., 246), as indicated at steps 1326 and 1330, and the application can be updated based on the depth-based quadrant center-of-mass positions and/or depth-based quadrant inertia tensors reported to an application. Tracking changes in depth-based quadrant center-of-mass positions and/or depth-based quadrant inertia tensors enables changes in position (and thus, motion) of specific body parts and/or changes in the mass distribution of a user to be tracked, as can be appreciated from FIGS. 14A and 14B discussed below.

In an embodiment, when dividing a plurality of pixels corresponding to a user (of a depth image) into quadrants at step 1324, the depth-based center-of-mass position determined at step 1314 is used as the point where the corners of all four of the quadrants meet one another. Explained another way, at step 1324, two lines that intersect at the depth-based center-of-mass position determined at step 1314 can be used to divide a plurality of pixels corresponding to a user (of a depth image) into quadrants. In an embodiment, one such line can be a vertical line that is straight up-and-down and intersects the depth-based center-of-mass position determined at step 1314, and the other line can be a horizontal line that is perpendicular to the vertical line and intersects the vertical line at the depth-based center-of-mass position. However, using such arbitrarily drawn lines to divide the plurality of pixels corresponding to a user (of a depth image) into quadrants does not take into account the actual position of the user. Another technique, according to an alternative embodiment, is to identify the principal axes of the depth-based inertia tensor, and selecting one of the principal axes to use as the line that divides the plurality of pixels corresponding to a user (of a depth image) lengthwise. A line perpendicular to the selected one of the principal axes (used as the aforementioned dividing line) that intersects the depth-based center-of-mass position (determined at step 1314) can then be used as the line the divides the plurality of pixels corresponding to a user (of a depth image) widthwise. These techniques can be further appreciated from the below discussion of FIGS. 14A and 14B.

Figure 14A:
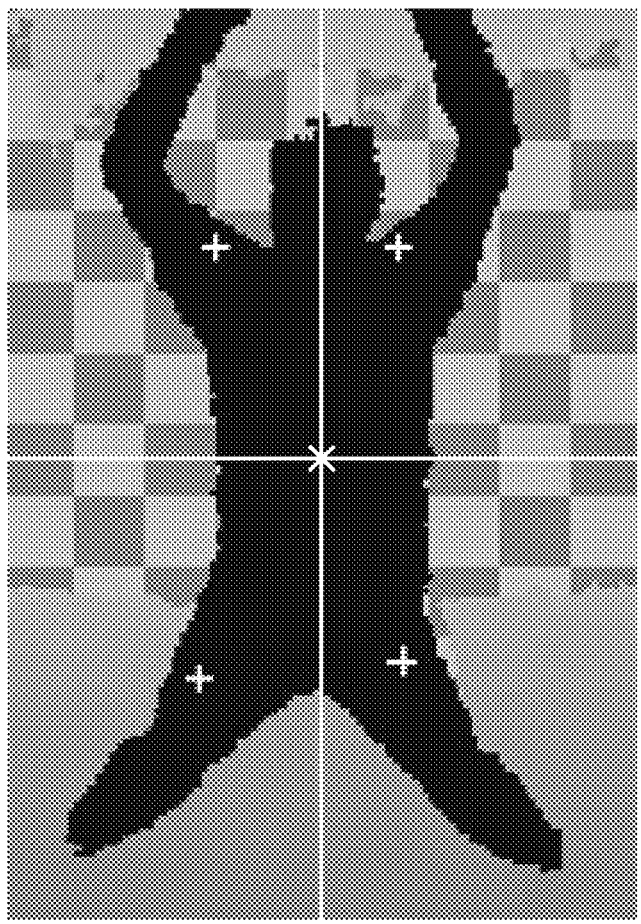
FIG. 14A, which shows a silhouette representing a plurality of pixels corresponding to a user (of a depth image) performing a jumping jack, is used to illustrate an exemplary depth-based center-of-mass position, and exemplary depth-based quadrant center-of-mass positions.

Referring to FIG. 14A, the silhouette shown therein represents a plurality of pixels corresponding to a user of a depth image. The white "x" in the middle of the silhouette represents that depth-based center-of-mass position determined for the plurality of pixels corresponding to the user. The horizontal and vertical white lines that intersect the silhouette at the white "x" illustrate lines that can be used to divide the plurality of pixels corresponding to the user into quadrants. The four white "+"s represent the depth-based quadrant center-of-mass positions determined for the respective quadrants. The user represented in the depth image is performing a jumping jack type of exercise. If only the depth-based center-of-mass position (represented by the white "x") were being tracked for a plurality of consecutive depth images, then the depth-based center-of-mass position may move up and down over time. However, it would be difficult to determine, based solely on the depth-based center-of-mass position moving up and down, whether the user is simply jumping up and down (without moving their arms and legs as should be done in a proper jumping jack), or is performing a proper jumping jack. Additional useful information can be gleaned where a depth-based quadrant center-of-mass position determined for each of the quadrants, as can be appreciated from FIG. 14A. For example, it is expected that each depth-based quadrant center-of-mass position will move back and forth along a predictable path when the user performs a proper jumping jack. Even further useful information can be gleaned by determining a depth-based quadrant inertia tensor for each of the quadrants. For example, the depth-based quadrant inertia tensor can be used to determine whether a user is moving a specific limb toward the capture device, or away from the capture device. These are just a few examples of the types of user behaviors that can be deciphered by analyzing depth-based quadrant center-of-mass positions and/or depth-based quadrant inertia tensors. One of ordinary skill in the art reading this description will appreciate that a myriad of other behaviors can also be identified based on depth-based quadrant center-of-mass positions and/or depth-based quadrant inertia tensors.

Figure 14B:
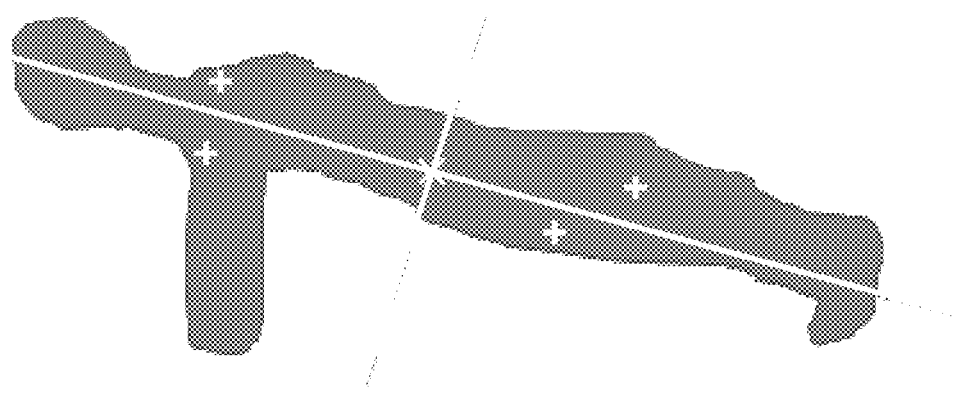
FIG. 14B, which shows a silhouette representing a plurality of pixels corresponding to a user (of a depth image) performing a push-up, is used to illustrate an exemplary depth-based center-of-mass position, and exemplary depth-based quadrant center-of-mass positions.

FIG. 14B is used to illustrate why it is beneficial to use one of the principal axes, of a depth-based inertia tensor determined at step 1318, as the line the divides the plurality of pixels corresponding to a user (of a depth image) lengthwise. Referring to FIG. 14B, the silhouette shown therein represents a plurality of pixels corresponding to a user of a depth image, where the user is performing a push-up type of exercise. In FIG. 14B, the white line that extends from the head to the feet of the silhouette corresponds one of the principal axes that is determined based on a depth-based inertia tensor. The other white line shown in FIG. 14B, which is perpendicular to the aforementioned principal axis and intersects the depth-based center-of-mass position (determined at step 1314), is used as the line the divides the plurality of pixels corresponding to the user (of the depth image) widthwise. Exemplary depth-based quadrant center-of-mass positions determined for each of the quadrants are illustrated as white "+"s. In FIG. 14B, the user represented by the pixels is doing a push-up, as mentioned above. It can be appreciated from FIG. 14B that if arbitrary horizontal and vertical lines were used to divide the plurality of pixels corresponding to the user into quadrants, at least one of the quadrants may include a relatively few amount of pixels from which it would be difficult to glean useful information.

Still referring to FIG. 14B, one of the two lines that divides the plurality of pixels (corresponding to a user) into quadrants is used to separate the two upper quadrants from the two lower quadrants. Depending upon implementation, and depending upon the user's position, this line (that divides two upper from the two lower quadrants) can be a principal axis, or a line perpendicular to the principal axis.

As mentioned above, a depth image and an RGB image can be obtained using the capture device 120 and transmitted to the computing system 112 at a rate of thirty frames per second, or at some other rate. The depth image can be transmitted separately from the RGB image, or both images can be transmitted together. Continuing with the above example, the above described depth-based center-of-mass position, as well as the above described depth-based inertia tensor, can be determined for each depth image frame, and thus, thirty depth-based center-of-mass positions, as well as thirty depth-based inertia tensors can be determined per second. Additionally, for each depth image frame, depth-based quadrant center-of-mass positions and depth-based quadrant inertia tensors can be determined Such determinations can be performed by the runtime engine 244 discussed above with reference to FIG. 12. Even more specifically, the depth-based center-of-mass module 254 and the depth-based inertia tensor module 256 discussed with reference to FIG. 12 can be used to perform such determinations.

Referring back to FIG. 2, the runtime engine 244 can report its determination to the application 246. Such reporting was also discussed above with reference to steps 1316, 1320, 1326 and 730 in FIGS. 13A and 13B. Referring now to FIG. 5, at step 1502 the application receives information indicative of the depth-based center-of-mass position, the depth-based inertia tensor, the depth-based quadrant center-of-mass positions and/or the depth-based quadrant inertia tensors. As shown at step 1504, the application is updated based on such information. For example, as mentioned above, such information can be used to track a user performing certain exercises, such as squats, lunges, push-ups, jumps, or jumping jacks so that an avatar of the user can be controlled, points can be awarded to the user and/or feedback can be provided to the user. For a more specific example, where the application 246 is a game that instructs a user to perform certain exercises, the application 246 can determine whether a user has performed an exercise with correct form, and where they have not, can provide feedback to the user regarding how the user can improve their form.

It is also possible that the runtime engine 244 interacts with the gestures library 240 to compare motion or other behavior tracked based on the depth images to depth-based gesture filters, to determine whether a user (as represented by pixels of the depth images) has performed one or more gestures. Those gestures may be associated with various controls of the application 246. Thus, the computing system 112 may use the gestures library 240 to interpret movements detected based on the depth images and to control the application 246 based on the movements. As such, gestures library may be used by runtime engine 244 and the application 246.

The camera (e.g., 226) that is used to obtain depth images may be tilted relative to the floor upon which a user is standing or otherwise supporting themselves. To account for such camera tilt, a gravity vector can be obtained from a sensor (e.g., an accelerometer) or in some other manner, and factored in when calculating the depth-based center-of-mass position, the depth-based inertia tensor, the depth-based quadrant center-of-mass positions and/or the depth-based quadrant inertia tensors. Such accounting for camera tilt (also referred to as tilt correction) can be performed on pixels that correspond to a user, before such pixels are used to determine the depth-based center-of-mass position, the depth-based inertia tensor, the depth-based quadrant center-of-mass positions and/or the depth-based quadrant inertia tensors, in the manners described above. In certain embodiments, the tilt correction is performed by computing a rotation matrix, which rotates the gravity vector to a unit-y vector, and the computed rotation matrix is applied to pixels before the pixels are used determine the depth-based center-of-mass position, the depth-based inertia tensor, the depth-based quadrant center-of-mass positions and/or the depth-based quadrant inertia tensors. For example, if an x,y,z gravity matrix were (0.11, 0.97, 0.22), then the computed rotation matrix that would rotate the gravity matrix to be (0.0, 1.0, 0.0). In alternative embodiments, the depth-based center-of-mass position, the depth-based inertia tensor, the depth-based quadrant center-of-mass positions and/or the depth-based quadrant inertia tensors are calculated without tilt correction, and then the computed rotation matrix is applied to the depth-based determinations after they have been determined, to thereby de-tilt the results. In still other embodiments, instead of using a rotation matrix to perform tilt correction, the tilt correction can be performed using a quaternion. Computation of a rotation matrix or a quaternion can be performed using well known standard techniques, as would be appreciated by one or ordinary skill in the art reading this description. Accordingly, it can be appreciated that any depth-based center-of-mass position, depth-based inertia tensor, depth-based quadrant center-of-mass positions and/or depth-based quadrant inertia tensors that is/are used to update an application, as described above, can have already have been tilt corrected.

Example Computing Systems

Figure 16:
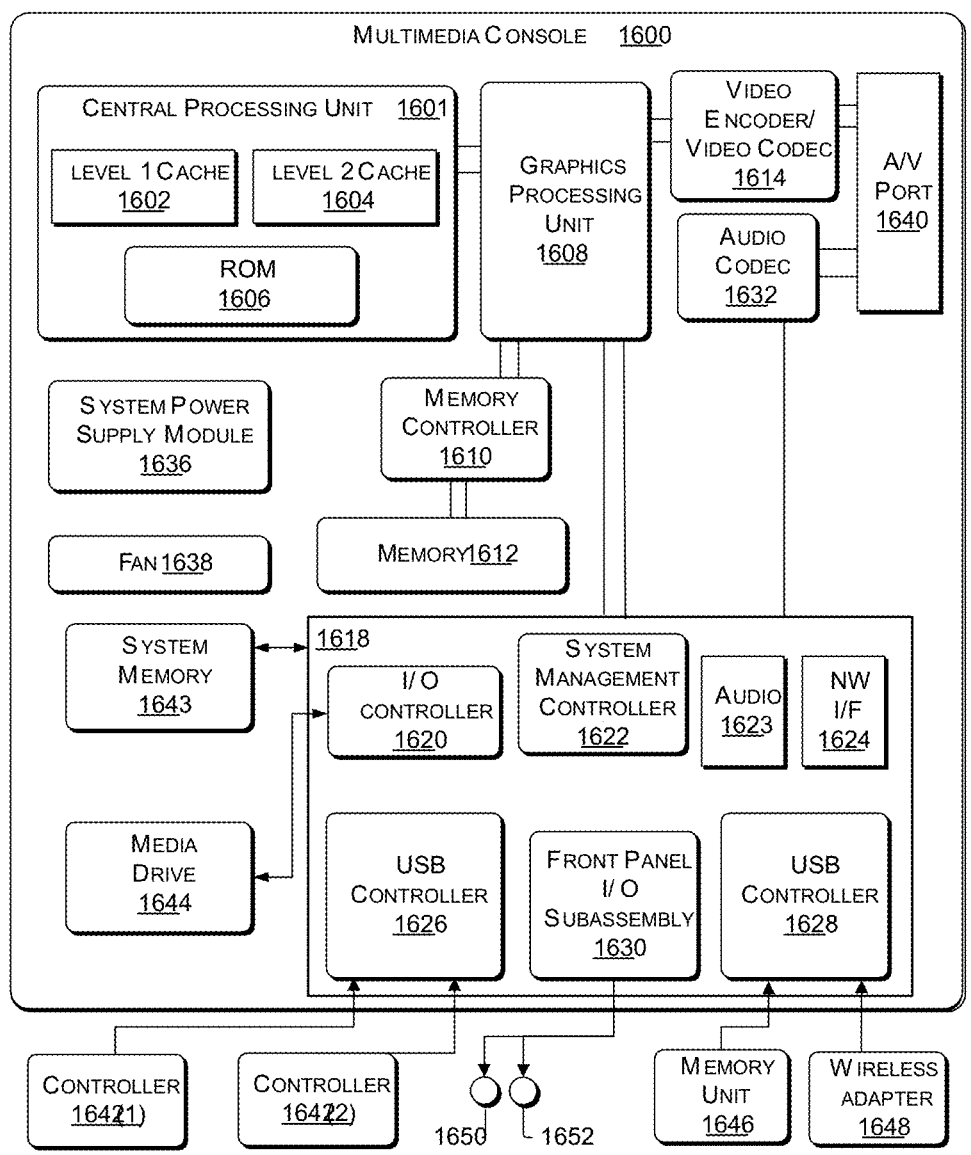
FIG. 16 illustrates an example embodiment of a computing system that may be used to track user behavior and update an application based on the user behavior.

FIG. 16 illustrates an example embodiment of a computing system that may be the computing system 112 shown in FIGS. 1A-2 used to track motion and/or animate (or otherwise update) an avatar or other on-screen object displayed by an application. The computing system such as the computing system 112 described above with respect to FIGS. 1A-2 may be a multimedia console, such as a gaming console. As shown in FIG. 16, the multimedia console 1600 has a central processing unit (CPU) 1601 having a level 1 cache 102, a level 2 cache 1604, and a flash ROM (Read Only Memory) 1606. The level 1 cache 1602 and a level 2 cache 1604 temporarily store data and hence reduce the number of memory access cycles, thereby improving processing speed and throughput. The CPU 1601 may be provided having more than one core, and thus, additional level 1 and level 2 caches 1602 and 1604. The flash ROM 1606 may store executable code that is loaded during an initial phase of a boot process when the multimedia console 1600 is powered ON.

A graphics processing unit (GPU) 1608 and a video encoder/video codec (coder/decoder) 1614 form a video processing pipeline for high speed and high resolution graphics processing. Data is carried from the graphics processing unit 1608 to the video encoder/video codec 1614 via a bus. The video processing pipeline outputs data to an A/V (audio/video) port 1640 for transmission to a television or other display. A memory controller 1610 is connected to the GPU 1608 to facilitate processor access to various types of memory 1612, such as, but not limited to, a RAM (Random Access Memory).

The multimedia console 1600 includes an I/O controller 1620, a system management controller 1622, an audio processing unit 1623, a network interface 1624, a first USB host controller 1626, a second USB controller 1628 and a front panel I/O subassembly 1630 that are preferably implemented on a module 1618. The USB controllers 1626 and 1628 serve as hosts for peripheral controllers 1642(1)-1642(2), a wireless adapter 1648, and an external memory device 1646 (e.g., flash memory, external CD/DVD ROM drive, removable media, etc.). The network interface 1624 and/or wireless adapter 1648 provide access to a network (e.g., the Internet, home network, etc.) and may be any of a wide variety of various wired or wireless adapter components including an Ethernet card, a modem, a Bluetooth module, a cable modem, and the like.

System memory 1643 is provided to store application data that is loaded during the boot process. A media drive 1644 is provided and may comprise a DVD/CD drive, Blu-Ray drive, hard disk drive, or other removable media drive, etc. The media drive 1644 may be internal or external to the multimedia console 1600. Application data may be accessed via the media drive 1644 for execution, playback, etc. by the multimedia console 1600. The media drive 1644 is connected to the I/O controller 1620 via a bus, such as a Serial ATA bus or other high speed connection (e.g., IEEE 1394).

The system management controller 1622 provides a variety of service functions related to assuring availability of the multimedia console 1600. The audio processing unit 1623 and an audio codec 1632 form a corresponding audio processing pipeline with high fidelity and stereo processing. Audio data is carried between the audio processing unit 1623 and the audio codec 1632 via a communication link. The audio processing pipeline outputs data to the A/V port 1640 for reproduction by an external audio player or device having audio capabilities.

The front panel I/O subassembly 1630 supports the functionality of the power button 1650 and the eject button 1652, as well as any LEDs (light emitting diodes) or other indicators exposed on the outer surface of the multimedia console 1600. A system power supply module 1636 provides power to the components of the multimedia console 1600. A fan 1638 cools the circuitry within the multimedia console 1600.

The CPU 1601, GPU 1608, memory controller 1610, and various other components within the multimedia console 1600 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 1600 is powered ON, application data may be loaded from the system memory 1643 into memory 1612 and/or caches 1602, 1604 and executed on the CPU 1601. The application may present a graphical user interface that provides a consistent user experience when navigating to different media types available on the multimedia console 1600. In operation, applications and/or other media contained within the media drive 1644 may be launched or played from the media drive 1644 to provide additional functionalities to the multimedia console 1600.

The multimedia console 1600 may be operated as a standalone system by simply connecting the system to a television or other display. In this standalone mode, the multimedia console 1600 allows one or more users to interact with the system, watch movies, or listen to music. However, with the integration of broadband connectivity made available through the network interface 1624 or the wireless adapter 1648, the multimedia console 1600 may further be operated as a participant in a larger network community.

When the multimedia console 1600 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 Kbps), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 1600 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 1601 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 1642(1) and 1642(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 226, 228 and capture device 120 may define additional input devices for the console 1600 via USB controller 1626 or other interface.

Figure 17:
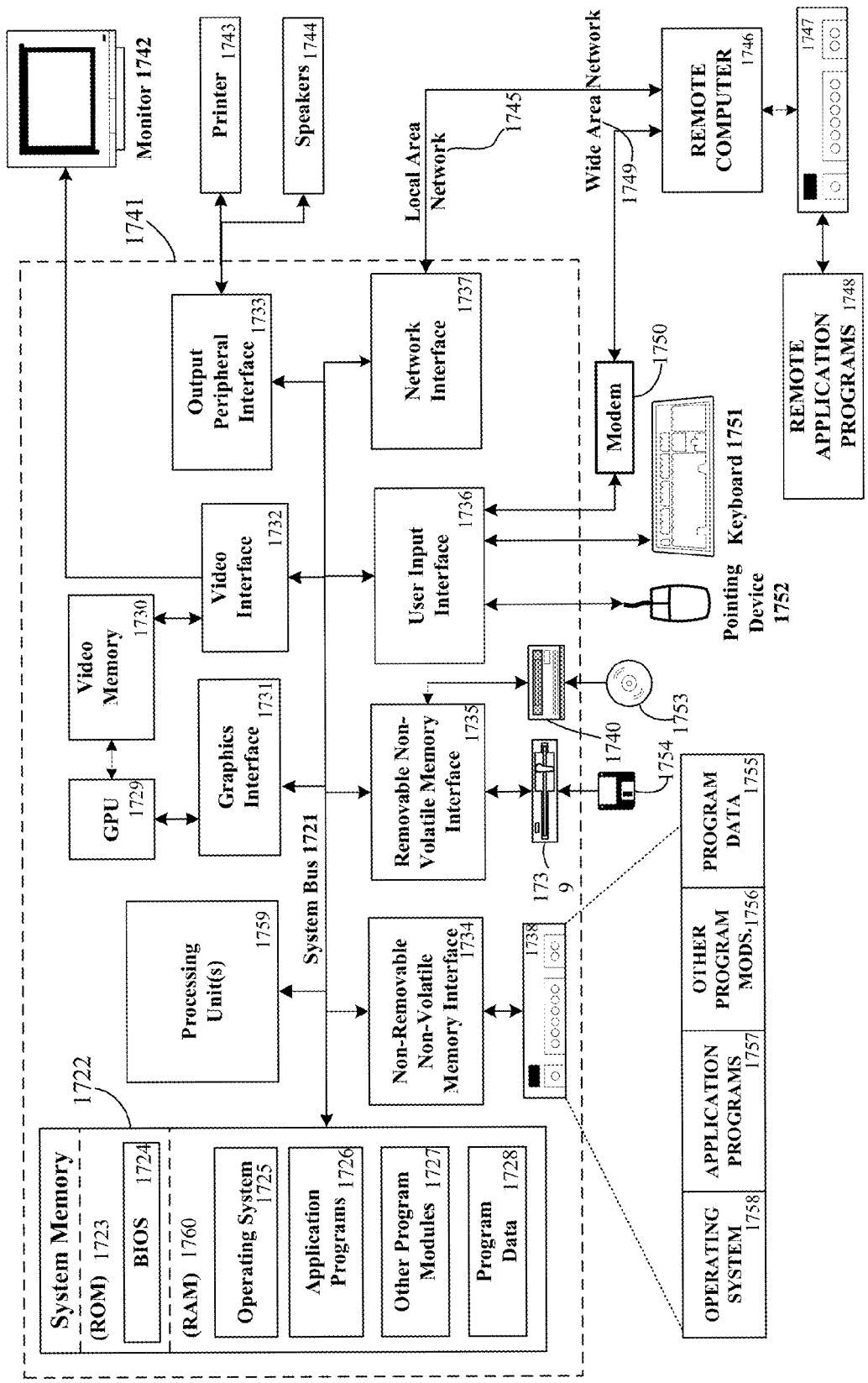
FIG. 17 illustrates another example embodiment of a computing system that may be used to track user behavior and update an application based on the tracked user behavior.

FIG. 17 illustrates another example embodiment of a computing system 1720 that may be the computing system 112 shown in FIGS. 1A-2 used to track motion and/or animate (or otherwise update) an avatar or other on-screen object displayed by an application. The computing system 1720 is only one example of a suitable computing system and is not intended to suggest any limitation as to the scope of use or functionality of the presently disclosed subject matter. Neither should the computing system 1720 be interpreted as having any dependency or requirement relating to any one or combination of components illustrated in the exemplary computing system 1720. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computing system 1720 comprises a computer 1741, which typically includes a variety of computer readable media. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer readable media can be any available media that can be accessed by computer 1741 and includes both volatile and nonvolatile media, removable and non-removable media. The system memory 1722 includes computer readable storage media in the form of volatile and/or nonvolatile memory such as read only memory (ROM) 1723 and random access memory (RAM) 1760. A basic input/output system 1724 (BIOS), containing the basic routines that help to transfer information between elements within computer 1741, such as during start-up, is typically stored in ROM 1723. RAM 1760 typically contains data and/or program modules that are immediately accessible to and/or presently being operated on by processing unit 1759. By way of example, and not limitation, FIG. 17 illustrates operating system 1725, application programs 1726, other program modules 1727, and program data 1728.

The computer 1741 may also include other removable/non-removable, volatile/nonvolatile computer readable storage media. By way of example only, FIG. 17 illustrates a hard disk drive 1738 that reads from or writes to non-removable, nonvolatile magnetic media, a magnetic disk drive 1739 that reads from or writes to a removable, nonvolatile magnetic disk 1754, and an optical disk drive 1740 that reads from or writes to a removable, nonvolatile optical disk 1753 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1738 is typically connected to the system bus 1721 through an non-removable memory interface such as interface 1734, and magnetic disk drive 1739 and optical disk drive 1740 are typically connected to the system bus 1721 by a removable memory interface, such as interface 1735.

The drives and their associated computer storage media discussed above and illustrated in FIG. 17, provide storage of computer readable instructions, data structures, program modules and other data for the computer 1741. In FIG. 17, for example, hard disk drive 1738 is illustrated as storing operating system 1758, application programs 1757, other program modules 1756, and program data 1755. Note that these components can either be the same as or different from operating system 1725, application programs 1726, other program modules 1727, and program data 1728. Operating system 1758, application programs 1757, other program modules 1756, and program data 1755 are given different numbers here to illustrate that, at a minimum, they are different copies. A user may enter commands and information into the computer 1741 through input devices such as a keyboard 1751 and pointing device 1752, commonly referred to as a mouse, trackball or touch pad. Other input devices (not shown) may include a microphone, joystick, game pad, satellite dish, scanner, or the like. These and other input devices are often connected to the processing unit 1759 through a user input interface 1736 that is coupled to the system bus, but may be connected by other interface and bus structures, such as a parallel port, game port or a universal serial bus (USB). The cameras 226, 228 and capture device 120 may define additional input devices for the computing system 1720 that connect via user input interface 1736. A monitor 1742 or other type of display device is also connected to the system bus 1721 via an interface, such as a video interface 1732. In addition to the monitor, computers may also include other peripheral output devices such as speakers 1744 and printer 1743, which may be connected through a output peripheral interface 1733. Capture Device 120 may connect to computing system 1720 via output peripheral interface 1733, network interface 1737, or other interface.

The computer 1741 may operate in a networked environment using logical connections to one or more remote computers, such as a remote computer 1746. The remote computer 1746 may be a personal computer, a server, a router, a network PC, a peer device or other common network node, and typically includes many or all of the elements described above relative to the computer 1741, although only a memory storage device 1747 has been illustrated in FIG. 17. The logical connections depicted include a local area network (LAN) 1745 and a wide area network (WAN) 1749, but may also include other networks. Such networking environments are commonplace in offices, enterprise-wide computer networks, intranets and the Internet.

When used in a LAN networking environment, the computer 1741 is connected to the LAN 1745 through a network interface 1737. When used in a WAN networking environment, the computer 1741 typically includes a modem 1750 or other means for establishing communications over the WAN 1749, such as the Internet. The modem 1750, which may be internal or external, may be connected to the system bus 1721 via the user input interface 1736, or other appropriate mechanism. In a networked environment, program modules depicted relative to the computer 1741, or portions thereof, may be stored in the remote memory storage device. By way of example, and not limitation, FIG. 17 illustrates application programs 1748 as residing on memory device 1747. It will be appreciated that the network connections shown are exemplary and other means of establishing a communications link between the computers may be used.

Figure 18:
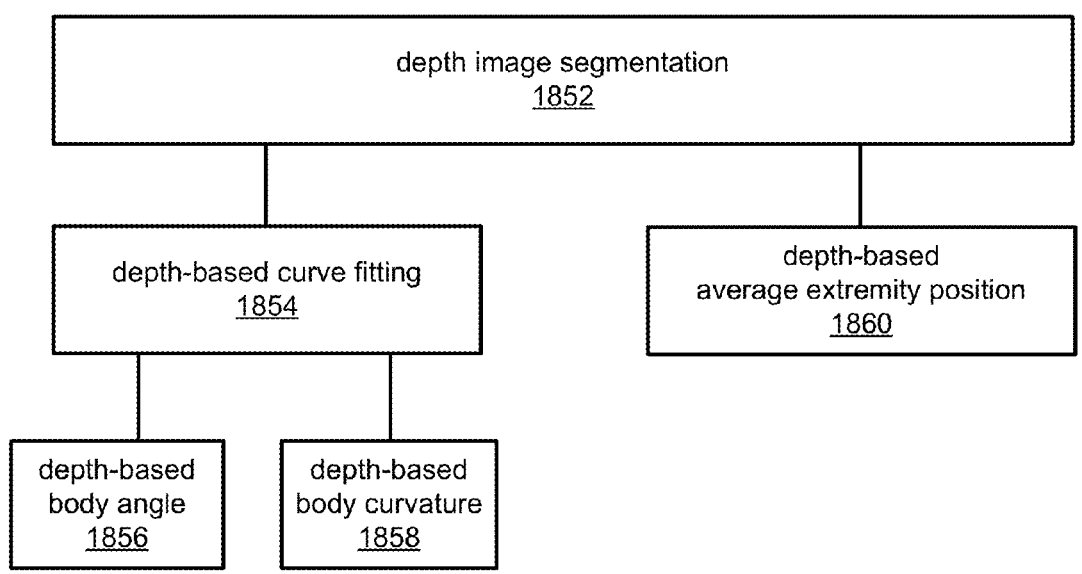
FIG. 18 illustrates an example embodiment of the runtime engine introduced in FIG. 2.

FIG. 18 illustrates an example embodiment of the runtime engine 244 introduced in FIG. 2. Referring to FIG. 18, the runtime engine 244 is shown as including a depth image segmentation module 1852, a depth-based curve fitting module 1854, a depth-based body angle module 1856, a depth-based body curvature module 1858, and a depth-based average extremity position module 1860. In an embodiment, the depth image segmentation module 1852 is configured to detect one or more users (e.g., human targets) within a depth image, and associates a segmentation value with each pixel. Such segmentation values are used to indicate which pixels correspond to a user. For example, a segmentation value of 1 can be assigned to all pixels that correspond to a first user, a segmentation value of 2 can be assigned to all pixels that correspond to a second user, and an arbitrary predetermined value (e.g., 255) can be assigned to the pixels that do not correspond to a user. It is also possible that segmentation values can be assigned to objects, other than users, that are identified within a depth image, such as, but not limited to, a tennis racket, a jump rope, a ball, a floor, or the like. In an embodiment, as a result of a segmentation process performed by the depth image segmentation module 1852, each pixel in a depth image will have four values associated with the pixel, including: an x-position value (i.e., a horizontal value); a y-position value (i.e., a vertical value); a z-position value (i.e., a depth value); and a segmentation value, which was just explained above. In other words, after segmentation, a depth image can specify that a plurality of pixels correspond to a user, wherein such pixels can also be referred to as a depth-based silhouette or a depth image silhouette of a user. Additionally, the depth image can specify, for each of the pixels corresponding to the user, a pixel location and a pixel depth. The pixel location can be indicated by an x-position value (i.e., a horizontal value) and a y-position value (i.e., a vertical value). The pixel depth can be indicated by a z-position value (also referred to as a depth value), which is indicative of a distance between the capture device (e.g., 120) used to obtain the depth image and the portion of the user represented by the pixel.

Still referring to FIG. 18, in an embodiment, the depth-based curve fitting module 1854 is used to fit a curve to a portion of the plurality of pixels corresponding to a user. The depth-based body angle module 1856 is used to determine information indicative of an angle of a user's body, and the depth-based body curvature module 1858 is used to determine information indicative of a curvature of a user's body. Additional details relating to determining information indicative of an angle of a user's body, and determining information indicative of a curvature of a user's body, are described below with reference to FIGS. 19-22. The depth-based average extremity position module 1860 is used to determine information indicative of extremities of a user's body, additional details of which are described below with reference to FIGS. 23A-29. The runtime engine 244 can also include additional modules which are not described herein.

Depending upon what user behavior is being tracked, it would sometimes be useful to be able to determine information indicative of an angle of a user's body and/or information indicative of a curvature of a user's body. For example, such information can be used to analyze a user's form when performing certain exercises, so that an avatar of the user can be controlled, points can be awarded to the user and/or feedback can be provided to the user. The term exercise, as used herein, can refer to calisthenics exercises, such as push-ups, as well as types of exercises that often involve poses, such as yoga and palates, but is not limited thereto. For example, in certain exercises, such as push-ups and various plank exercises (e.g., a traditional plank, also known as an elbow plank, a side plank, a side plank leg lift, and an up-down plank), a user's body or a portion thereof (e.g., the user's back) is supposed to be straight. In other exercises, such a downward dog yoga exercise, an upward facing dog yoga exercise, a user's body or a portion thereof is supposed to be curved in a specific manner. Skeletal tracking (ST) techniques are typically unreliable for tracking a user performing such types of exercises, especially where the exercises involve the user laying or sitting on or near the floor. Certain embodiments described below, rely on depth images to determine information indicative of an angle of a user's body and/or information indicative of a curvature of a user's body. Such embodiments can be used in place of, or to supplement, skeletal tracking (ST) techniques that are often used to detect user behaviors based on RGB images.

Figure 19:
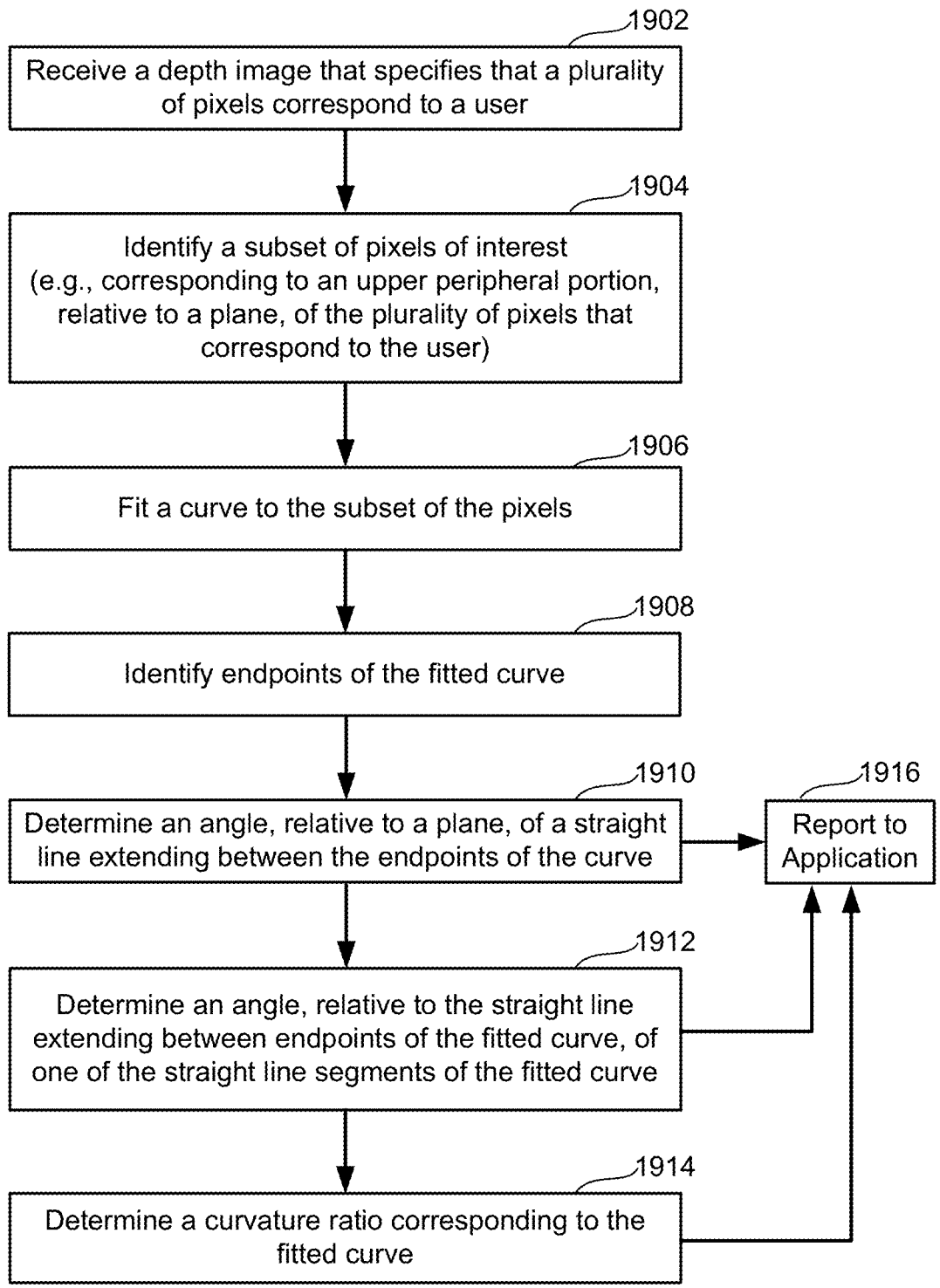
FIG. 19 illustrate a high level flow diagram that is used to summarize methods for determining information indicative of an angle and/or curvature of a user's body based on a depth image.

The high level flow diagram of FIG. 19 will now be used to summarize a method for determining information indicative of an angle of a user's body and/or information indicative of a curvature of the user's body based on a depth image. At step 1902, a depth image is received, wherein the depth image specifies that a plurality of pixels correspond to a user. The depth image can be obtained using a capture device (e.g., 120) located a distance from the user (e.g., 118). More generally, a depth image and a color image can be captured by any of the sensors in capture device 120 described herein, or other suitable sensors known in the art. In one embodiment, the depth image is captured separately from the color image. In some implementations, the depth image and color image are captured at the same time, while in other implementations they are captured sequentially or at different times. In other embodiments, the depth image is captured with the color image or combined with the color image as one image file so that each pixel has an R value, a G value, a B value and a Z value (distance). Such a depth image and a color image can be transmitted to the computing system 112. In one embodiment, the depth image and color image are transmitted at 30 frames per second. In some examples, the depth image is transmitted separately from the color image. In other embodiments, the depth image and color image can be transmitted together. Since the embodiments described herein primarily (or solely) rely on use of depth images, the remaining discussion primarily focuses on use of depth images, and thus, does not discuss the color images.

The depth image received at step 1902 can also specify, for each of the pixels corresponding to the user, a pixel location and a pixel depth. As mentioned above, in the discussion of FIG. 18, a pixel location can be indicated by an x-position value (i.e., a horizontal value) and a y-position value (i.e., a vertical value). The pixel depth can be indicated by a z-position value (also referred to as a depth value), which is indicative of a distance between the capture device (e.g., 120) used to obtain the depth image and the portion of the user represented by the pixel. For the purpose of this description it is assumed that the depth image received at step 1902 has already been subject to a segmentation process that determined which pixels correspond to a user, and which pixels do not correspond to a user. Alternatively, if the depth image received at step 1902 has not yet been through a segmentation process, the segmentation process can occur between steps 1902 and 1904.

At step 1904, a subset of pixels that are of interest are identified, wherein a curve will be fit to the identified subset at step 1906 discussed below. As mentioned above, the plurality of pixels of a depth image that correspond to a user can also be referred to as a depth image silhouette of a user, or simply a depth image silhouette. Accordingly, at step 1904, a portion of interest of the depth image silhouette is identified, wherein a curve will be fit to the identified portion at step 1906. In one embodiment, pixels of interest (i.e., the portion of interest of the depth image silhouette) are the pixels that correspond to the torso of the user. In another embodiment, pixels of interest are the pixels that correspond to the legs, torso and head of the user. In a further embodiment, the pixels of interest are the pixels that correspond to an upper peripheral portion, relative to a plane (e.g., the floor supporting the user), of the plurality of pixels corresponding to the user. In still another embodiment, the pixels of interest are the pixels that correspond to a lower peripheral portion, relative to a plane (e.g., the floor supporting the user), of the plurality of pixels corresponding to the user.

At step 1906, a curve is fit to the subset of pixels identified at step 1904, to thereby produce a fitted curve. In certain embodiments, the fitted curve produced at step 1906 includes a plurality of straight line segments. In one embodiment, the fitted curve includes exactly three straight line segments (and thus, two endpoints, and two midpoints) that can be determined, e.g., using a third degree polynomial equation. An example of a fitted curve including exactly three straight line segments is shown in and discussed below with reference to FIGS. 8A-8C. It is also possible that the fitted curve has as few as two straight line segments. Alternatively, the fitted curve can have four or more straight line segments. In still another embodiment, the fitted curve can be a smooth curve, i.e., a curve that is not made up of straight line segments. A myriad of well-known curve fitting techniques can be used to perform step 1906, and thus, additional detail of how to fit a curve to a group of pixels need not be described. At step 1908, the endpoints of the fitted curve are identified.

For much of the remaining description, it will be assumed that the pixels of interest (i.e., the portion of interest of the depth image silhouette) identified at step 1904 are the pixels that correspond to an upper peripheral portion, relative to a plane (e.g., the floor supporting the user), of the plurality of pixels corresponding to the user. A benefit of this embodiment is that determinations based on the identified pixels are not affected by loose hanging clothes of the user. It will also be assumed that the fitted curve produced at step 1906 includes exactly three straight line segments. A benefit of this will be appreciated from the discussion below of step 1914.

Figure 20A:
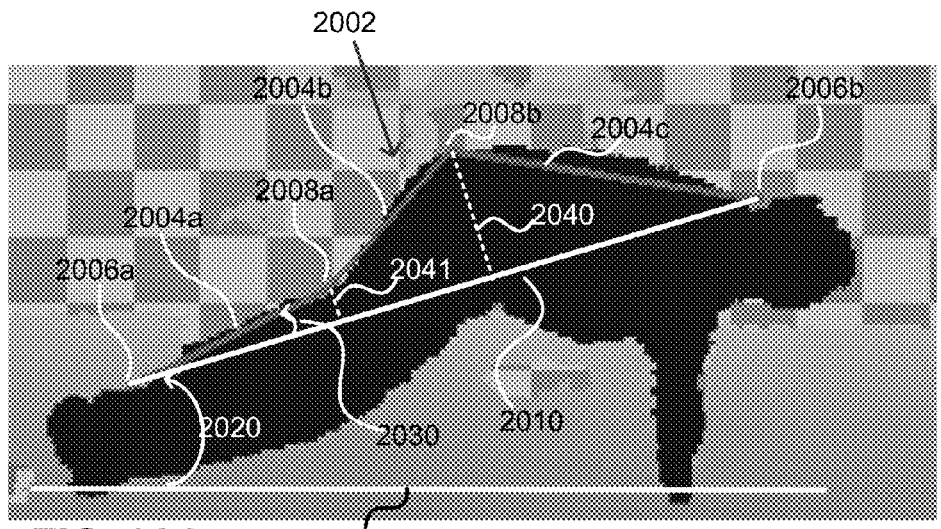
FIGS. 20A-20C, which show silhouettes representing a plurality of pixels corresponding to a user (of a depth image) performing different yoga poses or exercises, are used to explain how information indicative of an angle and/or curvature of a user's body can be determine based on a depth image.
Figure 20B:
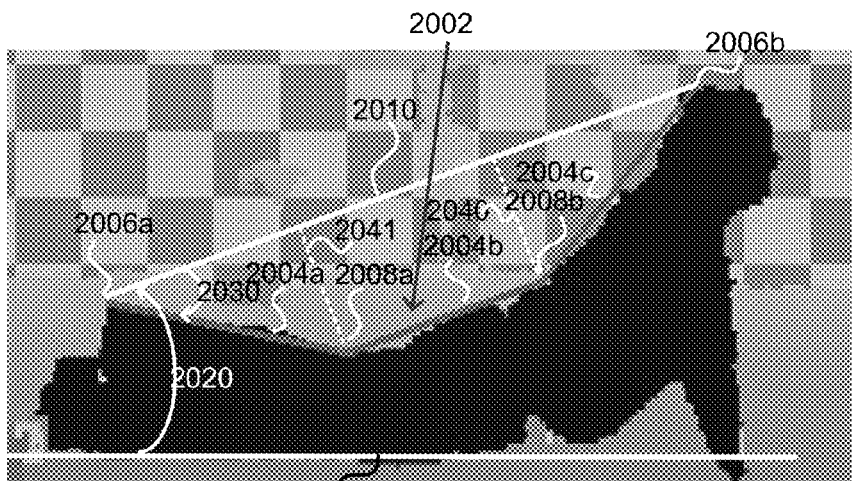
Figure 20C:
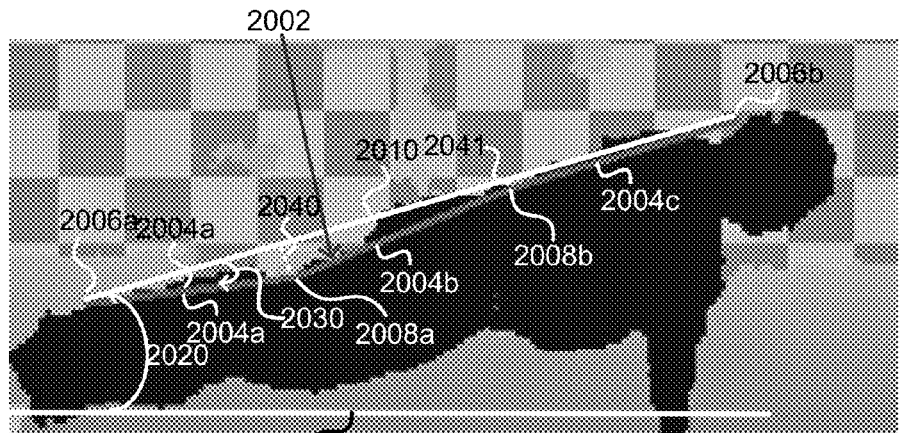

Before continuing with the description of the flow diagram in FIG. 19, reference will briefly be made to FIGS. 20A-20C. Referring to FIG. 20A, the dark silhouette shown therein represents a plurality of pixels (of a depth image) corresponding to a user performing a four-limbed staff yoga pose, which is also known as the Chaturanga Dandasana pose. Also shown in FIG. 20A is a curve 2002 that is fit to the pixels that correspond to an upper peripheral portion, relative to a plane 2012 (e.g., the floor supporting the user), of the plurality of pixels corresponding to the user. Explained another way, the curve 2002 is fitted to the top of the depth image silhouette of the user. The fitted curve 2002 includes three straight line segments 2004a, 2004b and 2004c, which can collectively be referred to as straight line segments 2004. The end points of the fitted curve are labeled 2006a and 2006b, and can be collectively referred to as end points 2006. Mid points of the fitted curve are labeled 2008a and 2008b, and can be collectively referred to as mid points 2008. A straight line extending between the two endpoints is labeled 2010.

FIG. 20B, which is similar to FIG. 20A, corresponds to a point in time after the user has repositioned themselves into another yoga pose. More specifically, in FIG. 20B, the dark silhouette shown therein represent a plurality of pixels (of a depth image) corresponding to the user performing an upward-facing dog yoga pose, which is also known as the Urdhva Mukha Svanasana pose. For consistency, the fitted curve 2002, the straight line segments 2004, the end points 2006, the midpoints 2008, and the straight line 2010 between the end points 2006 are labeled in the same manner in FIG. 20B as they were in FIG. 20A.

In FIG. 20C, the dark silhouette shown therein represent a plurality of pixels (of a depth image) corresponding to the user either performing a plank position yoga pose, or performing a push-up exercise. Again, the fitted curve 2002, the straight line segments 2004, the end points 2006, the midpoints 2008, and the straight line 2010 between the end points 2006 are labeled in the same manner in FIG. 20C as they were in FIGS. 20A and 20B.

Referring again to the flow diagram of FIG. 19, at steps 1910-714 information indicative of an angle of the user's body and information indicative of a curvature of the user's body are determined Such information is reported to an application, as indicated at step 1916, which enables the application to be updated based on the reported information. Additional details of steps 1910-1914 are provided below. When discussing these steps, frequent references to FIGS. 20A-20C are made, to provide examples of the steps being discussed.

At step 1910, there is a determination of an angle of a straight line between the endpoints of the fitted curve, relative to a plane (e.g., the floor supporting the user). In FIG. 20A, the angle 2020 is an example of such an angle. More specifically, the angle 2020 is the angle, relative to the plane 2012, of the straight line 2010 between the endpoints 2006 of the fitted curve 2002. Further examples of the angle 2020 are shown in FIGS. 20B and 20C. The angle 2020, which is indicative of an overall angle of the user's body relative to a plane (e.g., the floor) can be used by an application to determine a likely position or pose of the user, to update an avatar that is being displayed based on the position or pose of the user, and/or to provide feedback to the user regarding whether the user is in a proper position or pose, but is not limited thereto. For more specific examples, such information can provide useful information to an application where a user has been instructed to hold a pose where their back and legs are supposed to be as straight as possible, or are supposed to have a specific curvature.

The angle 2020 in FIG. 20A is similar to the angle 2020 in FIG. 20B, even though the user represented by the pixels is in quite different poses. This occurs because the user's head and feet are in relatively similar positions, even though the position and curvature of the trunk of the user's body has significantly changed. This provides some insight into why it would also be useful obtain information indicative of the curvature of the user's body, as is done at steps 1912 and 1914, discussed below.

At step 1912, there is a determination of an angle of a straight line between the endpoints of the fitted curve, relative to one of the straight line segments of the fitted curve. In FIG. 20A, the angle 2030 is an example of such an angle. More specifically, the angle 2030 is the angle, relative to the straight line segment 2004a (of the fitted curve 2002), of the straight line 2010 between the endpoints 2006 of the fitted curve 2002. Further examples of the angle 2030 are shown in FIGS. 20B and 20C. The angle 2030 in FIG. 20A is a positive angle. By contrast, the angle 2030 in FIG. 20B is a negative angle. Thus, it can be understood how the angle 2030 can be used by an application to distinguish between the different poses of the user. More generally, it can be understood from the above discussion how the angle 2030 is indicative of the curvature of the user's body. In the above example, the angle 2030 is the angle between the straight line 2010 (between the endpoints 2006 of the fitted curve 2002) and the straight line segment 2004a (of the fitted curve 2002). Alternatively, or additionally, the angle between the straight line 2010 (between the endpoints 2006 of the fitted curve 2002) and another straight line segment 2004 (of the fitted curve 2002), such as the straight line segment 2004c, can be determined.

At step 1914, there is a determination of a curvature ratio corresponding to the fitted curve. In accordance with an embodiment, the curvature ratio is the ratio of the length of a first straight line extending between endpoints of the fitted curve, and the length of a second line extending orthogonally from the first straight line to a point of the fitted curve that is farthest away from (i.e., deviates furthest from) the first straight line. For example, referring to FIG. 20A, the curvature ratio is the ratio of the length of the straight line 2010 extending between the endpoints 2006 of the fitted curve 2002, and the length of the line 2040 extending orthogonally from the straight line 2010 to the point of the fitted curve 2002 that is farthest away from the straight line 2010. A benefit of implementing the embodiment where the fitted curve (e.g., 2002) includes exactly three straight line segments is that the length of the second line is very easily and quickly determined, as will be described in additional detail with reference to FIG. 21.

Figure 21:
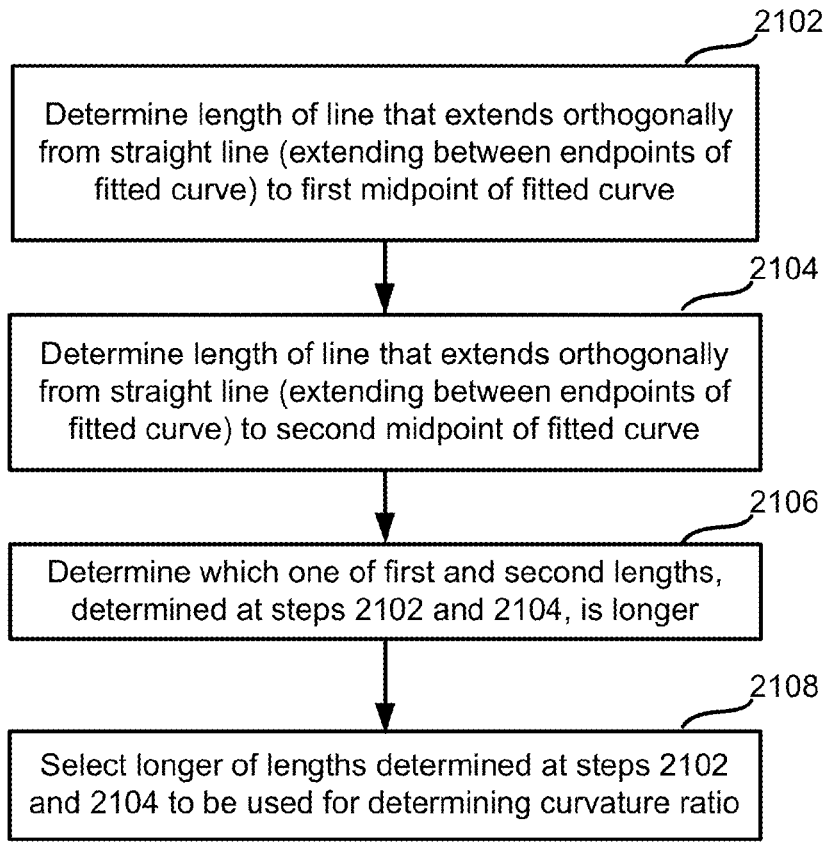
FIG. 21 is a high level flow diagram that is used to provide additional details of one of the steps in FIG. 19, according to an embodiment.

The high level flow diagram of FIG. 21 will now be used to describe a method for determining the curvature ratio where the straight line segments of the fitted curve include exactly straight line segments. Referring to FIG. 21, at step 2102 there is a determination of a length of a line that extends orthogonally from the straight line (extending between endpoints of the fitted curve) to a first midpoint of the fitted curve. At step 2104, there is a determination of a length of a line that extends orthogonally from the straight line (extending between endpoints of the fitted curve) to a second midpoint of the fitted curve. Referring briefly back to FIG. 20A, step 2102 can be performed by determining the length of the line 2041 that extends orthogonally from the straight line 2019 to the midpoint 2008a of the fitted curve 2002. Similarly, step 2104 can be performed by determining the length of the line 2040 that extends orthogonally from the straight line 2019 to the other midpoint 2008b of the fitted curve 2002. Returning to the flow diagram of FIG. 21, at step 2106, there is a determination of which one of the lengths, determined at steps 2102 and 2104, is longer. As indicated at step 2108, the longer of the lengths is selected to be used, when determining the curvature ratio corresponding to the fitted curve at step 1914, as the length of the line extending orthogonally from the straight line (extending between endpoints of the fitted curve) to a point of the fitted curve that is farthest away from (i.e., deviates furthest from) the straight line (extending between endpoints of the fitted curve). For example, referring back to FIG. 20A, using the results of the method described with reference to FIG. 21, the curvature ratio can then be determined by determining the ratio of the length of the straight line 2040 to the length of the straight line 2010 that extends between the endpoints 2006a and 2006b of the fitted curve 2002.

Referring back to FIG. 18, the runtime engine 244 can report its determination to the application 246. Such reporting was also discussed above with reference to step 1916 in FIG. 19. More specifically, as shown in FIG. 19, information indicative of the angle determined at step 1910, the angle determined at step 1912 and/or the curvature ratio determined at step 1914 can be reported to the application.

Figure 22:
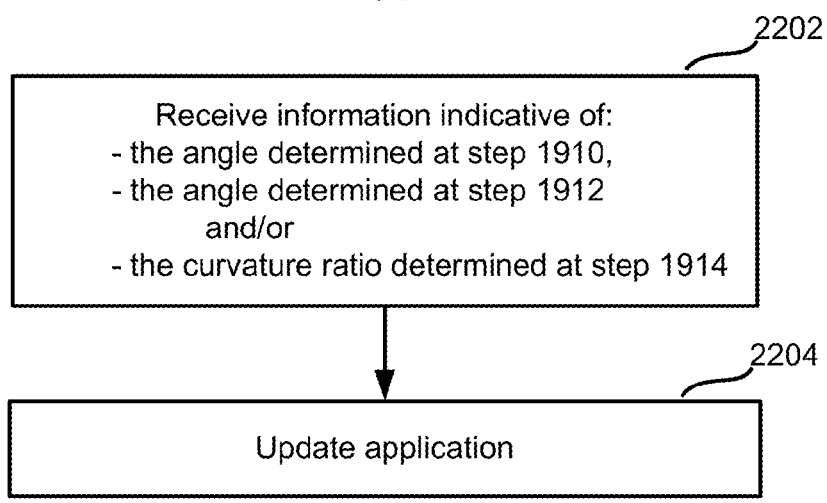
FIG. 22 illustrates a high level flow diagram that is used to summarize how an application can be updated based on information determined in accordance with embodiments described with reference to FIGS. 19-21.

Referring now to FIG. 22, at step 2202 the application receives information indicative of the angle determined at step 1910, the angle determined at step 1912 and/or the curvature ratio determined at step 1914. As shown at step 2204, the application is updated based on such information. For example, as mentioned above, such information can be used to track a user performing certain exercises and/or poses so that an avatar of the user can be controlled, points can be awarded to the user and/or feedback can be provided to the user. For a more specific example, where the application 246 is a game that instructs a user to perform certain exercises and/or poses, the application 246 can determine whether a user has performed an exercise or pose with correct form, and where they have not, can provide feedback to the user regarding how the user can improve their form.

Where more than one user is represented in a depth image, a separate instance of the method of FIG. 19 can be performed for each user. For example, assume that a first group of pixels in a depth image correspond to a first user, and a second group of pixels in the same depth image correspond to a second user. This would result in first information indicative of an angle and/or curvature corresponding to the first user, and second information indicative of an angle and/or curvature corresponding to the second user.

The method described above with reference to FIG. 19 can be repeated for additional depth images, thereby resulting in information indicative of an angle and/or curvature of a user's body being determined for each of a plurality of depth images. This enables changes in an angle and/or curvature of the user's body to be tracked. Where more than one user is represented in a depth image, each time the method is repeated, separate information indicative of an angle and/or curvature of a user's body can be determined for each user represented in the depth image.

An advantage of determining information indicative of an angle and/or curvature of a user's body, based entirely on a depth image, is that information indicative of the angle and/or curvature of a user's body can be determined even when ST techniques fail. Another advantage is that information indicative of an angle and/or curvature of a user's body can be determined once a depth image is available in a processing pipeline, thereby reducing latency, as ST techniques do not need to be executed. Nevertheless, information indicative of the angle and/or curvature of a user's body can also be determined using ST techniques, if desired.

Depending upon what user behavior is being tracked, it would sometimes be useful to be able to determine information indicative of extremities of a user's body. ST techniques are often unreliable for detecting extremities of a user's body, especially where the user is laying or sitting on or near the floor (e.g., when the user is sitting with their feet extended forwards toward the capture device). Certain embodiments described below rely on depth images to determine information indicative of extremities of a user's body. Such embodiments can be used in place of, or to supplement, skeletal tracking (ST) techniques that are often used to detect user behaviors based on RGB images.

Figure 23A:
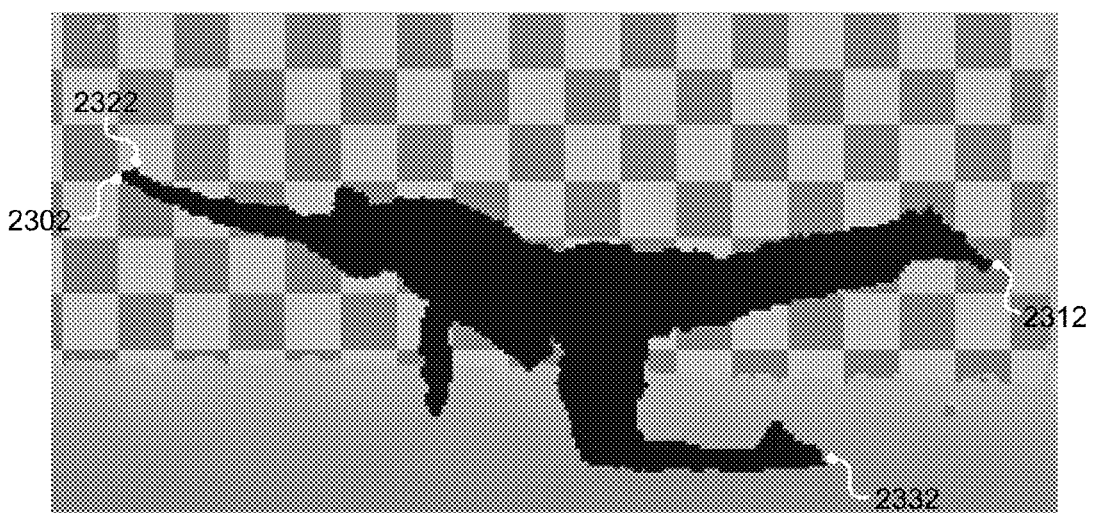
FIGS. 23A-23F, which show silhouettes representing a plurality of pixels corresponding to a user (of a depth image) performing a yoga pose or other exercise, are used to explain how extremities of a user can be identified, and average extremity positions (also referred to as average positions of extremity blobs) can be determined

Referring to FIG. 23A, the dark silhouette shown therein represents a plurality of pixels (of a depth image) corresponding to a user in variation on a standard plank position, but with one arm and one leg extended in opposite directions. Also shown in FIG. 23A are points 2302, 2312, 2322 and 2332 that corresponds, respectively, to the leftmost, rightmost, topmost and bottommost pixels (of the depth image) corresponding to the user. While it would be possible to track one or more extremities of the user over multiple depth image frames based on the points 2302, 2312, 2322 and/or 2332, such points have been shown to significantly change from frame to frame, causing the points to be relatively noisy data points. For example, such noise can result from slight movements of the user's hands, feet, head and/or the like. Certain embodiments, which are described below, can be used to overcome this noise problem by tracking average positions of extremity blobs, where the term blob is being used herein to refer to a group of pixels of a depth image that correspond to a user and are within a specified distance of a pixel identified as corresponding to an extremity of the user.

Figure 23B:
Figure 23C:
Figure 23D:
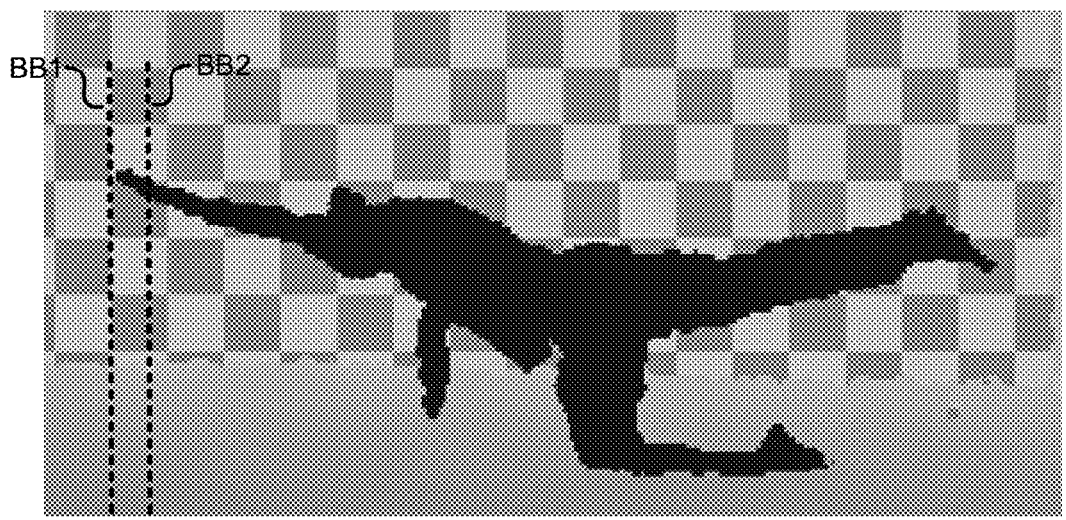
Figure 23E:
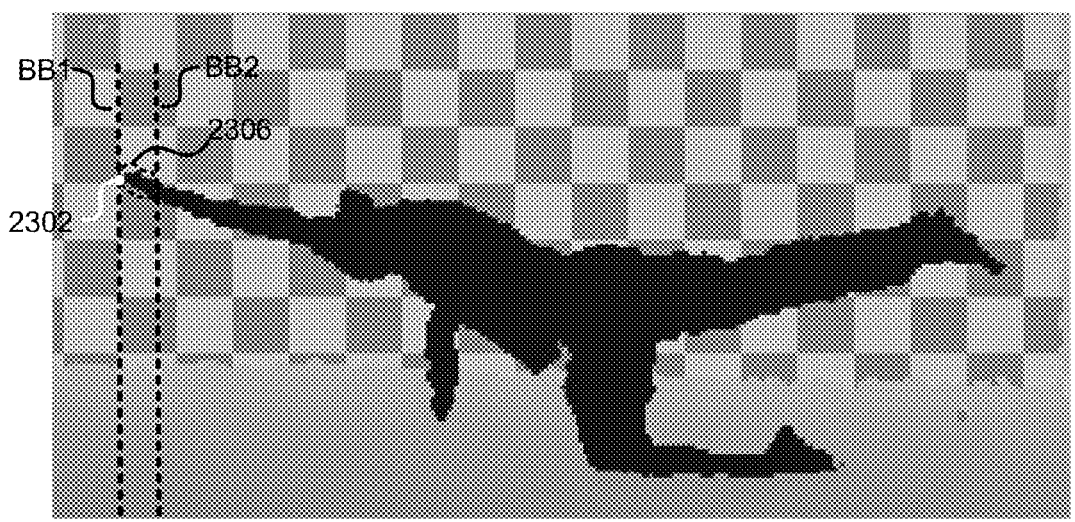
Figure 23F:
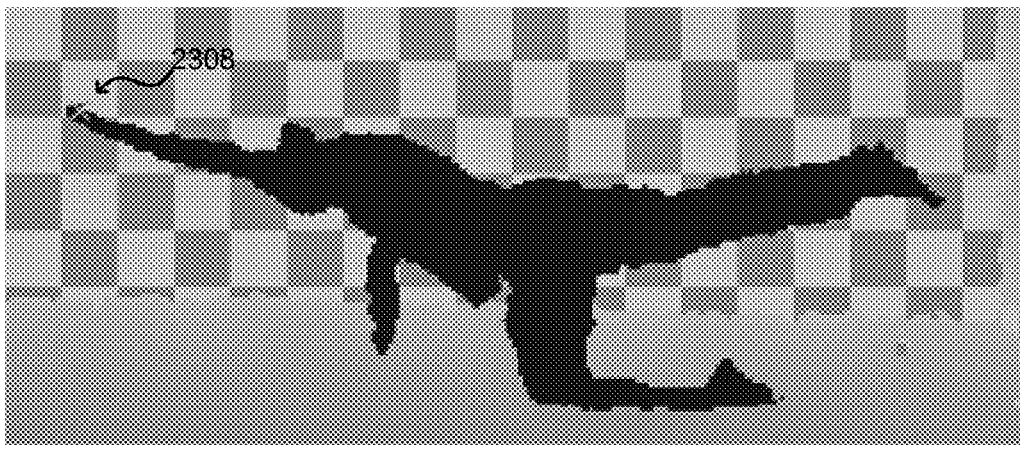
Figure 24:
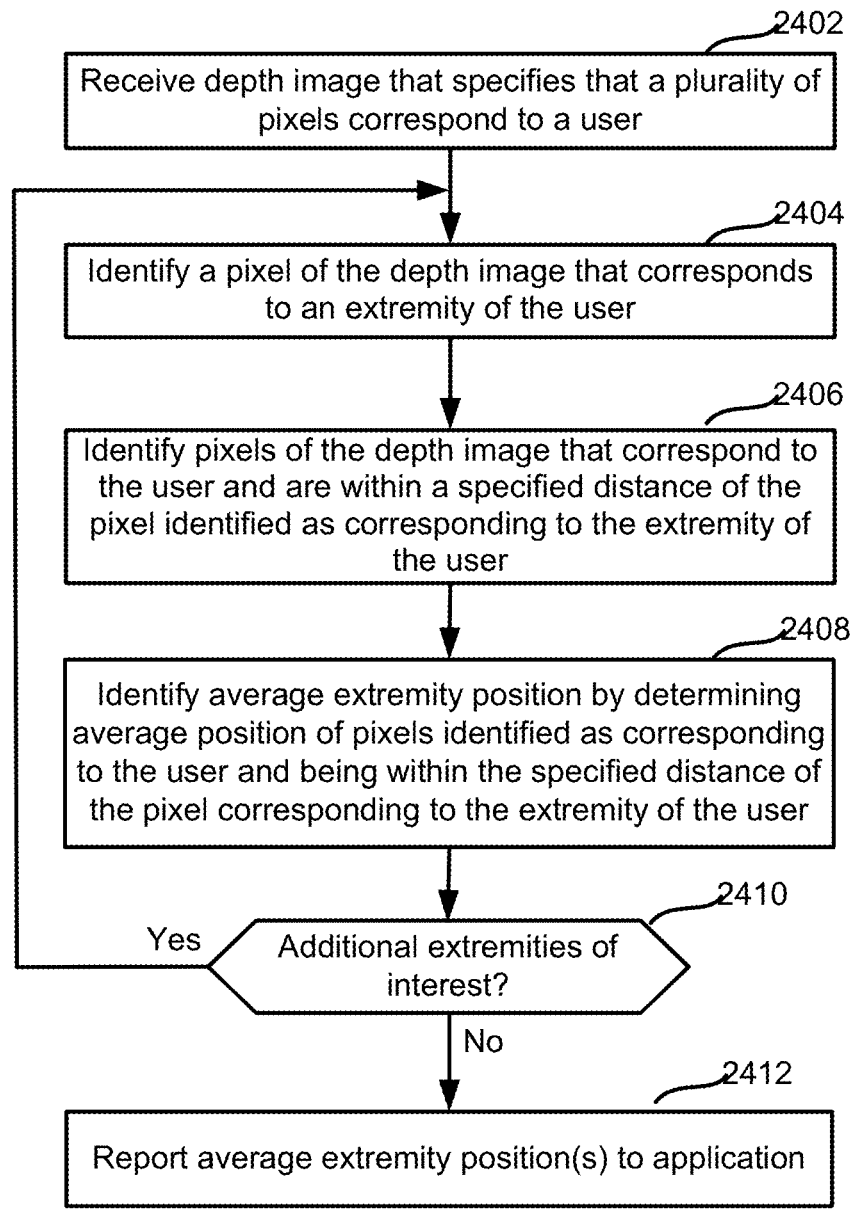
FIG. 24 illustrates a high level flow diagram that is used to summarize methods for identifying average extremity positions of a user based on a depth image.

The high level flow diagram of FIG. 24 will now be used to describe a method for determining average positions of extremity blobs. Referring to FIG. 24, at step 2402, a depth image is received, wherein the depth image specifies that a plurality of pixels correspond to a user. Since step 2402 is essentially the same as step 1902 described above with reference to FIG. 19, additional details of step 1902 can be understood from the above discussion of step 1902. At step 2404, a pixel of the depth image that corresponds to an extremity of the user is identified. Depending upon which extremity is being considered, step 2404 can involve identifying the pixel of the depth image that corresponds to either the leftmost, rightmost, topmost or bottommost pixel of the user. Examples of such pixels were described above with reference to FIG. 23. As will be describe in more detail below, step 2404 may alternatively involve identifying the pixel of the depth image that corresponds to the frontmost pixel of the depth image that corresponds to the user. At step 2406, there is an identification of pixels of the depth image that correspond to the user and are within a specified distance (e.g., within 5 pixels in a specified direction) of the pixel identified at step 2404 as corresponding to the extremity of the user. At step 2408, an average extremity position, which can also be referred to as the average position of an extremity blob, is determined by determining an average position of the pixels that were identified at step 2406 as corresponding to the user and being within the specified distance of the pixel corresponding to the extremity of the user. At step 2410 there is a determination of whether there are any additional extremities of interest for which an average extremity position (i.e., an average position of an extremity blob) is/are to be determined. The specific extremities of interest can be dependent on the application that is going to use the average extremity position(s). For example, wherein only the left and right extremities are of interest, steps 2404-2408 can be performed for each of these two extremities are of interest. As indicated at step 2412, one or more average extremity positions (e.g., the average positions of the left and right extremity blobs) are reported to an application, thereby enabling the application to be updated based on such positional information.

Figure 25:
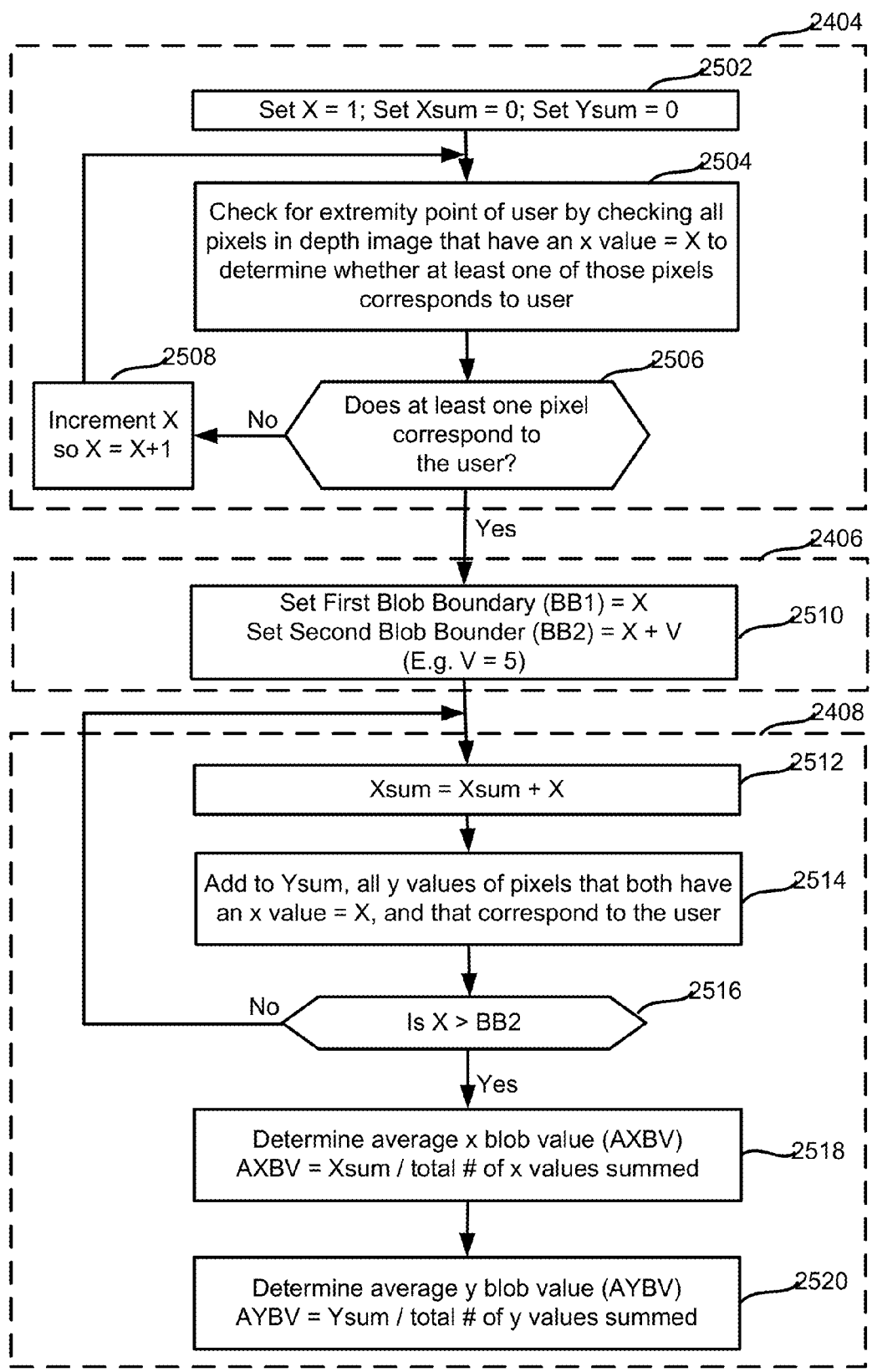
FIG. 25 is a high level flow diagram that is used to provide additional details of some of the steps in FIG. 24, according to an embodiment.

FIG. 25, together with FIGS. 23A-23F, will now be used to provide additional details of steps 2404-2408 of FIG. 24, according to an embodiment. For this discussion, it will be assumed that the initial extremity of interest is the left extremity. Referring to FIG. 25, steps 2502-2508 provide additional details regarding how to identify, at step 2404, a pixel (of the depth image) that corresponds to the leftmost point of the user, in accordance with an embodiment. At step 2502, various values are initialized, which involves setting X=1, setting Xsum=0, and setting Ysum=0. At step 2504, the leftmost extremity point of the user is searched for by checking all pixels in the depth image that have an x value=X to determine if at least one of those pixels corresponds to the user. Such determinations can be based on segmentations values corresponding to the pixels. Referring briefly to FIG. 23B, this can involve checking all of the pixels of the depth image along the dashed line 2340 to determine if at least one of those pixels corresponds to the user. Returning to FIG. 25, at step 2506 there is a determination of whether at least one of the pixels checked at step 2504 corresponded to the user. If the answer to step 2506 is no, then X is increment at step 2508, and thus, X now equals 2. Steps 2504 and 2506 are then repeated to determinate whether any of the pixels of the depth image, that have an x value=2, correspond to the user. In other words, referring back to FIG. 23B, the dashed line 2340 would be moved to the right by one pixel, and all of the pixels of the depth image along the moved over line 2340 are checked to determine if at least one of those pixels corresponds to the user. Steps 2504-2508 are repeated until a pixel corresponding to the user is identified, wherein the identified pixel will correspond to the leftmost extremity of the user, which is the point 2302a shown in FIG. 23A. Referring to FIG. 23C, the dashed line 2340 therein shows that point at which the leftmost extremity of the user is identified.

Step 2510 in FIG. 25 provides additional details of an embodiment for identifying, at step 2406, pixels of the depth image that correspond the user and are within a specified distance (e.g., within 5 pixels in the x direction) of the pixel identified as corresponding to the leftmost extremity of the user. Additionally, steps 2512-2520 in FIG. 25 will be used to provide additional detail regarding an embodiment for identifying, at step 2408, the average left extremity position. At step 2510, blob boundaries are specified, which involves setting a first blob boundary (BB1)=X, and setting a second blob boundary (BB2)=X+V, where V is a specified integer. For the following example it will be assumed that V=5, however V can alternatively be smaller or larger than 5. The pixels of the depth image that correspond to the user and between BB1 and BB2 (inclusive of BB1 and BB2) are an example of pixels of the depth image that correspond to the user and are within a specified distance of the pixel identified as corresponding to the extremity of the user. In FIG. 23D the two dashed vertical lines labeled BB1 and BB2 are examples of the first and second blob boundaries. The pixels which are encircled by the dashed line 2306 in FIG. 23E are pixels of the depth image that are identified as corresponding to the user and being within the specified distance (e.g., within 5 pixels in the x direction) of the pixel 2302 that corresponds to the leftmost extremity of the user. Such pixels, encircled by the dashed line 2306, can also be referred to as the left extremity blob, or more generally, as a side blob.

At step 2512, Xsum is updated so that Xsum=Xsum+X. At step 2514 Ysum is updated by adding to Ysum all of the y values of pixels of the depth image that correspond to the user and have an x value=X. At step 2516, there is a determination of whether X is greater than the second blob boundary BB2. As long as the answer to step 2516 is no, steps 2512 and 2514 are repeated, each time updating the values for Xsum and Ysum. At step 2518, an average X blob value (AXBV) is determined as being equal to the Xsum divided by the total number of x values that were summed. At step 2520, an average Y blob value (AYBV) is determined as being equal to the Ysum divided by the total number of y values that were summed. In this embodiment, AXBV and AYBV collectively provide the average x, y position of the left extremity, which can also be referred to as the average position of the left extremity blob. The "X" labeled 2308 in FIG. 23F is an example of an identified average position of a side blob.

Similar steps to those described above with reference to FIG. 25 can be performed to determine an average position of a right extremity blob. However, for this determination X would be set to its maximum value at step 2502, X would be decremented by 1 at step 2508, the second blob boundary (BB2) specified at step 2510 would be equal to X−V, and at step 2516 there would be a determination of whether X<BB2.

Similar steps to those described above with reference to FIG. 25 can be performed to determine an average position of a top or upper extremity blob. However, for this determination: Y would be set to 0 at step 2502; Y would be incremented at step 2508; at step 2510 BB1 would be specified to be equal to Y and BB2 would be specified to be equal to Y+V; at step 2512 Xsum would be updated by adding to Xsum all of the x values of pixels of the depth image that correspond to the user and have a y value=Y; and at step 2514 Ysum would be updated by adding Y to Ysum.

Similar steps to those described above with reference to FIG. 25 can be performed to determine an average position of a bottom extremity blob. However, for this determination: Y would be set to its maximum value at step 2502; Y would be decremented by 1 at step 2508; at step 2510 BB1 would be specified to be equal to Y and BB2 would be specified to be equal to Y−V; at step 2512 Xsum would be updated by adding to Xsum all of the x values of pixels of the depth image that correspond to the user and have a y value=Y; and at step 2514 Ysum would be updated by adding Y to Ysum. The terms left and right are relative terms, which are dependent upon whether positions are viewed from the perspective of the user represented within the depth image, or viewed from the perspective of the capture device that was used to capture the depth image. Accordingly, the term side can more generally be used to refer to left or right extremities or blobs.

Figure 26:
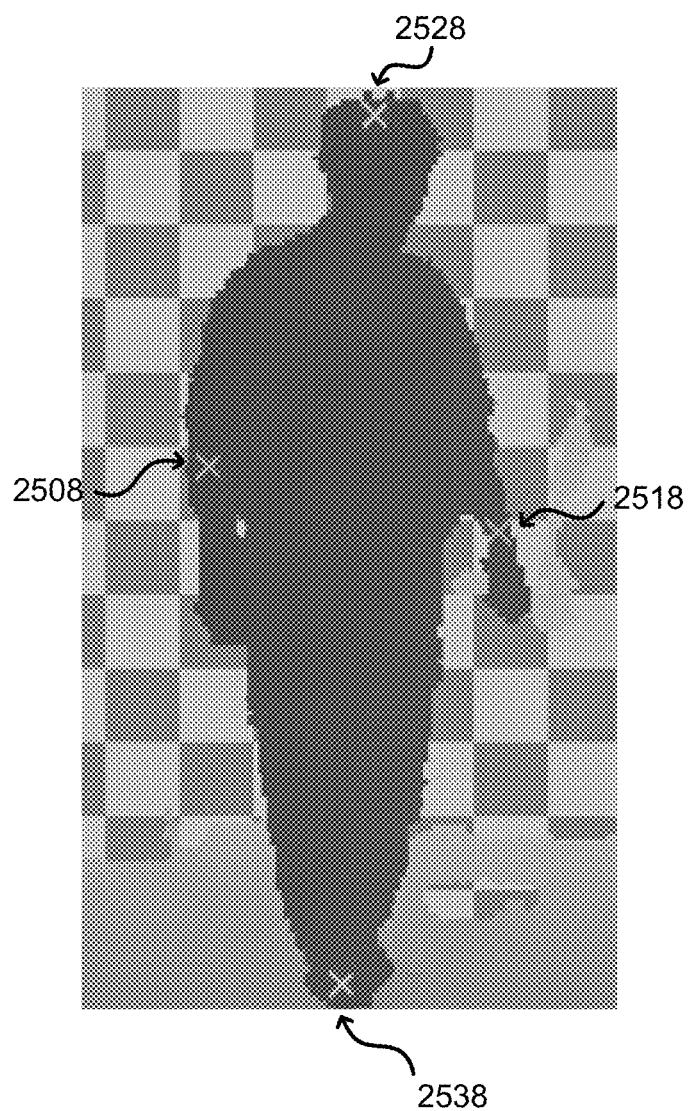
FIG. 26 shows a silhouette representing a plurality of pixels corresponding to a user (of a depth image) in a standing position along with average extremity positions determined based on the depth image.
Figure 27:
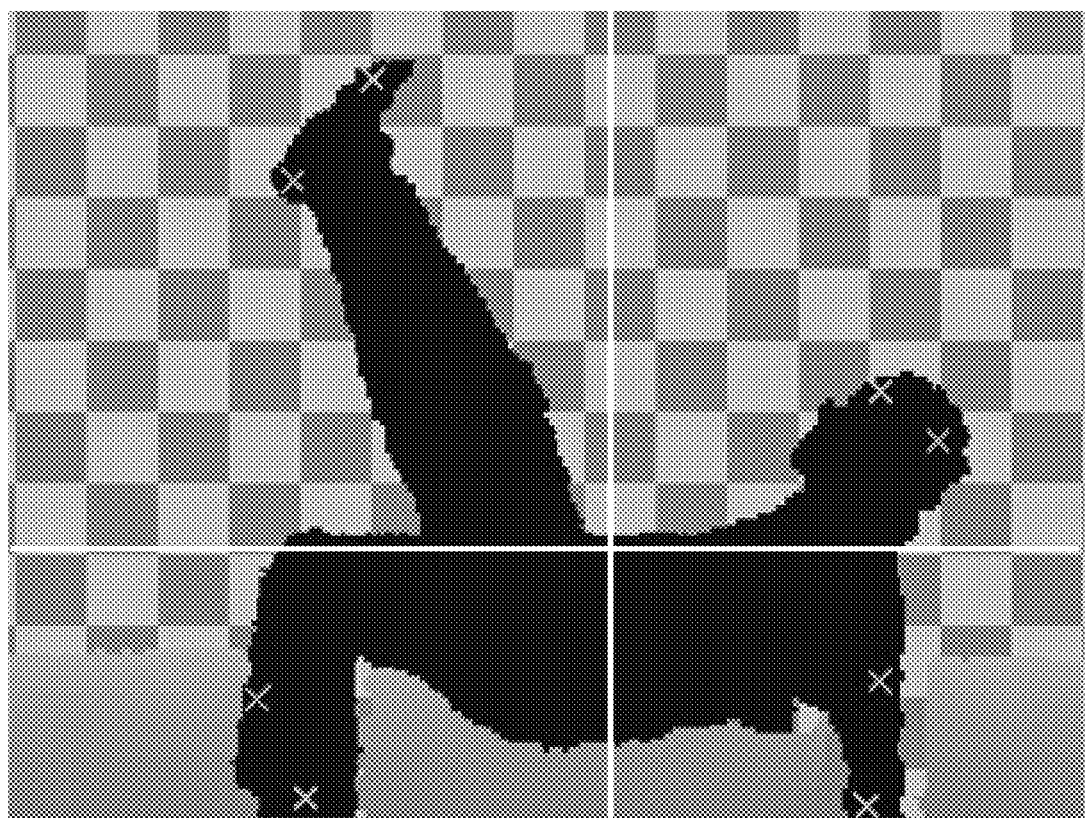
FIG. 27 is used to explain that a user within a depth image can be divided into quadrants, and average extremity positions can be determined for each quadrant.

Referring to FIG. 26, the dark silhouette shown therein represents a plurality of pixels (of a depth image) corresponding to a user in a standing position with one of their feet in positioned in front of the other. The four "X"s shown in FIG. 26 indicate various average positions of blobs that can be identified using embodiments described herein. More specifically, the "X" labeled 2508 corresponds an average position of a first side blob, which can also be referred to as an average side extremity position. The "X" labeled 2518 corresponds an average position of a second side blob, which can also be referred to as an average side extremity position. The "X" labeled 2528 corresponds an average position of a top blob, which can also be referred to as an average top or upper extremity position. The "X" labeled 2538 corresponds to an average position of a bottom blob, which can also be referred to as an average bottom or lower extremity position.

In accordance with certain embodiments, the pixels (of a depth image) that correspond to a user can be divided into quadrants, and average positions of one or more extremity blobs can be determined for each quadrant, in a similar manner as was discussed above. Such embodiments can be appreciated from FIG. 27, where the horizontal and vertical while lines divide the pixels corresponding to the user into quadrants, and the "X"s correspond to average positions of various extremity blobs.

Figure 28:
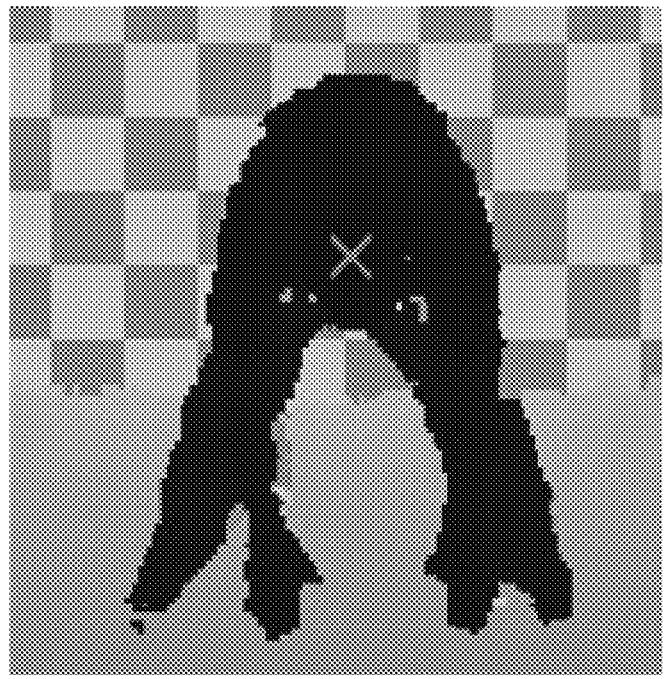
FIG. 28, which shows a silhouette representing a plurality of pixels corresponding to a user (of a depth image) bending forward, is used to explain how an average front extremity position can be determined based on the depth image.

As can be seen in FIG. 28, embodiments described herein can also be used to determine an average position of a front blob, which is indicated by the "X" in FIG. 28. In this FIG. 28, the front blob corresponds to a portion of a user bending over with their head being the closes portion of their body to the capture device. When identifying an average position of a front blob, z values of pixels of the depth image are used in place of either x or y values when, for example, performing the steps described with reference to FIG. 25. In other words, planes defined by the z- and x-axes, or the z- and y-axes, are searched through for a z extremity, as opposed to searching through planes defined by x- and y-axes.

The camera (e.g., 226) that is used to obtain depth images may be tilted relative to the floor upon which a user is standing or otherwise supporting themselves. In accordance with specific embodiments, camera tilt is accounted for (also referred to as corrected for) before determining average positions of extremity blobs. Such correction for camera tilt is most beneficial when determining an average position for a front blob, because such a position is dependent on z values of pixels of the depth image. To account for such camera tilt, a gravity vector can be obtained from a sensor (e.g., an accelerometer) or in some other manner, and factored in. For example, such accounting for camera tilt (also referred to as tilt correction) can be performed on pixels that correspond to a user, before such pixels are used to identify an average position of a front blob. In certain embodiments, the tilt correction is performed by selecting a search axis (which can also be referred to as a normalized search direction), and projecting all pixels to the search axis. This can be done via dotting each pixel's position with the normalized search direction. This yields a distance along the search direction that can used to search for a pixel corresponding to a frontmost extremity, by finding the pixel with the greatest z value. The greatest z value, and the greatest z value−V, can be used to identify the blob boundaries BB1 and BB2, and thus a region within to sum pixel values to determine an average.

Where more than one user is represented in a depth image, a separate instance of the method of FIG. 24 can be performed for each user. For example, assume that a first group of pixels in a depth image correspond to a first user, and a second group of pixels in the same depth image correspond to a second user. This would result in average positions of extremity blobs being identified for each user.

The method described above with reference to FIG. 24 can be repeated for additional depth images, thereby resulting in average positions of extremity blobs being determined for each of a plurality of depth images. This enables changes in average extremity positions to be tracked. Where more than one user is represented in a depth image, each time the method is repeated, average positions of extremity blobs can be identified for each user.

Referring back to FIG. 18, the runtime engine 244 can report its determination to the application 246. Such reporting was also discussed above with reference to step 2412 in FIG. 24. More specifically, as shown in FIG. 24, information indicative of identified average extremity position(s) can be reported to the application.

Figure 29:
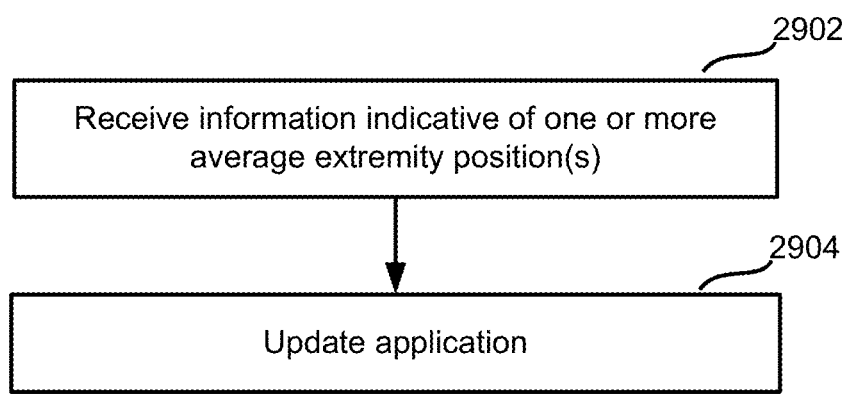
FIG. 29 illustrates a high level flow diagram that is used to summarize how an application can be updated based on information determined in accordance with embodiments described with reference to FIGS. 23A-28.

Referring now to FIG. 29, at step 2902 the application receives information indicative of identified average extremity position(s). As shown at step 2904, the application is updated based on such information. For example, as mentioned above, such information can be used to track a user performing certain exercises and/or poses so that an avatar of the user can be controlled, points can be awarded to the user and/or feedback can be provided to the user. For a more specific example, where the application 246 is a game that instructs a user to perform certain exercises and/or poses, the application 246 can determine whether a user has performed an exercise or pose with correct form, and where they have not, can provide feedback to the user regarding how the user can improve their form.

An advantage of identifying average positions of extremity blobs, based entirely on a depth image, is that information indicative of extremities of a user's body can be determined even when ST techniques fail. Another advantage is that information indicative of extremities of a user's body can determined once a depth image is available in a processing pipeline, thereby reducing latency, as ST techniques do not need to be executed. Nevertheless information indicative of extremities of a user's body can also be determined using ST techniques, if desired.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the technology be defined by the claims appended hereto.

What is claimed is:

1. A method, comprising:
   accessing, by a processor, image data that tracks a user;
   forming, by the processor, a body model for the user that includes a plurality of body parts based on the image data;
   computing, processor, a center of mass for different ones of the body parts;
   determining, by the processor, a center of mass state vector for each of the plurality of body parts, the center of mass state vector for each of the body parts comprises position of the center of mass of the body part, velocity of the center of mass of the body part, orientation of the body part, and angular velocity of the body part; and
   determining, by the processor, a center of mass for the user as a whole based on the center of mass of the different body parts.

2. The method of claim 1, further comprising:
   determining, by the processor, an inertia tensor for each of the body parts; and
   determining, by the processor, an inertia tensor for the user as a whole based on the inertia tensor for each of the body parts.

3. The method of claim 1, wherein the forming a body model for the user that includes a plurality of body parts based on the image data comprises:

forming, by the processor, a model having a plurality of joints; and adding, by the processor, geometric shapes between pairs of the plurality of joints, each of the geometric shapes corresponds to one of the body parts, wherein the computing a center of mass for different ones of the body parts comprises computing a center of mass for the respective geometric shapes.

4. The method of claim 1, further comprising:

determining, by the processor, a center of mass state vector for the user for a plurality of point in time, the center of mass state vector for the user comprises position of the center of mass for the user, velocity of the center of mass for the user, orientation of a rigid body for the user, angular velocity for the user;

determining, by the processor, a change in the center of mass state vector for the user between two points in time; and determining, by the processor, a force that one or more constraint points would need in order to result in the change in the center of mass state vector for the user.

5. The method of claim 4, wherein the determining a force that one or more constraint points would need in order to result in the change in the center of mass state vector for the user comprises:

determining, by the processor, what foot forces are required to change the center of mass state vector for the user, including treating the user as a rigid body having feet that are the one or more constraint points.

6. The method of claim 1, further comprising:

determining, by the processor, change in the center of mass state vectors for each of the body parts between two points in time;

adding, by the processor, a set of joint constraints to the body model; and computing, processor, constraint forces and/or torques to move the body parts to result in the change in the center of mass state vectors for the body parts between the two points in time.

7. The method of claim 1, further comprising:

determining a center of mass state vector for the user for the plurality of points in time based on the center of mass state vector for each of the plurality of body parts for the plurality of points in time, the center of mass state vector for the user comprises position of the center of mass for the user, velocity of the center of mass for the user, orientation of a rigid body for the user, and angular velocity for the user.

8. The method of claim 1, further comprising:

computing, by the processor, the center of mass for the different ones of the body parts for each of a plurality of points of time; and determining, by the processor, the center of mass state vector for each of the plurality of body parts for each of the plurality of points of time.

9. A system comprising:

a camera that captures 3D image data that tracks a user;

a processor in communication with the camera, the processor is configured to:

access the 3D image data from the camera;

form a body model for the user that includes a plurality of body parts and plurality of joints based on the image data;

compute a center of mass for different ones of the plurality of body parts;

determine a center of mass state vector for each of the plurality of body parts, the center of mass state vector for each of the body parts comprises position of a center of mass of the body part, velocity of a center of mass of the body part, orientation of the body part, and angular velocity of the body part; and determine a center of mass for the user as a whole based on the center of mass of the body parts.

10. The system of claim 9, wherein the processor is further configured to:

determine an inertia tensor for each of the body parts; and determine an inertia tensor for the user as a whole based on the inertia tensor for each of the body parts.

11. The system of claim 9, wherein the processor being configured to form a body model for the user that includes a plurality of body parts and plurality of joints based on the image data comprises the processor being configured to:

form a skeletal model having the plurality of joints; and add geometric shapes between pairs of the plurality of joints, each of the geometric shapes corresponds to one of the body parts, wherein the processor being configured to compute a center of mass for different ones of the body parts comprises the processor being configured to compute a center of mass for the respective geometric shapes.

12. The system of claim 9, wherein the processor is further configured to:

determine a center of mass state vector for the user for a plurality of frames of the image data, the center of mass state vector for the user comprises position of the center of mass for the user, velocity of the center of mass for the user, orientation of a rigid body for the user, angular velocity for the user;

determine a change in the center of mass state vector for the user between two of the frames; and determine a force that one or more constraint points would need in order to result in the change in the center of mass state vector for the user.

13. The system of claim 12, wherein the processor being configured to determine a force that one or more constraint points would need in order to result in the change in the center of mass state vector for the user comprises the processor being configured to:

treat the user as a rigid body;

treat feet of the user as constraint points between the rigid body and a surface below the user; and determine what forces of the feet are required to change the center of mass state vector for the user.

14. The system of claim 9, wherein the processor is configured to:

determine the center of mass state vector for each of the body parts for a plurality of frames of the image data.

15. The system of claim 14, wherein the processor is further configured to:

determine change in the center of mass state vectors for each of the body parts between two of the plurality of frames of the image data;

treat the plurality of joints as constraints; and compute constraint forces and/or torques to move the body parts to result in the change in the center of mass state vectors for the body parts between the two frames.

16. A computer readable storage medium comprising processor readable code for programming a processor to:

access skeletal data that tracks a user exercising, the skeletal data includes a plurality of joints;

add geometric shapes between pairs of the joints;

compute a center of mass for different ones of the geometric shapes;

determine a center of mass state vector for each of the geometric shapes for a plurality of points in time, the center of mass state vector for each of the geometric shapes comprises position of a center of mass of the geometric shape, velocity of a center of mass of the geometric shape, orientation of the geometric shape, and angular velocity of the geometric shape;

determine a center of mass for the user as a whole for each of the plurality of points in time based on a summation of the center of mass of the different geometric shapes for each point in time;

determine a center of mass state vector for the user as a whole for the plurality of points in time based on the center of mass state vector for each of the geometric shapes for the plurality of points in time, the center of mass state vector for the user comprises position of the center of mass for the user, velocity of the center of mass for the user, orientation of a rigid body for the user, and angular velocity for the user;

determine a change in the center of mass state vector for the user between two points in time and determine a force that one or more constraint points on the rigid body for the user would need in order to result in the change in the center of mass state vector for the user.

17. The computer readable storage medium of claim 16, wherein the processor readable code is further for programming the processor to:

determine an inertia tensor for each of the geometric shapes; and determine an inertia tensor for the user as a whole based on the inertia tensor for each of the geometric shapes.

18. The computer readable storage medium of claim 16, wherein the geometric shapes are symmetric about an axis of the respective geometric shape.

19. The computer readable storage medium of claim 16, wherein the processor readable code for programming the processor to determine a force that one or more constraint points on the rigid body for the user would need in order to result in the change in the center of mass state vector for the user comprises processor readable code for programming the processor to:

treat feet of the user having feet that as the one or more constraint points on the rigid body, the feet are constraints between the rigid body and ground; and determine what foot forces are required to change the center of mass state vector for the user as a whole.

20. The computer readable storage medium of claim 16, wherein the processor readable code is further for programming the processor to:

determine change in the center of mass state vectors for each of the geometric shapes between two points in time;

treat the plurality of joints as constraints; and compute constraint forces to move the geometric shapes to result in the change in the center of mass state vectors for the geometric shapes between the two points in time.

* * * * *